(12) United States Patent
Black et al.

(10) Patent No.: US 8,409,380 B2
(45) Date of Patent: Apr. 2, 2013

(54) REINFORCED FIBER CEMENT ARTICLE AND METHODS OF MAKING AND INSTALLING THE SAME

(75) Inventors: Andrew J. Black, Rancho Cucamonga, CA (US); Weiling Peng, Alta Loma, CA (US)

(73) Assignee: James Hardie Technology Limited, Dublin (IE)

( * ) Notice: Subject to any disclaimer, the term of this patent is extended or adjusted under 35 U.S.C. 154(b) by 406 days.

(21) Appl. No.: 12/510,741

(22) Filed: Jul. 28, 2009

(65) Prior Publication Data

US 2009/0283201 A1    Nov. 19, 2009

Related U.S. Application Data

(62) Division of application No. 10/117,401, filed on Apr. 3, 2002, now Pat. No. 7,713,615.

(60) Provisional application No. 60/281,195, filed on Apr. 3, 2001.

(51) Int. Cl.
*B32B 41/00* (2006.01)

(52) U.S. Cl. .......... 156/64; 156/350; 156/367; 156/378; 156/379

(58) Field of Classification Search ............ 156/64, 156/350, 367, 378, 379
See application file for complete search history.

(56) References Cited

U.S. PATENT DOCUMENTS

| | | |
|---|---|---|
| 369,216 A | 8/1887 | Temple |
| 494,763 A | 4/1893 | Smidth |
| 525,442 A | 9/1894 | Burrows |
| 575,074 A | 1/1897 | Smith |
| 774,114 A | 11/1904 | Spear |
| 815,801 A | 3/1906 | Depew et al. |
| 1,399,023 A | 12/1921 | Murray |
| 1,510,497 A | 10/1924 | Keller |
| 1,630,801 A | 5/1927 | Parsons |
| 1,634,809 A | 7/1927 | Weiss |
| 1,698,557 A | 1/1929 | O'Brien |
| 1,856,932 A | 5/1932 | Shaw |
| 1,856,936 A | 5/1932 | Turner |
| 1,871,843 A | 8/1932 | Ericson |
| 1,930,024 A | 10/1933 | Varden |
| 1,943,663 A | 1/1934 | Ericson |
| 1,959,519 A | 5/1934 | Black |
| 1,976,984 A | 10/1934 | Condon et al. |
| 1,978,519 A | 10/1934 | Willock et al. |
| 1,995,393 A | 3/1935 | Manske |
| 1,997,939 A | 4/1935 | Loucks |
| 2,009,619 A | 7/1935 | Hashberger |
| 2,062,149 A | 11/1936 | Stark et al. |

(Continued)

FOREIGN PATENT DOCUMENTS

WO    WO 9810151 A1 *  3/1998

*Primary Examiner* — Katarzyna Wyrozebski Lee
*Assistant Examiner* — Joshel Rivera
(74) *Attorney, Agent, or Firm* — Knobbe Martens Olson & Bear, LLP

(57) ABSTRACT

In one embodiment, a reinforced fiber cement article comprising a fiber cement piece and a reinforcing fixture bonded to a portion of the fiber cement piece for improving the performance, strength and durability of the fiber cement piece. The reinforcing fiber cement article could be used as or in conjunction with a siding plank assembly, which further comprises an interlocking feature that allows the siding plank to be stacked with other siding planks in a manner such that a uniform and deep shadow line is created. The interlocking feature sets the gauge of the exposed plank face and allows for leveling of the plank during installation. The reinforcing fixture could also serve as a thick butt piece or a plastic spline that produces a deep shadow line. A cementitious adhesive is used to bond the reinforcing fixture to the fiber cement piece.

15 Claims, 69 Drawing Sheets

U.S. PATENT DOCUMENTS

| | | |
|---|---|---|
| 2,182,372 A | 12/1939 | Cox et al. |
| 2,224,351 A | 12/1940 | Kaye |
| 2,253,753 A | 8/1941 | Black |
| 2,276,170 A | 3/1942 | Elmendorf |
| 2,317,634 A | 4/1943 | Olsen et al. |
| 2,323,230 A | 6/1943 | McAvoy |
| 2,324,325 A | 7/1944 | Schuh |
| 2,354,639 A | 7/1944 | Seymour |
| 2,400,357 A | 5/1946 | Krajci |
| 2,413,794 A | 1/1947 | Small |
| 2,447,275 A | 8/1948 | Price |
| 2,511,083 A | 6/1950 | Small |
| 2,517,122 A | 8/1950 | Lockwood |
| 2,624,298 A | 1/1953 | Farren |
| 2,694,025 A | 11/1954 | Slayter et al. |
| 2,724,872 A | 11/1955 | Herbes |
| 2,782,463 A | 2/1957 | Bergvall et al. |
| 2,928,143 A | 3/1960 | Newton |
| 3,046,700 A | 7/1962 | Davenport |
| 3,047,985 A | 8/1962 | Murphy |
| 3,173,229 A | 3/1965 | Weber |
| 3,181,662 A | 5/1965 | Maertzig, Jr. |
| 3,214,876 A | 11/1965 | Mattes |
| 3,235,039 A | 2/1966 | O'Donnell |
| 3,236,932 A | 2/1966 | Grigas et al. |
| 3,274,743 A | 9/1966 | Blum, Jr. |
| 3,284,980 A | 11/1966 | Dinkel |
| 3,333,379 A | 8/1967 | Harris |
| 3,408,786 A | 11/1968 | Snyker |
| 3,415,019 A | 12/1968 | Andersen |
| 3,416,275 A | 12/1968 | Van Loghem et al. |
| 3,421,281 A | 1/1969 | Harris |
| 3,481,093 A | 12/1969 | Davidson |
| 3,527,004 A | 9/1970 | Sorenson |
| 3,606,720 A | 9/1971 | Cookson |
| 3,625,808 A | 12/1971 | Martin |
| 3,635,742 A | 1/1972 | Fujimasu |
| 3,660,955 A | 5/1972 | Simon |
| 3,663,341 A | 5/1972 | Veneziale, Jr. |
| 3,663,353 A | 5/1972 | Long et al. |
| 3,703,795 A | 11/1972 | Mattes |
| 3,708,943 A | 1/1973 | Thomas et al. |
| 3,729,368 A | 4/1973 | Ingham et al. |
| 3,754,365 A | 8/1973 | Carrick et al. |
| 3,780,483 A | 12/1973 | Mattes |
| 3,782,985 A | 1/1974 | Gebhardt |
| 3,797,179 A | 3/1974 | Jackson |
| 3,797,190 A | 3/1974 | Widdowson |
| 3,804,058 A | 4/1974 | Messenger |
| 3,818,668 A | 6/1974 | Chamiga |
| 3,835,604 A | 9/1974 | Hoffmann, Jr. |
| 3,847,633 A | 11/1974 | Race |
| 3,866,378 A | 2/1975 | Kessler |
| 3,869,295 A | 3/1975 | Bowles et al. |
| 3,888,617 A | 6/1975 | Barnett |
| 3,902,911 A | 9/1975 | Messenger |
| 3,921,346 A | 11/1975 | Sauer et al. |
| 3,928,701 A | 12/1975 | Roehner |
| 3,974,024 A | 8/1976 | Yano et al. |
| 3,986,312 A | 10/1976 | Calhoun et al. |
| 3,992,845 A | 11/1976 | Grzesiek et al. |
| 4,010,587 A | 3/1977 | Larsen |
| 4,010,589 A | 3/1977 | Gross |
| 4,015,392 A | 4/1977 | Eaton |
| 4,028,859 A | 6/1977 | Bellagamba |
| 4,034,528 A | 7/1977 | Sanders et al. |
| 4,047,355 A | 9/1977 | Knorr |
| 4,052,829 A | 10/1977 | Chapman |
| 4,058,944 A | 11/1977 | Rieger |
| 4,063,393 A | 12/1977 | Toti |
| 4,065,899 A | 1/1978 | Kirkhuff |
| 4,070,843 A | 1/1978 | Leggiere et al. |
| 4,076,884 A | 2/1978 | Riley et al. |
| 4,079,562 A | 3/1978 | Englert et al. |
| 1,512,084 A | 5/1978 | Arthur et al. |
| 4,101,335 A | 7/1978 | Barrable |
| 4,102,106 A | 7/1978 | Golder et al. |
| 4,104,103 A | 8/1978 | Tarullo |
| 4,104,840 A | 8/1978 | Heintz et al. |
| 4,110,507 A | 8/1978 | Colledge |
| 4,112,647 A | 9/1978 | Scheid |
| 4,118,236 A | 10/1978 | Erskine |
| 4,128,696 A | 12/1978 | Goebel et al. |
| 4,132,555 A | 1/1979 | Barrable |
| 4,150,517 A | 4/1979 | Warner, Sr. |
| 4,152,878 A | 5/1979 | Balinski |
| 4,166,749 A | 9/1979 | Sterrett et al. |
| 4,183,188 A | 1/1980 | Goldsby |
| 4,187,658 A | 2/1980 | Reinwall, Jr. |
| 4,203,788 A | 5/1980 | Clear |
| 4,211,525 A | 7/1980 | Vetter et al. |
| 4,222,785 A | 9/1980 | Henderson |
| 4,231,573 A | 11/1980 | Kelly |
| 4,268,317 A | 5/1981 | Rayl |
| 4,274,239 A | 6/1981 | Carroll |
| 4,292,364 A | 9/1981 | Wesch et al. |
| 4,298,647 A | 11/1981 | Cancio et al. |
| 4,307,551 A | 12/1981 | Crandell |
| 4,321,780 A | 3/1982 | Hooper et al. |
| 4,327,528 A | 5/1982 | Fritz |
| 4,337,290 A | 6/1982 | Kelly et al. |
| 4,339,489 A | 7/1982 | Barker et al. |
| 4,343,127 A | 8/1982 | Greve et al. |
| 4,361,616 A | 11/1982 | Bomers |
| 4,362,566 A | 12/1982 | Hinterwaldner |
| 4,366,657 A | 1/1983 | Hopman |
| 4,370,166 A | 1/1983 | Powers et al. |
| 4,373,955 A | 2/1983 | Bouchard et al. |
| 4,373,957 A | 2/1983 | Pedersen et al. |
| 4,377,977 A | 3/1983 | Wurster |
| 4,379,553 A | 4/1983 | Kelly |
| 4,380,564 A | 4/1983 | Cancio et al. |
| 4,392,336 A | 7/1983 | Ganssle |
| 4,399,643 A | 8/1983 | Hafner |
| 4,406,703 A | 9/1983 | Guthrie et al. |
| 4,420,351 A | 12/1983 | Lussi et al. |
| 4,424,261 A | 1/1984 | Keeling et al. |
| 4,429,214 A | 1/1984 | Brindley et al. |
| 4,441,944 A | 4/1984 | Massey |
| 4,442,219 A | 4/1984 | TenEyck et al. |
| 4,462,730 A | 7/1984 | Knohl |
| 4,462,835 A | 7/1984 | Car |
| 4,463,532 A | 8/1984 | Faw |
| 4,465,729 A | 8/1984 | Cancio et al. |
| 4,501,830 A | 2/1985 | Miller et al. |
| 4,502,256 A | 3/1985 | Hahn et al. |
| 4,504,320 A | 3/1985 | Rizer et al. |
| 4,506,486 A | 3/1985 | Culpepper, Jr. et al. |
| 4,514,947 A | 5/1985 | Grail |
| 4,553,366 A | 11/1985 | Guerin |
| 4,559,894 A | 12/1985 | Thompson |
| 4,586,304 A | 5/1986 | Flamand |
| 4,588,443 A | 5/1986 | Bache |
| 4,592,185 A | 6/1986 | Lynch et al. |
| 4,626,398 A | 12/1986 | Vetter et al. |
| 4,637,860 A | 1/1987 | Harper |
| 4,640,715 A | 2/1987 | Heitzmann et al. |
| 4,641,469 A | 2/1987 | Wood |
| 4,642,137 A | 2/1987 | Heitzmann et al. |
| 4,661,398 A | 4/1987 | Ellis |
| 4,670,079 A | 6/1987 | Thompson |
| 4,673,659 A | 6/1987 | Wood et al. |
| 4,680,059 A | 7/1987 | Cook et al. |
| 4,685,263 A | 8/1987 | Ting |
| 4,698,942 A | 10/1987 | Swartz |
| 4,730,398 A | 3/1988 | Stanton |
| 4,737,191 A | 4/1988 | Meynardi |
| 4,748,771 A | 6/1988 | Lehnert et al. |
| 4,779,313 A | 10/1988 | Gonas |
| 4,780,141 A | 10/1988 | Double et al. |
| 4,789,604 A | 12/1988 | van der Hoeven |
| 4,793,861 A | 12/1988 | Sohm |
| 4,803,105 A | 2/1989 | Kretow et al. |
| 4,808,229 A | 2/1989 | Arhelger |
| 4,811,538 A | 3/1989 | Lehnert et al. |
| 4,827,621 A | 5/1989 | Borsuk |
| 4,840,672 A | 6/1989 | Baes |

| Patent No. | Date | Name |
|---|---|---|
| 4,841,702 A | 6/1989 | Huettemann |
| 4,842,649 A | 6/1989 | Heitzmann et al. |
| 4,854,101 A | 8/1989 | Champagne |
| 4,858,402 A | 8/1989 | Putz |
| 4,866,896 A | 9/1989 | Shreiner et al. |
| 4,870,788 A | 10/1989 | Hassan |
| 4,876,827 A | 10/1989 | Williams et al. |
| 4,895,598 A | 1/1990 | Hedberg et al. |
| 4,906,408 A | 3/1990 | Bouniol |
| 4,914,885 A | 4/1990 | Baker et al. |
| 4,924,644 A | 5/1990 | Lewis |
| 4,927,696 A | 5/1990 | Berg |
| 4,930,287 A | 6/1990 | Volk et al. |
| 4,937,993 A | 7/1990 | Hitchins |
| 4,952,631 A | 8/1990 | McAlpin et al. |
| 4,955,169 A | 9/1990 | Shisko |
| 4,963,430 A | 10/1990 | Kish et al. |
| 4,969,250 A | 11/1990 | Hickman et al. |
| 4,969,302 A | 11/1990 | Coggan et al. |
| 4,975,396 A | 12/1990 | Thiery |
| 4,985,119 A | 1/1991 | Vinson et al. |
| 4,995,605 A | 2/1991 | Conville |
| 4,999,056 A | 3/1991 | Rasmussen |
| 5,017,232 A | 5/1991 | Miceli |
| 5,022,207 A | 6/1991 | Hartnett |
| 5,045,378 A | 9/1991 | Libby |
| 5,047,086 A | 9/1991 | Hayakawa et al. |
| 5,067,675 A | 11/1991 | Brant et al. |
| D322,678 S | 12/1991 | Brathwaite et al. |
| 5,076,986 A | 12/1991 | Delvaux et al. |
| 5,077,952 A | 1/1992 | Moore |
| 5,080,022 A | 1/1992 | Carlson |
| 5,106,557 A | 4/1992 | Rirsch et al. |
| 5,108,679 A | 4/1992 | Rirsch et al. |
| 5,112,405 A | 5/1992 | Sanchez |
| 5,114,617 A | 5/1992 | Smetana et al. |
| 5,115,621 A | 5/1992 | Kobayashi |
| 5,117,600 A | 6/1992 | Yerushalmi |
| 5,143,780 A | 9/1992 | Balassa |
| 5,155,958 A | 10/1992 | Huff |
| 5,167,710 A | 12/1992 | Leroux et al. |
| 5,177,305 A | 1/1993 | Pichat |
| 5,198,052 A | 3/1993 | Ali |
| 5,198,275 A | 3/1993 | Klein |
| 5,210,989 A | 5/1993 | Jakel |
| 5,224,318 A | 7/1993 | Kemerer |
| 5,226,274 A | 7/1993 | Sommerstein |
| 5,229,437 A | 7/1993 | Knight |
| 5,234,754 A | 8/1993 | Bache |
| D339,642 S | 9/1993 | Blazley |
| 5,242,736 A | 9/1993 | Van Erden et al. |
| 5,245,811 A | 9/1993 | Knorr |
| 5,247,773 A | 9/1993 | Weir |
| 5,252,526 A | 10/1993 | Whittemore |
| 5,259,872 A | 11/1993 | Shinozaki et al. |
| 5,268,226 A | 12/1993 | Sweeney |
| 5,282,317 A | 2/1994 | Carter et al. |
| 5,297,370 A | 3/1994 | Greenstreet et al. |
| 5,301,484 A | 4/1994 | Jansson |
| 5,305,568 A | 4/1994 | Beckerman |
| 5,305,577 A | 4/1994 | Richards et al. |
| 5,319,909 A | 6/1994 | Singleterry |
| 5,323,581 A | 6/1994 | Jakel |
| 5,330,573 A | 7/1994 | Nakano et al. |
| 5,334,242 A | 8/1994 | O'Toole |
| 5,338,349 A | 8/1994 | Farrar |
| 5,349,802 A | 9/1994 | Kariniemi |
| 5,352,288 A | 10/1994 | Mallow |
| 5,352,290 A | 10/1994 | Takeshita et al. |
| 5,358,676 A | 10/1994 | Jennings et al. |
| 5,369,924 A | 12/1994 | Neudorf et al. |
| 5,372,678 A | 12/1994 | Sagstetter et al. |
| 5,378,279 A | 1/1995 | Conroy |
| 5,391,245 A | 2/1995 | Turner |
| 5,394,672 A | 3/1995 | Seem |
| 5,395,685 A | 3/1995 | Seth et al. |
| 5,397,631 A | 3/1995 | Green et al. |
| 5,410,852 A | 5/1995 | Edgar et al. |
| 5,425,985 A | 6/1995 | Irvin |
| 5,425,986 A | 6/1995 | Guyette |
| 5,428,931 A | 7/1995 | Ragsdale |
| 5,437,934 A | 8/1995 | Witt et al. |
| 5,443,603 A | 8/1995 | Kirkendall |
| 5,461,839 A | 10/1995 | Beck |
| 5,465,547 A | 11/1995 | Jakel |
| 5,475,961 A | 12/1995 | Menchetti |
| 5,477,617 A | 12/1995 | Guy |
| 5,482,550 A | 1/1996 | Strait |
| 5,501,050 A | 3/1996 | Ruel |
| 5,505,030 A * | 4/1996 | Michalcewiz et al. .......... 52/249 |
| 5,511,316 A | 4/1996 | Fischer et al. |
| 5,517,795 A | 5/1996 | Doke |
| 5,522,926 A | 6/1996 | Richard et al. |
| 5,526,627 A | 6/1996 | Beck |
| 5,531,824 A | 7/1996 | Burkes et al. |
| 5,545,297 A | 8/1996 | Andersen et al. |
| 5,557,903 A | 9/1996 | Haddock |
| 5,561,173 A | 10/1996 | Dry |
| 5,564,233 A | 10/1996 | Norton |
| 5,564,245 A | 10/1996 | Rademacher |
| 5,565,026 A | 10/1996 | Hense et al. |
| 5,580,378 A | 12/1996 | Shulman |
| 5,580,409 A | 12/1996 | Andersen et al. |
| 5,598,671 A | 2/1997 | Ting |
| 5,603,758 A | 2/1997 | Schreifels, Jr. et al. |
| 5,617,685 A * | 4/1997 | Meier et al. ................. 52/223.8 |
| 5,617,690 A | 4/1997 | Gibbs |
| 5,622,556 A | 4/1997 | Shulman |
| 5,631,097 A | 5/1997 | Andersen et al. |
| 5,634,314 A | 6/1997 | Champagne |
| 5,648,144 A | 7/1997 | Maurer et al. |
| 5,651,227 A | 7/1997 | Anderson |
| 5,661,939 A | 9/1997 | Coulis et al. |
| 5,673,489 A | 10/1997 | Robell |
| 5,673,529 A | 10/1997 | Treister et al. |
| 5,675,955 A | 10/1997 | Champagne |
| 5,692,345 A | 12/1997 | Mogaki et al. |
| 5,694,727 A | 12/1997 | Dobija |
| 5,697,189 A | 12/1997 | Miller et al. |
| D388,884 S | 1/1998 | Karnoski |
| 5,714,002 A | 2/1998 | Styron |
| 5,718,758 A | 2/1998 | Breslauer |
| 5,718,759 A | 2/1998 | Stav et al. |
| 5,724,783 A | 3/1998 | Mandish |
| 5,725,652 A | 3/1998 | Shulman |
| 5,729,946 A | 3/1998 | Beck |
| 5,732,520 A | 3/1998 | Maietta |
| 5,735,092 A | 4/1998 | Clayton et al. |
| 5,736,594 A | 4/1998 | Boles et al. |
| 5,741,844 A | 4/1998 | Nass et al. |
| 5,743,056 A | 4/1998 | Balla-Goddard et al. |
| 5,749,187 A | 5/1998 | Umehara et al. |
| 5,768,841 A | 6/1998 | Swartz et al. |
| 5,791,109 A | 8/1998 | Lehnert et al. |
| 5,802,790 A | 9/1998 | Lamont et al. |
| 5,817,262 A | 10/1998 | Englert et al. |
| 5,842,280 A | 12/1998 | Robell |
| 5,848,508 A | 12/1998 | Albrecht |
| 5,848,509 A | 12/1998 | Knapp et al. |
| 5,857,303 A | 1/1999 | Beck et al. |
| 5,878,543 A | 3/1999 | Mowery |
| 5,887,403 A | 3/1999 | Beck |
| 5,891,374 A | 4/1999 | Shah et al. |
| 5,916,095 A | 6/1999 | Tamlyn |
| 5,924,213 A | 7/1999 | Lee |
| 5,928,777 A | 7/1999 | Cox et al. |
| 5,935,699 A | 8/1999 | Barber |
| 5,945,208 A | 8/1999 | Richards et al. |
| 5,946,870 A | 9/1999 | Bifano et al. |
| 5,946,876 A | 9/1999 | Grace, Sr. et al. |
| 5,950,319 A | 9/1999 | Harris |
| 5,968,257 A | 10/1999 | Ahrens |
| 5,979,135 A | 11/1999 | Reeves |
| 5,987,838 A | 11/1999 | Beck |
| 6,000,185 A | 12/1999 | Beck et al. |
| 6,012,255 A | 1/2000 | Smid et al. |
| 6,018,924 A | 2/2000 | Tamlyn |
| 6,026,616 A | 2/2000 | Gibson |

| | | | | | | |
|---|---|---|---|---|---|---|
| 6,029,415 A | 2/2000 | Culpepper et al. | 6,516,580 B1 | 2/2003 | Maietta |
| 6,030,447 A | 2/2000 | Naji et al. | 6,526,717 B2 | 3/2003 | Waggoner et al. |
| 6,046,269 A | 4/2000 | Nass et al. | 6,539,643 B1 | 4/2003 | Gleeson |
| 6,049,987 A | 4/2000 | Robell | 6,550,203 B1 | 4/2003 | Little |
| 6,055,787 A | 5/2000 | Gerhaher et al. | 6,550,210 B1 | 4/2003 | Levine et al. |
| 6,063,856 A | 5/2000 | Mass | 6,551,694 B1 | 4/2003 | Imamichi et al. |
| 6,079,175 A | 6/2000 | Clear | 6,562,444 B1 | 5/2003 | Gleeson et al. |
| 6,084,011 A | 7/2000 | Lucero et al. | 6,572,697 B2 | 6/2003 | Gleeson et al. |
| 6,093,473 A | 7/2000 | Min | 6,610,358 B1 | 8/2003 | Williams et al. |
| 6,110,525 A | 8/2000 | Stoddard | 6,626,947 B2 | 9/2003 | Lester et al. |
| 6,122,876 A | 9/2000 | Bado et al. | 6,676,745 B2 | 1/2004 | Merkley et al. |
| 6,122,877 A | 9/2000 | Hendrickson et al. | 6,679,011 B2 | 1/2004 | Beck et al. |
| 6,134,855 A | 10/2000 | Beck | 6,689,451 B1 | 2/2004 | Peng et al. |
| 6,138,430 A | 10/2000 | Van Acoleyen et al. | 6,699,576 B2 | 3/2004 | Peng et al. |
| 6,139,620 A | 10/2000 | Suzuki et al. | D489,137 S | 4/2004 | Eichner et al. |
| 6,145,255 A | 11/2000 | Allaster | D489,463 S | 5/2004 | Barnett |
| 6,161,353 A | 12/2000 | Negola et al. | 6,737,008 B2 | 5/2004 | Gilbert et al. |
| 6,161,354 A | 12/2000 | Gilbert et al. | D492,424 S | 6/2004 | Barnett |
| 6,164,032 A | 12/2000 | Beck | 6,760,978 B2 | 7/2004 | Gleeson |
| 6,164,214 A | 12/2000 | Smorgon et al. | 6,901,713 B2 | 6/2005 | Axsom |
| 6,170,212 B1 | 1/2001 | Suchyna et al. | 6,913,819 B2 | 7/2005 | Wallner |
| 6,170,214 B1 | 1/2001 | Treister et al. | 6,941,720 B2 | 9/2005 | DeFord et al. |
| 6,170,215 B1 | 1/2001 | Nasi | 7,028,436 B2 | 4/2006 | Bezubic, Jr. |
| 6,176,920 B1 | 1/2001 | Murphy et al. | 7,089,709 B2 | 8/2006 | Waggoner |
| 6,195,952 B1 | 3/2001 | Culpepper et al. | 7,191,570 B2 | 3/2007 | Eaton |
| 6,226,947 B1 | 5/2001 | Bado et al. | 7,325,325 B2 | 2/2008 | Gleeson |
| 6,276,107 B1 | 8/2001 | Waggoner et al. | 7,713,615 B2 | 5/2010 | Black et al. |
| 6,277,189 B1 | 8/2001 | Chugh | 2001/0047741 A1 | 12/2001 | Gleeson et al. |
| 6,290,769 B1 | 9/2001 | Carkner | 2002/0100249 A1 | 8/2002 | Peng et al. |
| 6,295,777 B1 | 10/2001 | Hunter et al. | 2002/0139082 A1 | 10/2002 | DeFord et al. |
| 6,298,626 B2 | 10/2001 | Rudden | 2003/0046891 A1 | 3/2003 | Colada et al. |
| 6,308,486 B1 | 10/2001 | Medland et al. | 2003/0054123 A1 | 3/2003 | Black et al. |
| 6,315,489 B1 | 11/2001 | Watanabe | 2003/0056458 A1 | 3/2003 | Black et al. |
| 6,316,087 B1 | 11/2001 | Lehan | 2003/0089061 A1 | 5/2003 | DeFord et al. |
| 6,319,456 B1 | 11/2001 | Gilbert et al. | 2003/0172606 A1 | 9/2003 | Anderson |
| 6,324,807 B1 | 12/2001 | Ishiko | 2003/0200721 A1 | 10/2003 | Gleeson et al. |
| 6,346,146 B1 | 2/2002 | Duselis et al. | 2004/0103610 A1 | 6/2004 | Axsom |
| 6,357,193 B1 | 3/2002 | Morris | 2004/0163331 A1 | 8/2004 | Peng et al. |
| 6,365,081 B1 | 4/2002 | Beck | 2005/0000172 A1 | 1/2005 | Anderson |
| 6,367,208 B1 | 4/2002 | Campbell et al. | 2005/0138865 A1 | 6/2005 | Gleeson et al. |
| 6,367,220 B1 | 4/2002 | Krause et al. | 2005/0210790 A1 | 9/2005 | Wallner |
| 6,415,574 B2 | 7/2002 | Beck | 2005/0262799 A1 | 12/2005 | Gleeson et al. |
| 6,421,973 B1 | 7/2002 | Gregg et al. | 2005/0284339 A1 | 12/2005 | Brunton et al. |
| 6,423,167 B1 | 7/2002 | Palmer et al. | 2006/0010800 A1 | 1/2006 | Bezubic, Jr. |
| 6,425,218 B1 | 7/2002 | Doyon et al. | 2008/0022627 A1 | 1/2008 | Gleeson |
| 6,430,885 B1 | 8/2002 | Ito | 2008/0104918 A1 | 5/2008 | Gleeson |
| 6,488,792 B2 | 12/2002 | Mathieu | 2008/0163582 A1 | 7/2008 | Trevethick |
| 6,510,667 B1 | 1/2003 | Cottier et al. | | | |
| 6,514,624 B2 | 2/2003 | Takemoto | * cited by examiner | | |

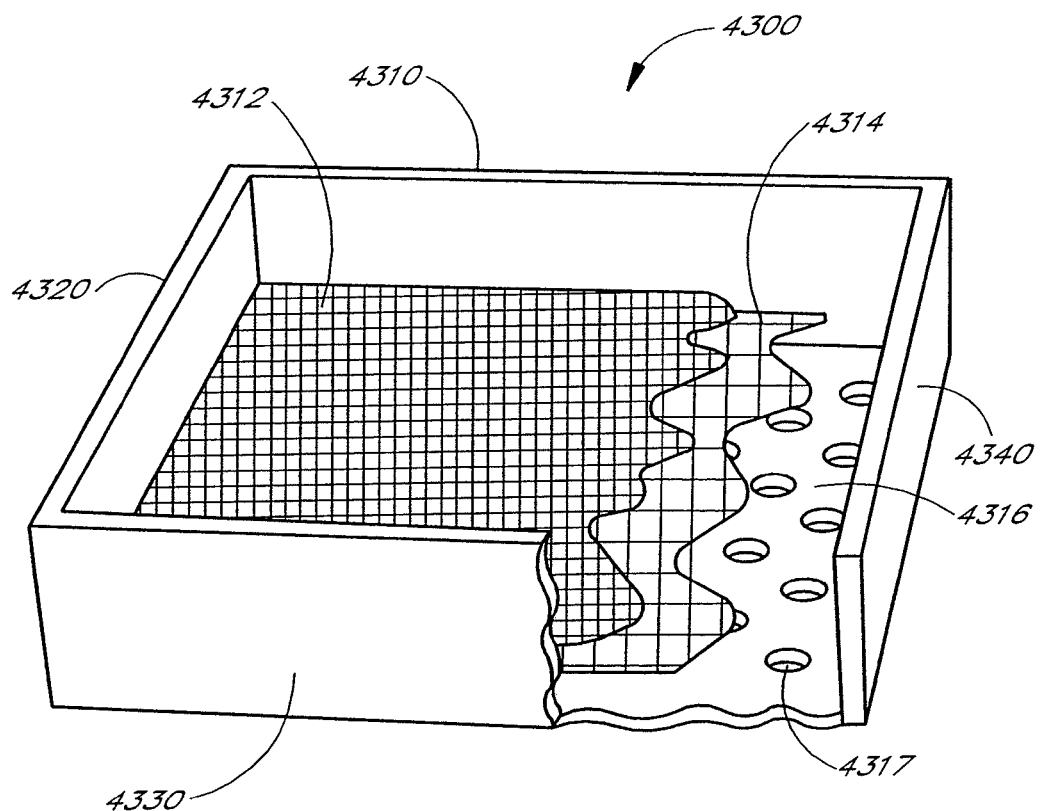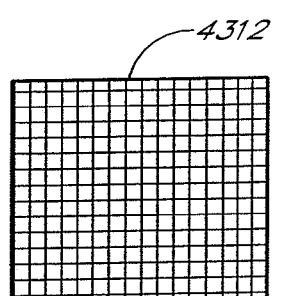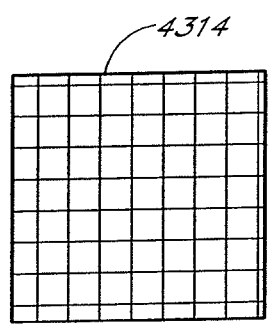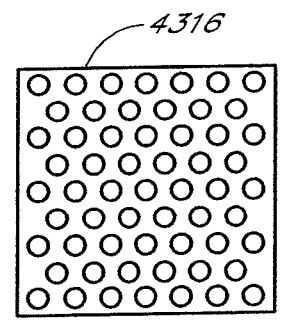
FIG. 18

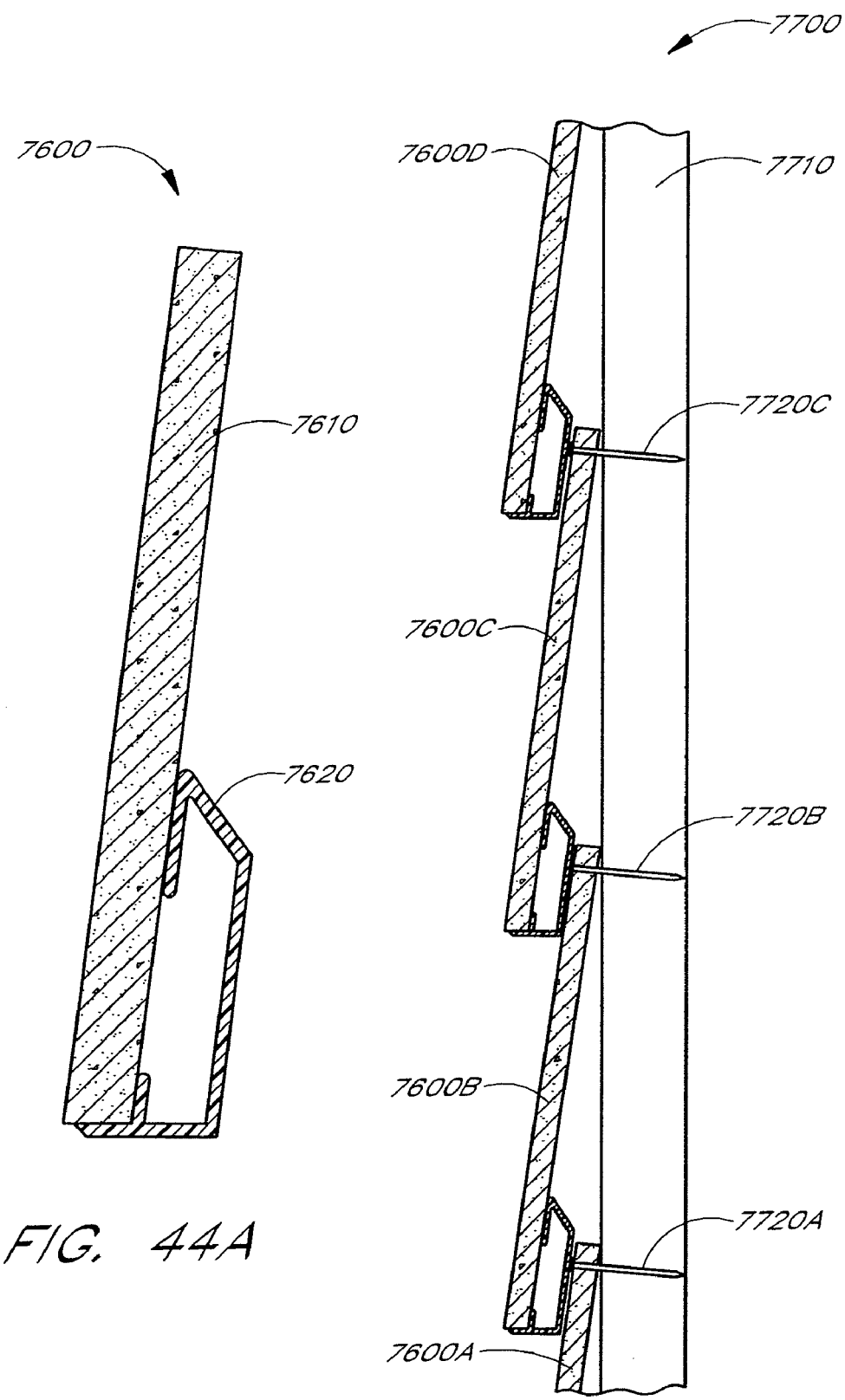

REINFORCED FIBER CEMENT ARTICLE AND METHODS OF MAKING AND INSTALLING THE SAME

PRIORITY INFORMATION

This application is a divisional of U.S. application Ser. No. 10/117,401, filed Apr. 3, 2002, allowed, which claims priority to U.S. Provisional Patent Application No. 60/281,195, filed Apr. 3, 2001, the entirety of which are incorporated by reference herein.

BACKGROUND OF THE INVENTION

1. Field of the Invention

This invention in one embodiment relates to a fiber cement article that is locally reinforced by a material to assist in the handleability, performance and durability of the article.

2. Description of the Related Art

The market for fiber cement siding for new home construction and home refurbishing markets in the United States is presently strong, due in large part to favorable economic conditions and the durability of fiber cement.

Siding materials have traditionally been either solid or thin resilient materials. Vinyl and aluminum are two common examples of thin resilient siding materials. Vinyl siding is a thin resilient material that is shaped into the desired profile in a plastic state after extrusion of a compounded hot melt. Vinyl siding is commonly about 0.040 to 0.080 inches thick. However, vinyl presents problems as a plank material because it has a high rate of thermal expansion, which is undesirable for a product exposed to a wide range of temperatures. Aluminum siding is another example of a thin shaped product and typically has a thickness of about 0.010 to 0.030 inches. The vinyl and aluminum profiles often have an installed shape similar to traditional solid wood siding, but often include an interlocking feature to assist with the ease of installation. The interlocking profiles are usually engaged in an upward motion against gravity.

It is aesthetically pleasing for siding materials in the form of horizontal planks or laps to have a strong "shadow line" or perceived thickness such that individual planks can be discerned from a distance. This is evident from the design trends of thin vinyl or aluminum siding panels, which can be molded or extruded to give the appearance of thick, individual wood planks.

There are a number of different solid siding materials that are used in the construction and refurbishing industry. Wood siding, hardboard and fiber cement siding are examples of commonly used solid siding materials. Wood tends to lack durability and is susceptible to burning and termite attack and is not sufficiently durable in moist environments, e.g., it rots upon prolonged exposure to water. The siding shapes of solid materials are usually formed by saw cutting, machining or routing from a starting rectangular shape. A thick shadow-line or thick bottom edge of a solid siding is usually attained by starting with a solid rectangular shape of at least the thickness of the finished bottom edge of the siding. The solid siding is then machined or cut into the desired structure While panels and planks made from wood, wood composites, and fiber-reinforced cementitious materials are inherently solid and thick, further increases in thickness of the fiber cement are not practical for reasons of material cost, weight and handling characteristics of long siding planks. Rather, an assembly that allows the use of less material while maintaining perceived thickness when installed would be beneficial.

Thus, what is needed is a more efficient design of siding with a thick bottom edge to create the traditional deep shadow line with a more efficient use of material.

In addition, what is needed is a way to form a vertically-installed stackable siding plank that secures the bottom edge from lateral forces and has hidden nailing for improved aesthetics under the lap of the siding planks. In addition, what is needed is a stackable siding as described above with the exterior durability of fiber cement that is more easily machined than traditional medium density fiber cement. Furthermore, what is needed is a siding that installs with ease, maintains a constant gauge of plank rows along the length of the siding and between rows of siding and preferably resists penetration of wind driven rain through the plane of the siding.

The handleability of a siding plank is a combination of the weight, stiffness, and elasticity of the plank. Although a siding plank should be self-supporting when balanced flat upon a support point, thin fiber cement siding planks manufactured by traditional methods can be brittle and break during manual transport. While thin fiber cement siding planks could be transported by handling the edges of the planks, this slows the installation process. Therefore, what is needed is a way to improve the handleability of thin fiber cement planks.

Resistance to the effects of water and biological attack, low density, and good dimensional stability make fiber cement useful in residential and commercial building applications. However, the tensile strength of fiber cement is low relative to other building materials such as steel, aluminum, wood, and some engineered plastics. The range of application for fiber cement products could be greatly extended if fiber cement articles could be reinforced in key areas where additional tensile or impact strength is required for a specific application. What is needed is a way to provide localized reinforcement to fiber cement articles.

SUMMARY OF THE INVENTION

In one preferred embodiment of the present invention, a reinforced article is provided that is comprised of a piece of fiber cement having a front surface and a back surface and a reinforcing fixture bonded along a length of at least one of the front surface and the back surface. Attaching the reinforcing fixture to the piece of fiber cement improves the strength of the fiber cement article and improves the durability and handleability of thin pieces of fiber cement. The reinforcing fixture can include, but is not limited to, a metal foil, woven metal mesh, polymer film, polymer fabric mesh, or a mesh nailing skirt. The reinforcing fixture preferably has a higher tensile strength than that of the fiber cement, and in one embodiment, is made of a less rigid material than that of the fiber cement. Preferably the reinforcing fixture is bonded to the fiber cement piece by a high shear adhesive. In one embodiment, wherein the fiber cement article is provided with a foil backing bonded to it using a durable high-shear adhesive, the foil backing functions as a heat reflecting fixture. In another embodiment, a multiple lap fiber cement article is provided that includes at least one fiber cement plank bonded in a overlapping fashion to another fiber cement plank using a durable, high-shear adhesive layer.

A further brief description of other embodiments that may be used in conjunction with the foregoing embodiments is presented below.

In one aspect, a fiber cement (FC) siding plank having an interlocking feature is provided that allows siding planks to be stacked in a manner that creates a uniform and deep shadow line and secures the planks against lateral forces by blind nailing instead of face nailing. Preferably, the interlocking feature also helps set the horizontal gauge of the exposed plank face and allows for leveling of the planks during installation.

In one embodiment, the interlocking feature of the FC siding plank comprises matching lock and key cutouts on opposite ends of the plank. Preferably, the lock and key use gravity to help mate two fiber cement siding planks tightly and uniformly so as to maintain consistent gauge and overlap and create a uniform shadow line without face nailing. The plank is secured from lateral forces by hidden nailing under the lap of the adjacent plank. Preferably, the FC siding plank is low-density and can be easily machined.

Furthermore, the siding plank may include a built-in fixing indicator that allows the installer to quickly determine the proper region to affix the nail. Preferably, the fixing indicator is formed on the FC siding plank using an extrusion process so that the fixing indicator is formed cost-effectively along with the FC siding plank. The fixing indicator ensures proper placement of the fixing device within a predetermined nailing region. The predetermined nailing region on the siding plank is preferably the overlap region with the adjacent plank so that the nail or other fastener can be hidden from view. Moreover, fixing voids or hollows can also be formed beneath the fixing indicator to relieve stress that can lead to break out and cracking of the product when nailed or fastened to wall framing.

In another embodiment, the interlocking feature of a FC siding plank comprises an oversized "V" style lock and a key tip. The lock can be separately attached to the FC plank or integrally formed as part of the plank. Preferably, the siding plank interlocks with an adjacent plank by locking the oversized "V" style lock into the key tip on an upper edge of the adjacent plank. The lock maintains a constant gauge and overlap between the planks so as to create a uniform and thick shadow line. The oversized "V" style lock design allows for non-uniform flatness of a framed wall and maintains a constant gauge of plank rows along the length of the siding and between rows of siding. The plank is secured from lateral forces by hidden nailing under the lap of the plank. Preferably, the lock also comprises compressible regions, which allows the planks to be easily interlocked during installation and provides lateral compensation for non-planar mounting surfaces. The compressible material can also act as a seal against wind and rain.

In another embodiment, the interlocking feature of a siding plank comprises a square lock system. Preferably, the square lock system comprises a square lock, a butt piece, and an overlap guide. It can be appreciated that the square lock system, as well as the other systems described herein, can be applied to a variety of siding planks, including but not limited to FC planks. Preferably, the square lock is configured to fit over an upper edge of an adjacent plank in a manner such that a small gap may be maintained between the lock and the upper edge of the adjacent plank to accommodate variable gauge height. The square lock helps level the planks during installation and allows for small variations in the siding installed gauge while reducing lateral movement of the planks. The square lock can be separately bonded to the siding plank or formed as an integral part of the FC siding plank. Preferably, the square lock has one or more dove tail grooves to enhance the bonding between the lock and the siding plank. The square lock design preferably resists penetration of wind driven rain through the plane of the siding.

Furthermore, the siding plank of one preferred embodiment may also include an apparatus for reducing capillary action between adjacent overlapping planks. Preferably, the apparatus comprises a capillary break formed by adding to or indenting the material of the interlocking device of the siding plank assembly. Preferably, the capillary break is placed between adjacent siding planks to stop the rise of water in the plank overlap region and thus provide additional moisture protection to the exterior barrier wall and siding interior without leaving a gap that is attractive to insects.

In another aspect, a lightweight, two-piece FC siding plank is provided that produces a uniform and thick shadow line when stacked with other planks. The two-piece FC siding plank generally comprises a main plank section and a FC butt piece that is bonded to the main plank section and extends partially over a back surface of the main plank section. The butt end piece reinforces the main plank section to increase the overall rigidity of the plank. The thickness of the butt piece also helps to create a deeper shadow line on adjacent planks. Preferably, the butt piece is separately bonded to the main plank section so that the enhanced shadow line is created without having to machine a single rectangular FC material to form the equivalent structure.

The adhesive used to bond the two pieces together can be polymeric, cementitious, organic or inorganic or a combination thereof such as polymer modified cement. The adhesive may also have fiber added to increase the toughness of the adhesive joint. In one embodiment, the main plank section is bonded to the butt piece using a fast setting, reactive hot-melt polyurethane adhesive. Preferably, the polymeric adhesive establishes a very quick bond which enables a machining operation to follow the bonding operation in a single manufacturing line rather than having to wait for the adhesive to set and then machine in a separate operation.

In another embodiment, the main plank is adhered to the butt piece using a cementitious adhesive that is compatible with fiber cement materials and thus can be bonded to the FC main plank while in a green state and co-cured with the FC material to form a durable bond. Preferably, a pressure roller system or a hand roller is used to bond the main siding plank to the butt piece. A hydraulic press can be used to bond the two pieces if the siding plank or butt piece has uneven surface. Additionally, in other embodiments, the two-piece FC siding plank can also be formed by extrusion in which a single piece of FC plank with an integrally formed butt piece is formed. Furthermore, the main plank section and the butt piece can have hollow centers to further reduce the weight of the siding plank.

In another embodiment, a two-piece FC siding plank includes an interlocking feature that mates two FC siding planks tightly and uniformly without requiring a visible nail or other fastener to fasten the overlapping region of the two planks. Preferably, the interlocking feature comprises a key formed on the main plank and a lock formed on the butt piece. The key fits into the lock and, with the help of gravity, interlocks adjacently mounted planks. The lock and key set the gauge of the exposed plank face without requiring frequent measuring.

In another aspect, an adhesive composition is provided that is used to bond cementitious materials, such as fiber cement planks. Preferably, the adhesive composition includes cement, silica, a thickener, and water, and may include organic or inorganic fibers. The adhesive composition can be used to bond flat sheet, plank or profiled cementitious bound building products. The adhesive can also be used to bond different density cementitious materials together to form a composite panel. In one embodiment, the adhesive is used to bond two fiber cement siding planks together. Preferably, the adhesive is applied to the fiber cement planks in a green state so that the FC and FC adhesive cure together. Preferably, the adhesive does not deteriorate under autoclave processing conditions and thus can be used to bond FC planks prior to autoclaving.

In another aspect, a siding plank having a spline is provided that increases the handling, strength and stiffness of the siding plank and produces a uniform and thick shadow line. The spline can be a shaped piece of one or more materials, and is preferably made of lightweight materials such as plastic, foamed plastic, metal or fiber reinforced plastic. The spline is preferably attached to the main body of the siding plank to add function and/or aesthetics to the plank. Preferably, the spline improves the handleability and toughness of the siding plank. With the spline, the thickness of a medium density FC plank can be reduced without sacrificing handleability. For instance, FC planks that are about ¼ to ³⁄₁₆ inch thick can still be handleable without breaking at 16 ft length when the spline is attached to the plank. This provides a lightweight FC siding plank of increased length that is easier to handle and requires less material to manufacture.

In one embodiment, the spline comprises a butt and a lock and is designed for use in combination with a FC plank. Preferably, the butt is thick so that a deep shadow line can be produced when the planks are stacked together. Preferably, the lock is an angled lock that is configured to help secure the plank to adjacent planks in the stack. Preferably, the spline is bonded to the to the FC plank with an adhesive and the spline has one or more dovetail grooves in the adhesive surface area to strengthen the bond between the spline and the plank. In another embodiment, the spline has an overlap guide that helps set the gauge of the exposed plank face. However, it can be appreciated that the spline does not have to include a lock, an overlap guide or dovetail grooves.

It will be appreciated that the preferred embodiments of this invention are not limited to siding planks or interlocking features to mount one plank adjacent another. Thus, in one embodiment a fiber cement article, which may or may not be a siding lank, is provided having a reinforcing fixture adhered thereto. The reinforcing fixture provides localized reinforcement to areas of the article that requires additional strength and/or support.

These and other objects and advantages will become more fully apparent from the following description taken in conjunction with the accompanying drawings.

BRIEF DESCRIPTION OF THE DRAWINGS

FIG. 18 shows a dewatering apparatus containing mesh screens and a metal plate in accordance with the method of FIG. 16.

FIG. 44A shows a cross-sectional view of a two-piece siding plank assembly in accordance with another embodiment of the present invention.

FIG. 44B shows a cross-sectional view of the two-piece siding system of FIG. 44A affixed to a mounting surface.

DETAILED DESCRIPTION OF THE PREFERRED EMBODIMENTS

Figure 1A:
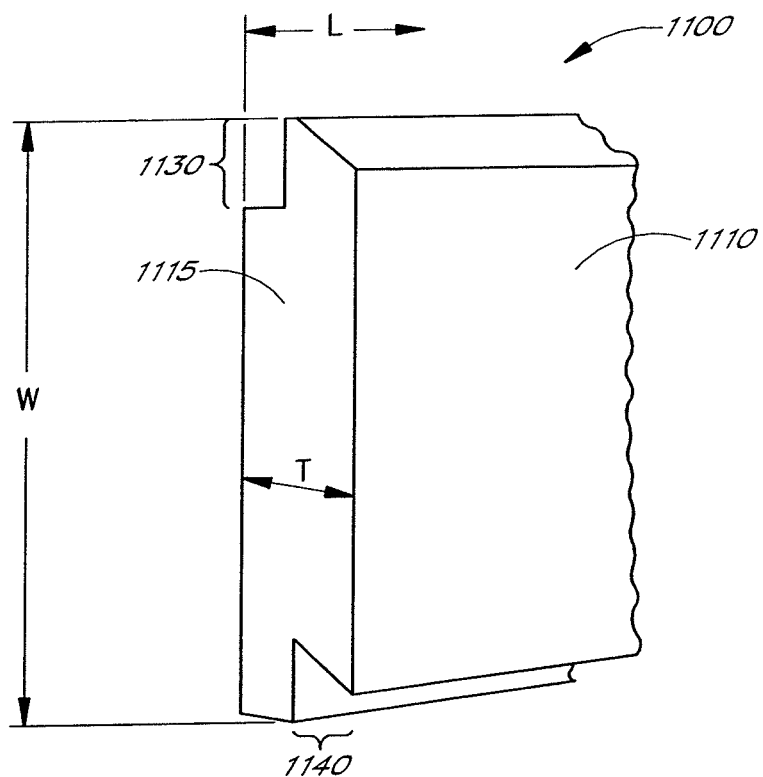
FIG. 1A shows an isometric view of one embodiment of a FC siding plank with a back surface visible.

Certain preferred embodiments of the invention generally relate to lightweight siding plank assemblies that are structured to secure the siding planks against lateral forces without face nailing and to create a uniform and deep shadow line. In some of these embodiments, the shape of the plank is achieved by adding a second material to a base plank to add function and/or aesthetics, such as a thick bottom edge and/or interlock. These and other features and functionality of the preferred embodiments are described in detail below.

Unlike other siding materials, fiber cement ("FC") materials have preferred qualities of non-combustibility, strength, and durability. Low-density FC has additional advantages over higher density FC because the material is more easily machined, and its decreased weight facilitates handling and installation. Manufacture of siding planks made of low-density and medium-density FC material, as described in Australian Patent No. AU 515151 and U.S. Pat. No. 6,346,146, the entirety of each of which is hereby incorporated by reference, having additional functional and aesthetic features could result in a more marketable siding plank.

One siding design, which uses a lock system, allows planks to be locked into one another without requiring extensive measurement to maintain gauge (the visible vertical distance between planks) and overlap (the vertical distance the plank overhangs the plank below) during installation. Although this lock design has many inherent advantages, this design affords little to no flexibility when being installed on a non-planar wall. Therefore, embodiments described below include a locking plank that allow the exterior siding to be installed on non-planar walls.

Moreover, certain lock designs do not function satisfactorily for small variations in gauge that are sometimes desired by installers, especially when trying to level-out inaccuracies in framing and installation around window and door openings. As a result of poorly fitted V-type lock and key siding, the plank may subsequently experience lateral movement (flapping) when subjected to wind. Rather, a lock design that allows for small variations in gauge while preventing lateral movement (flapping) when subjected to wind would be beneficial.

Furthermore, functional performance enhancements made to existing FC siding planks will bring great value to the siding plank market. For example, an alignment feature or fixing indicator, described below, adds value to FC siding planks by facilitating the installation process. Also, the appearance of nailable extruded products on the market has brought with it the need to provide nailing positions on the product to ensure proper and speedy installation. Accordingly, there is a sound business motivation to find a cost efficient way to add features such as affixing indicators to FC siding planks. Moreover, what is needed is also a way to form a stackable siding plank that secures the bottom edge from lateral forces and allows for hidden nailing under the lap of the siding planks, as described below.

Although the preferred embodiments of the present invention describe the use of fiber cement planks, it will be appreciated that other materials may be used as well. It will also be appreciated that the invention is not limited only to siding planks, but may have use in other applications as well.

I. Low-Density Siding Plank with Locking Features and Method of Installing the Same At least one embodiment relates to a low density plank with locking features and methods of installing the same. In one embodiment, the siding plank is manufactured using a process, which includes but is not limited to the Hatschek process as described in U.S. Pat. No. 6,346,146, the entirety of which is hereby incorporated by reference, to make low-density FC materials. Low density fiber cement typically has a density ranging from about 0.7 to 1.2 g/cm³, whereas medium density typically has a density of about 1.3 to 1.5 g/cm³. This embodiment includes locking features to allow siding planks to be interlocked when installed on a mounting surface (e.g., an exterior wall) as siding.

Figure 1B:
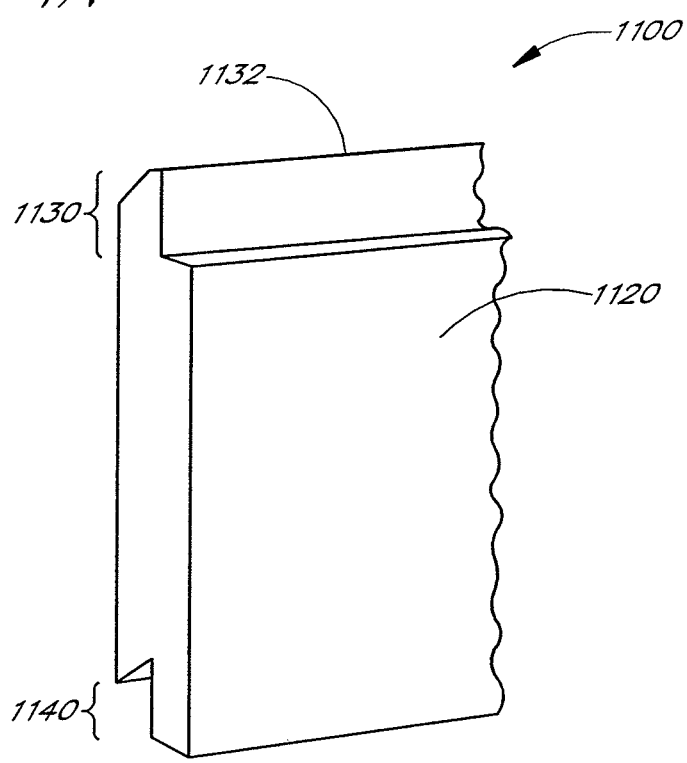
FIG. 1B shows an isometric view of FC siding plank with a front surface visible.

FIG. 1A and FIG. 1B show two isometric views of a siding plank 1100. As shown in FIG. 1A, siding plank 1100 includes a back surface 1110, an end surface 1115, a key 1130, and a lock 1140. As shown in FIG. 1B, siding plank 1100 further includes a front surface 1120. Table 1 shows preferred ranges of siding plank dimensions for this embodiment:

TABLE 1

Preferred range of siding plank dimensions

| Dimension | Range |
| --- | --- |
| Thickness T | about 3/16-1/2 inch |
| Width W | about 5-12 inches |
| Length L | about 12-16 feet |

Figure 2:
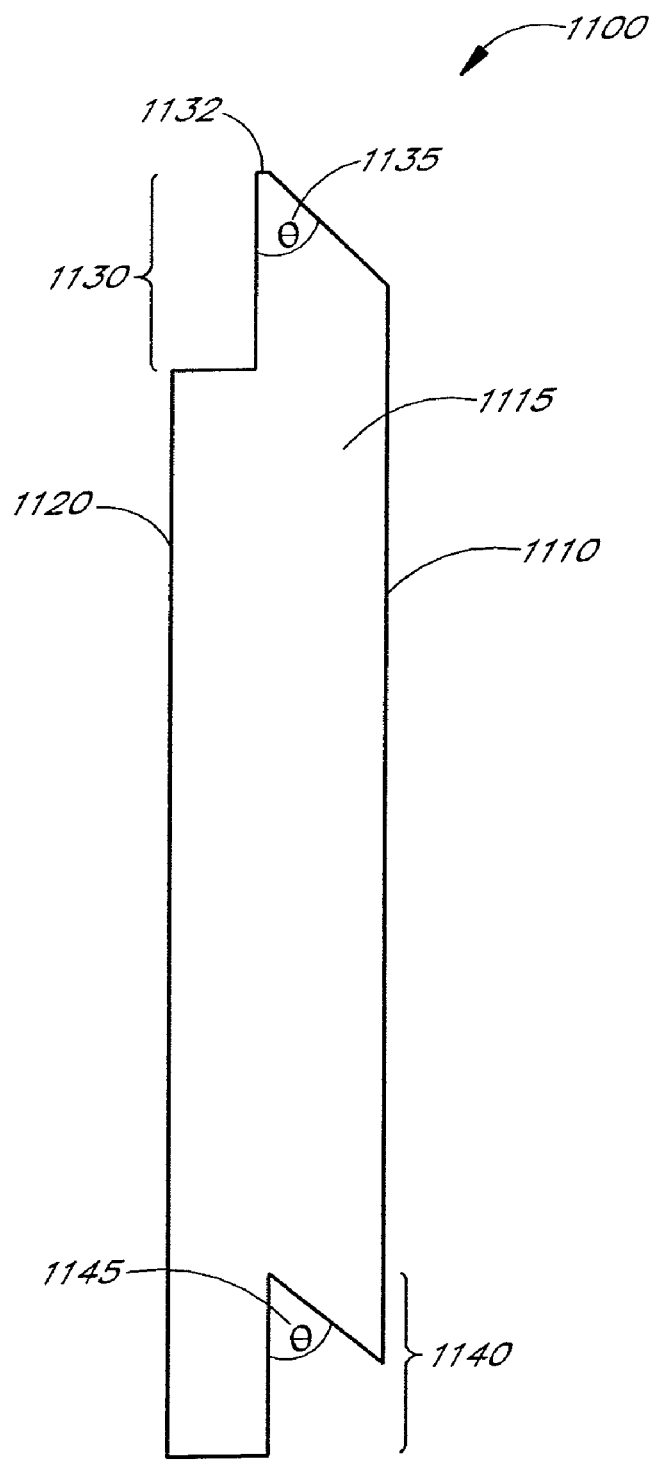
FIG. 2 shows an end view of FC siding plank.

FIG. 2 shows an end view of siding plank 1100 that further describes key 1130 and lock 1140. Specifically, key 1130 further includes a key tip 1132 and makes an angle 1135 with a vertical plane. The key tip preferably forms a tier indented in the front surface of the plank. However, it will be appreciated that the key tip need not have a tier, and may have a variety of shapes and configurations, including those described below. Lock 1140 makes an angle 1145 (θ) with a vertical plane. Angle 1135 (θ) ranges in one embodiment from about 85 degrees to 30 degrees, and is preferably about 45 degrees. Angle 1145 preferably is approximately equal to angle 1135.

A commercially available spindle molder (not shown) is used in one embodiment to machine key 1130 and lock 1140 into siding plank 1100. A spindle molder is similar to wood-cutting equipment; however, it is equipped with polycrystalline diamond (PCD) blades for improved performance in cutting FC products. Conventional machining methods for shaping FC material are used to cut the siding plank. The use of low density fiber cement is especially advantageous because it enables easy machining of the material and greater tool life. End surface 1115 is rectangular prior to machining.

Figure 3:
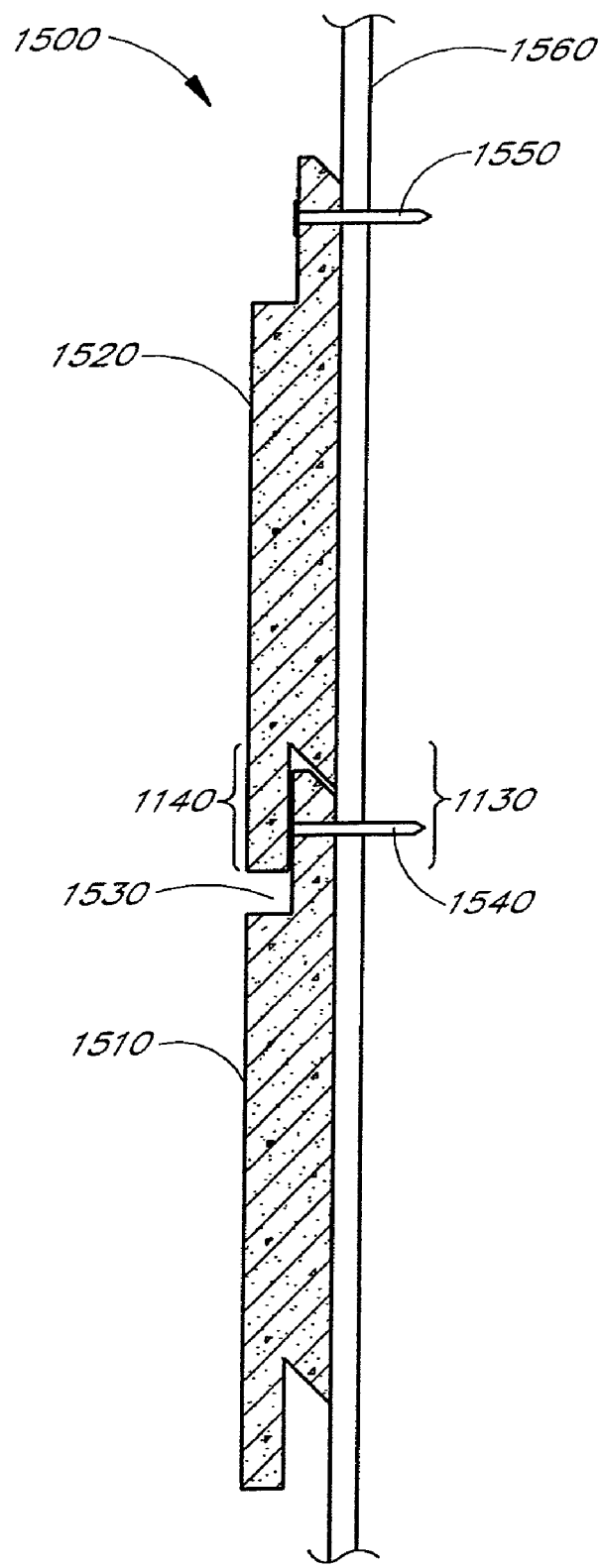
FIG. 3 shows a siding system of FC siding planks affixed to a mounting surface.

FIG. 3 shows a cross-sectional view of siding system 1500. As shown in FIG. 3, a first nail 1540 rigidly attaches a first siding plank 1510 to a mounting surface 1560, such that first nail 1540 is completely hidden by the overlap (called "blind nailing"). Mounting surface 1560 is typically a series of wall studs. Key 1130 of first siding plank 1510 is inserted into lock or overlap region 1140 of second siding plank 1520. A second nail 1550 rigidly attaches a second siding plank 1520 to mounting surface 1560. The gap 1530 created between first siding plank 1510 and second siding plank 1520 should be of a size that is aesthetically pleasing. First siding plank 1510 and second siding plank 1520 are substantially identical to siding plank 1100 shown in FIG. 1A, FIG. 1B, and FIG. 2.

Figure 4:
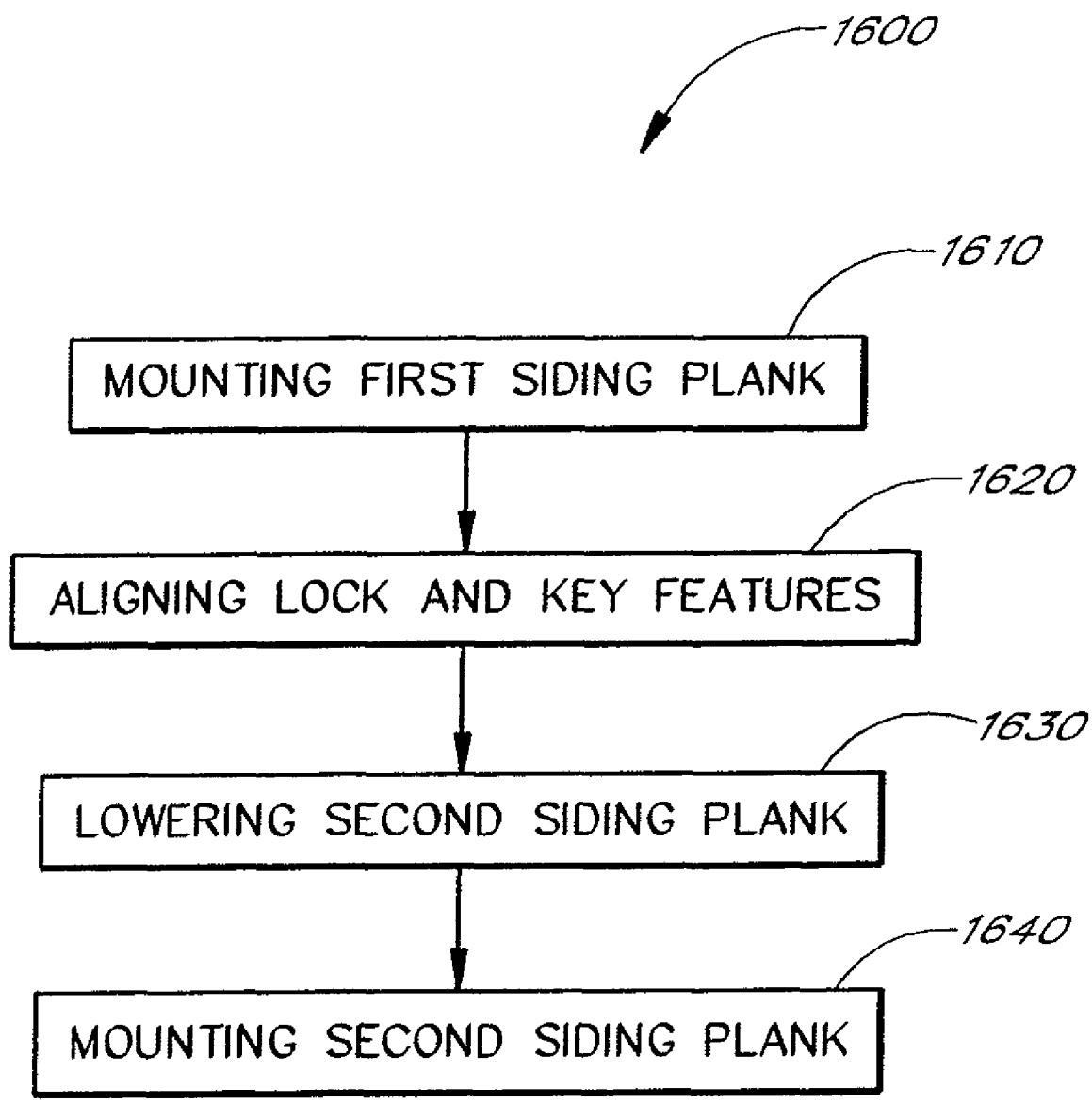
FIG. 4 shows a method of installing a siding system according to one embodiment of the present invention.

FIG. 4 shows a method 1600 of installing siding planks onto a mounting surface to form a siding system, which involves:

Mounting first siding plank 1610: First siding plank 1510 is placed against mounting surface 1560 as shown in FIG. 3. First nail 1540 is driven into first siding plank 1510 near its upper edge to rigidly attach it to mounting surface 1560.

Aligning lock and key features 1620: Second siding plank 1520 is placed against mounting surface 1560 above first siding plank 1510 such that lock 1140 of second siding plank 1520 is aligned with key 1130 of first siding plank 1510, as shown in FIG. 3.

Lowering second siding plank 1630: Second siding plank 1520 is lowered onto first siding plank 1510. As second siding plank 1520 is lowered (with the help of gravity) onto first siding plank 1510, key 1130 of first siding plank 1510 automatically engages and aligns lock 1140 of second siding plank 1520 into a locked position. In this locked position, key 1130 of first siding plank 1510 prevents second siding plank 1520 from moving under the influence of wind forces, and therefore prevents wind-induced damage. Further, the locked position fixes the gauge and overlap, and creates a uniform shadow line, as shown in FIG. 3.

Mounting second siding plank 1640. Second nail 1550 is driven into second siding plank 1520 near its upper edge to rigidly attach it to mounting surface 1560. The method is then repeated to cover the mounting surface to form a larger siding system.

The embodiment described above has several advantages over the prior art. For instance, it avoids face nailing. Because nails are often used to achieve a tight and uniform fit between two siding planks, it is aesthetically preferable to avoid face nailing because the nail head cannot be hidden when finished. Advantageously, the siding plank assembly of this embodiment provides a way to mate two FC siding planks tightly and creates a uniform shadow line without requiring a face nail to fasten the two siding planks.

In addition, another advantage is that the embodiment uses gravity during installation to obtain a secure fit between the siding planks. Conventional siding planks such as vinyl offer interlocking features that require an upward motion against the force of gravity to interlock two adjacent siding planks into place. A more natural downward motion, taking advantage of the force of gravity, facilitates installation. Advantageously, the assembly of this embodiment uses gravity to help interlock the planks.

A further advantage of this embodiment is that it allows the nail or fastener to penetrate directly through the fiber cement plank, in contrast to conventional fiber cement siding planks that are adhered indirectly to a mounting surface. Direct fastening of the fiber cement plank can occur with the fastener penetrating through the plank to attach the plank to the mounting surface.

Moreover, siding planks in the prior art are often subjected to wind forces that may separate the siding planks from their mounting surface. The embodiment described above reduces the likelihood of damage caused by wind forces.

The "shadow line" is created by the thickness of a siding plank's bottom edge, which casts a shadow on the siding plank directly below it. A uniform shadow line is aesthetically desirable, and is usually achieved by face nailing the siding planks. The embodiment described above produces a uniform shadow line between two siding planks without requiring a face nail to fasten the siding planks.

Installers of exterior siding planks balance the desire to install the siding planks quickly against the need to carefully measure the gauge and overlap for consistency. Gauge is the visible vertical distance between siding planks, and the overlap is the vertical distance that an upper siding plank overhangs a lower siding plank. The key and lock features described above make installation of the siding planks progress more quickly, because the design of the siding planks maintain a consistent gauge and overlap without the need for these properties to be measured.

It will be appreciated that the lock and key of the siding plank assembly described above is not limited to planks formed of a single piece of material. Thus, as described in further embodiments below, multiple piece siding systems may be used to form the desired aesthetic and functional aspects of the assembly.

II. Siding Planks Having an Extruded Fixing Indicator

In another embodiment, a plank is provided that has a fixing indicator and a fixing void or hollow beneath the fixing indicator. Described herein is a fiber cement product having a fixing indicator and a fixing void or hollow beneath the fixing indicator, and an apparatus for extruding an FC product having a fixing indicator. The result is an FC product that is easy to install and insures proper placement of the fixing device within a predetermined nailing region.

Figure 5:
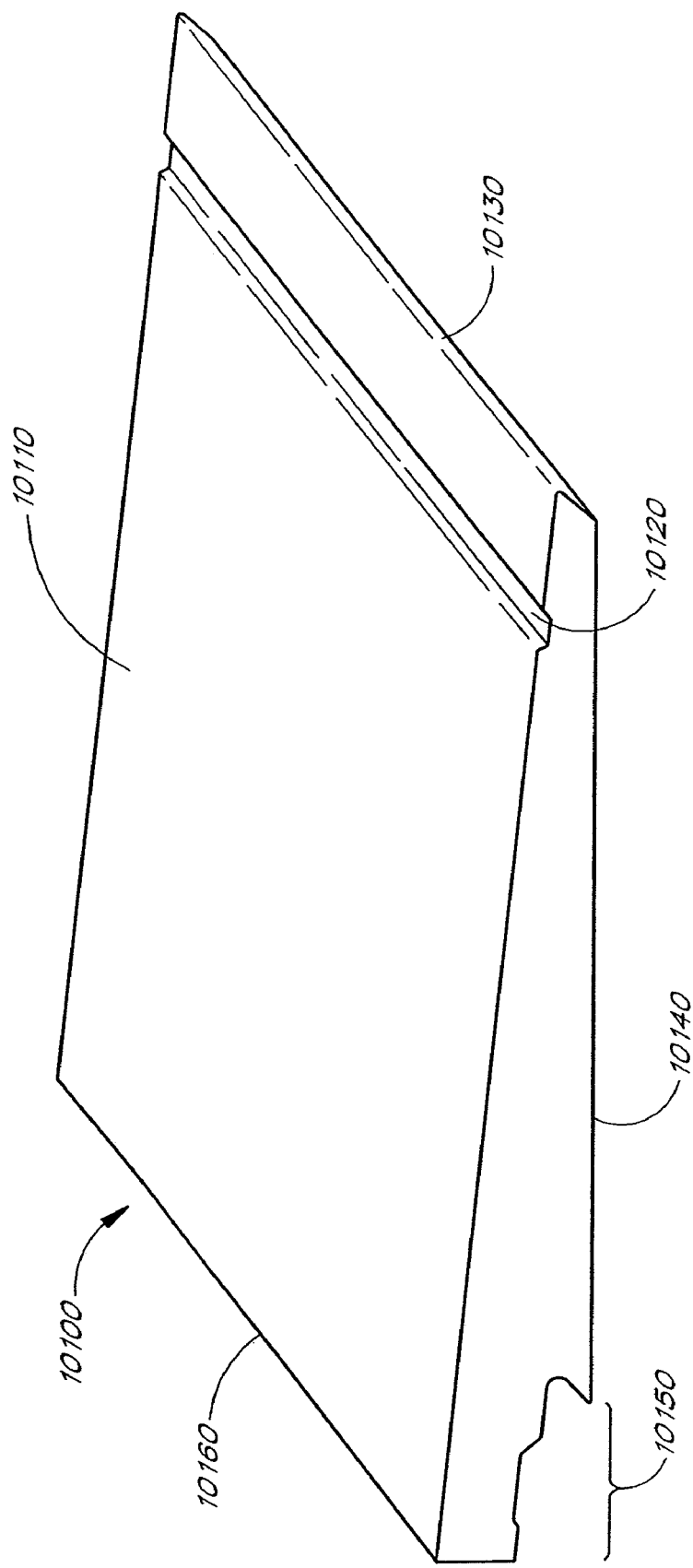
FIG. 5 shows an isometric view of a section of an FC plank in accordance with another embodiment of the present invention.
Figure 6:
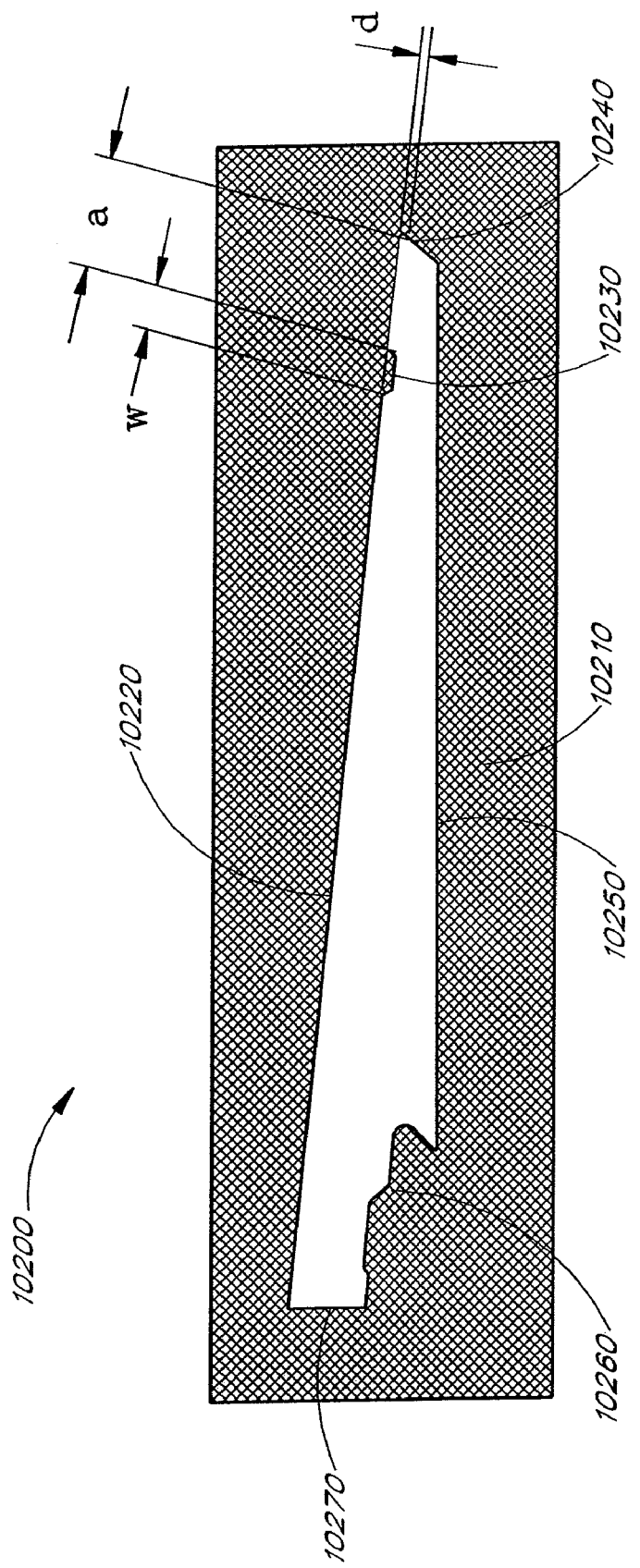
FIG. 6 shows an end view of an extrusion die used to form the plank of FIG. 5.

FIG. 5 shows an isometric view of the FC plank of a preferred embodiment. Plank 10100 includes a plank front or outer surface 10110, a fixing indicator 10120 located in proximity to a plank first or upper edge 10130, a plank back or inner surface 10140, and an overlap region or locking region 10150 located in proximity to a plank second or lower edge 10160. Plank 10100 is preferably a siding plank manufactured of FC using a conventional extrusion process. Fixing indicator 10120 is a depression in plank outer surface 10110 formed by an extrusion die as shown in FIG. 6. Likewise, overlap region 10150 is a depression in plank inner surface 10140 formed by the extrusion die shown in FIG. 6.

FIG. 6 is an end view of extrusion die 10200 of a preferred embodiment. Extrusion die 10200 includes a die outlet 10210 having a die outlet upper surface 10220, a fixing indicator dimple 10230, located in proximity to a die outlet first edge 10240, a die outlet lower surface 10250, and an overlap region form 10260 located in proximity to a die outlet second edge 10270. Extrusion die 10200 is a conventional extrusion die for use with FC mixtures. The opening of die outlet 10210 is shaped to form plank 10100 of FIG. 5 as follows:

die outlet upper surface 10220 forms plank outer surface 10110;
fixing indicator dimple 10230 forms fixing indicator 10120;
die outlet first edge 10240 forms plank first edge 10130;
die outlet lower surface 10250 forms plank inner surface 10140;
overlap region form 10260 forms overlap region 10150; and
die outlet second edge 10270 forms plank second edge 10160.
Fixing indicator dimple 10230 has a depth "d," a width "w," and is a distance "a" from die outlet first edge 10240. Preferably, the fixing indicator will comprise an embossed feature between 0.015 and 0.080 inches deep and more preferably between 0.035 and 0.055 inches deep. The indicator can be in the form of a regular or irregular geometric form or a symbol or letter that covers an area of approximately 0.0015 square inches to approximately 0.25 square inches, more preferably between 0.015 square inches and 0.0625 square inches.

Figure 7:
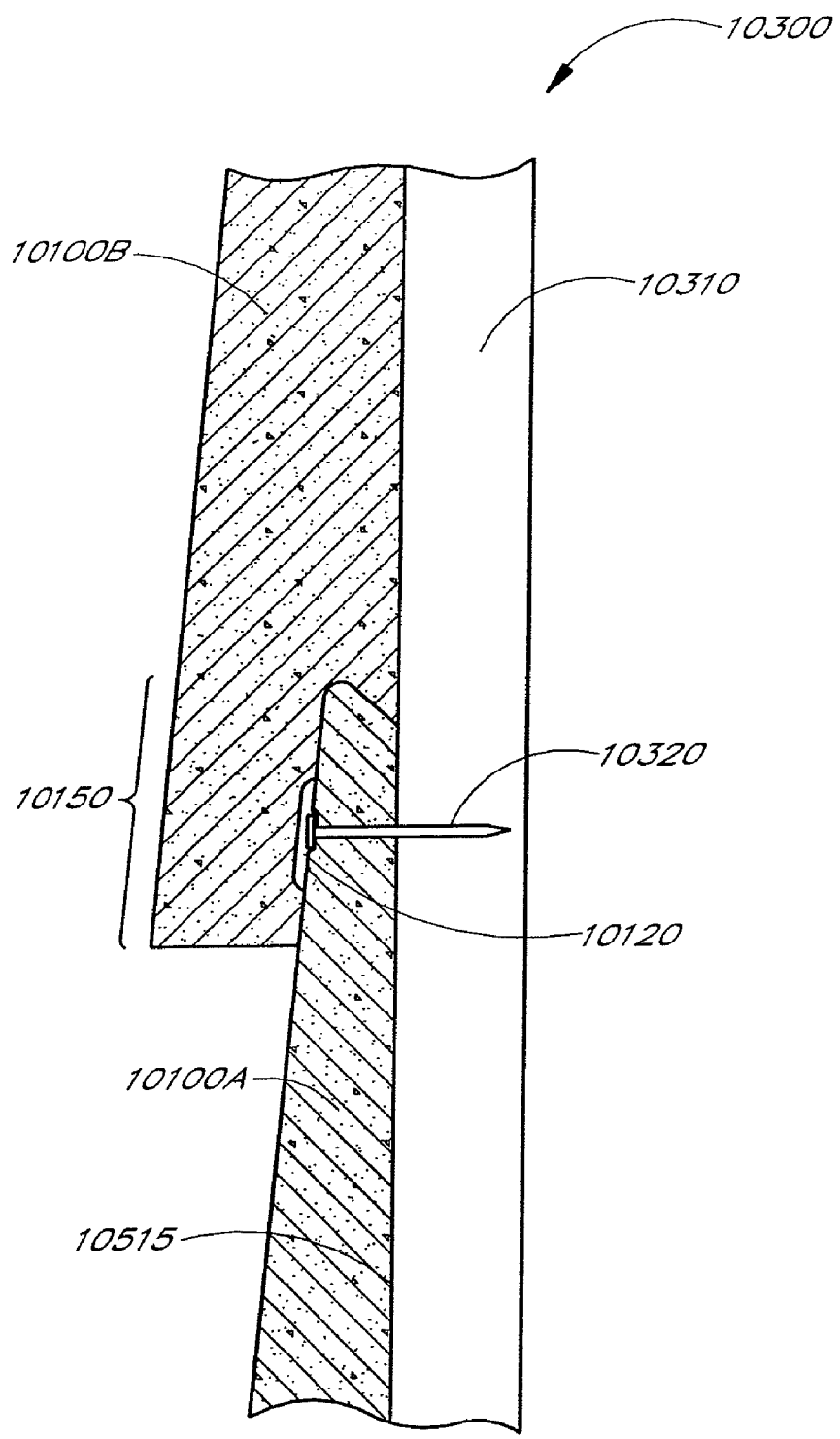
FIG. 7 shows a cross-sectional view of a siding plank system in accordance with the embodiment of FIG. 5 affixed to a mounting surface.

FIG. 7 shows a siding plank system of a preferred embodiment. Siding system 10300 includes planks 10100A and 10100B, a wall 10310, and a nail 10320. Using a conventional blind nailing technique, plank assemblies 10100A and 10100B are fixedly connected to wall 10310 using nails (or screws, or staples). FIG. 7 shows nail 10320 positioned in fixing indicator 10120 of plank 10100A and driven through plank 10100A into wall 10310. When installed, plank 10100B is positioned such that overlap region 10150 of plank 10100B covers nail 10320 and fixing indicator 10120 of plank 10100A. The first or upper edge 10130 of the plank thus forms a key tip that encases the overlap or locking region 10150.

It can be seen in FIG. 7 that fixing indicator 10120 of a preferred embodiment insures that nail 10320 is not too close to the edge of plank 10100A, thereby preventing cracking or splitting of plank 10100A. Additionally, it can been seen that fixing indicator 10120 insures that nail 10320 is well within overlap region 10150 and is therefore not visible when installed.

Another embodiment, not shown, is an FC product having a plurality of fixing indicators 10120 in various locations on the outer surface of plank 10100.

Another embodiment, not shown, is an FC product having a groove on the inner surface of plank 10100 formed by extrusion similar to fixing indicator 10120 and used for gluing plank 10100 to wall 10310 of FIG. 7.

In yet another embodiment, the fixing indicator could be formed using a post-extrusion marking technique, such as using a manual embossing in combination with a conventional Hatschek manufacturing process. Likewise, a manual embossing roller could be used in combination with a conventional extrusion process positioned in proximity to die outlet 10210 of extrusion die 10200 of a preferred embodiment.

Figure 8:
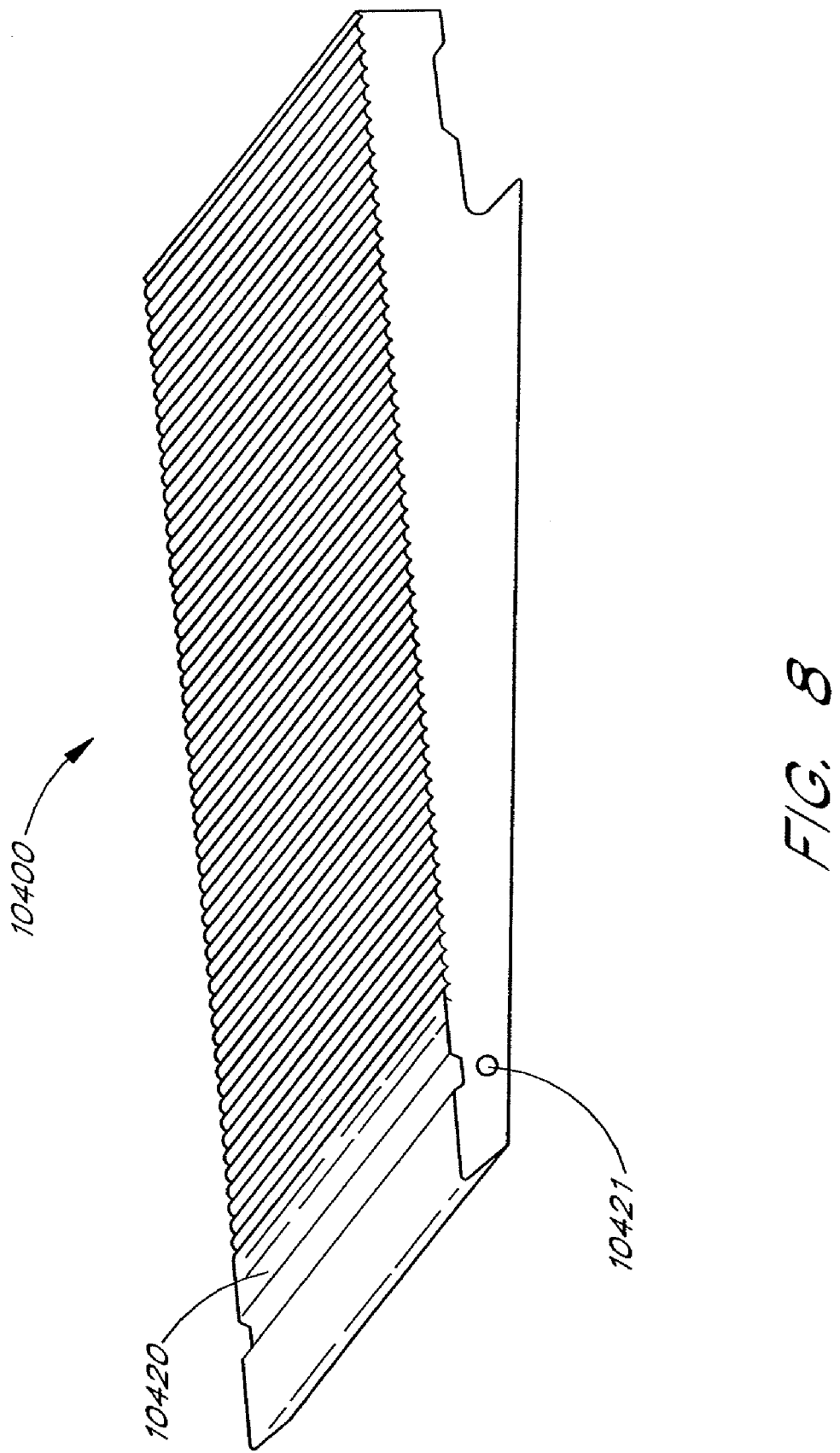
FIG. 8 shows an isometric view of a section of an FC plank in accordance with another embodiment of the present invention.

As seen in FIG. 8, another embodiment has fixing void 10421 optionally included below the line of the fixing indicator to relieve stress that can lead to break out and cracking of the top edge of the product when nailed or fastened to wall framing or sheathing. The fixing void could be formed using mandrel in the extrusion formation process.

FIG. 8 shows an isometric view of the FC plank of a preferred embodiment. Plank 10400 is another example of an FC plank having a fixing indicator 10420. Plank 10400 shows an example of an aesthetically pleasing pattern on the outer surface of plank 10400 formed by extrusion in similar fashion as fixing indicator 10420 and a fixing void or hollow 10421 below the line of the fixing indicator.

Advantageously, the siding plank assembly of this embodiment provides an inexpensive affixing indicator on siding planks which reduces damage to the planks at installation due to improper affixing. Furthermore, the installation time of an extruded FC product is also reduced. Additionally, the siding plank assembly provides an aesthetic appearance as it conceals the affixing by limiting the affixing region to the overlap area between adjacently stacked planks.

It will be appreciated that the fixing indicator could be formed using post-extrusion marking techniques such as, manual embossing, machining, ink jet or other printing, stamping, pressing, and painting techniques, which are all time-consuming and costly.

It will further be appreciated that the fixing indicator can be employed in several, if not all, of the siding plank assemblies described herein. For example, like the embodiment of FIGS. 1-3, the plank of FIG. 5 similarly contains a lock in overlap region 10150 and a key tip for insertion into the lock at first edge 10130. Thus, it can be seen that a fixing indicator can be placed similarly on the key 130 of FIG. 2.

III. Two-Piece FC Plank and Method of Making the Same

In further embodiments, a two-piece FC plank and a method of making the same are provided. These two-piece planks can be used to form the various shapes described throughout this specification in order to provide a lock and key, hidden nailing, a deep shadow line, and other features described herein. Two methods for forming a two-piece FC plank are described below.

It will be appreciated that several manufacturing processes for bonding two pieces of FC material together to form a product use standard industry adhesives. However, due to the composition of the FC material and adhesive, the time it takes for the two pieces of FC material to adhere ("adhesion time") is lengthy and the bonding strength of the two FC pieces is weakened. Thus, bonding processes that use standard industry adhesives decrease the durability of installed siding panels and delay the post-processing of the product, which increase the manufacturing cycle time of the product. Advantageously, the bonding process of the below-described embodiments provide a quick process for bonding two FC pieces together to form a durable bond.

A. First Roller Method

Figure 9A:
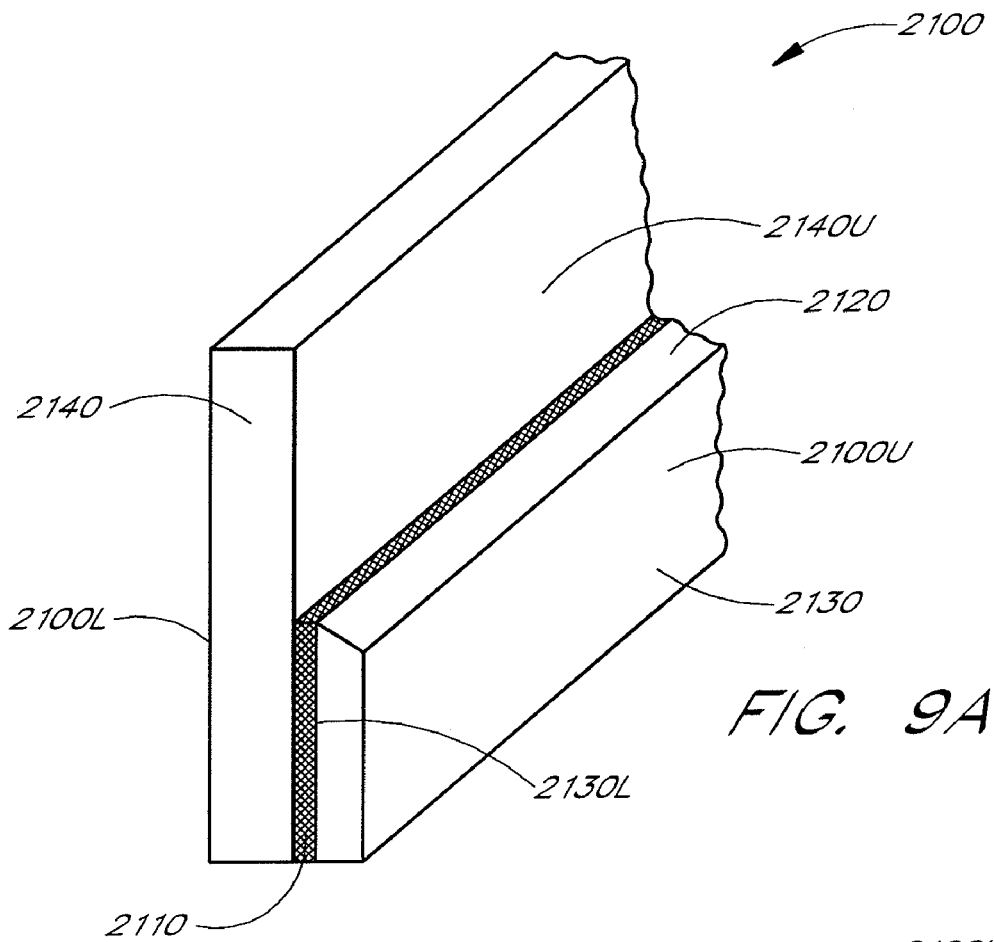
FIG. 9A shows an isometric vertical view of a two-piece FC plank in accordance with another embodiment of the present invention.
Figure 9B:
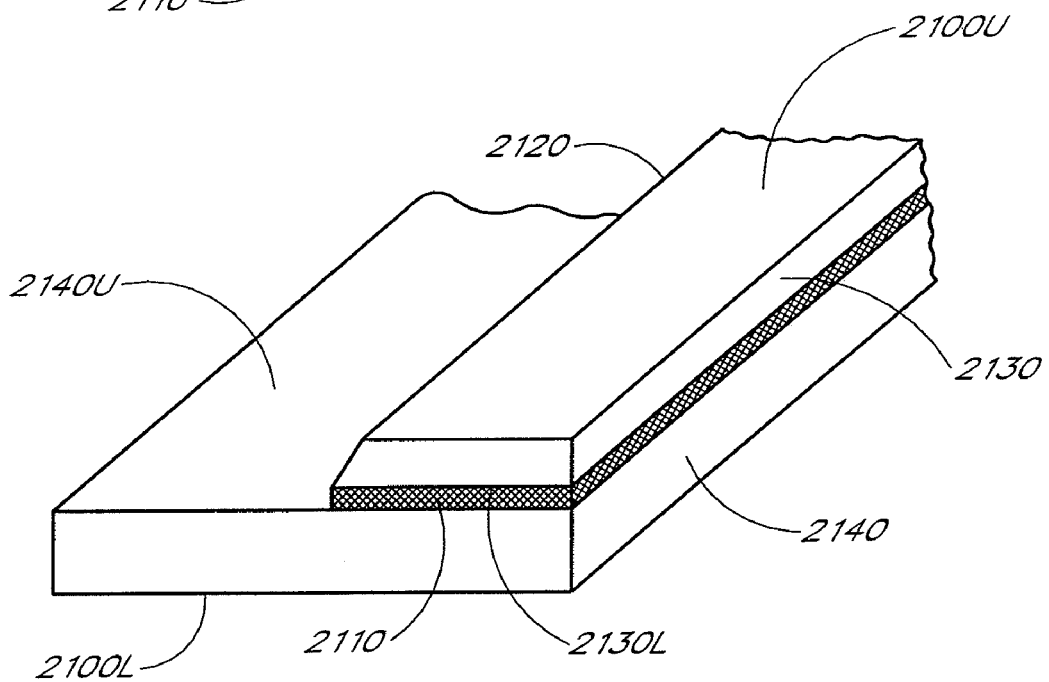
FIG. 9B shows an isometric horizontal view of the two-piece FC plank of FIG. 9A.

FIGS. 9A and 9B show isometric views of a two-piece FC plank 2100. Two-piece plank 2100 includes a main plank section 2140, a second piece or butt piece 2130, a first end 2120, and adhesive 2110. Main plank section 2140 is preferably a medium-density FC and is typically about ¼ inch thick, but may be as thin as about 3/16 inch or less or as thick as about ½ inch or more. The width preferably ranges from about 5 to 12 inches, depending on the application. The length preferably ranges between about 12 to 16 feet, depending on the application. Main plank section 2140 may be manufactured with a smooth or textured surface. Further information regarding manufacture of main plank section 2140 may be found in Australian Patent No. AU 515151. Main plank section 2140 has an upper surface 2140U, also considered to be the back surface.

Butt piece 2130 is preferably made from a medium-density FC material, and is typically about 5/16 inch thick, but may be as thin as about ¼ inch or less, or as thick as about ⅝ inch or more. The width of butt piece 2130 is typically about 1½ inch, but may be as wide as about 2 inches or more, or as narrow as about ⅝ inch or less, depending on the application. The length is typically the same as main plank section 2140 (about 12 to 16 feet), depending on the application. Butt piece 230 has a lower surface 2130L, also considered the front surface. The function of butt piece 2130 is to reinforce main plank section 2140, thereby increasing the overall rigidity of plank 2100. A second function of butt piece 2130 is to provide thickness for an improved shadow line, a desired aesthetic quality.

Adhesive 2110, located between upper surface 2140U of main plank section 2140 and lower surface 2130L of butt piece 2130, in one embodiment is a fast setting, reactive hot-melt polyurethane with a viscosity of about 10,000 to 100,000 CPS at application temperatures. Other embodiments for the adhesive 2110 are described below. The application temperature for adhesive 2110 ranges from about 200° to 325° F. The adhesion time ranges from about 3 to 5 seconds. The adhesion time is the time taken for the bond strength to develop after the adhesive is applied and nip pressing is performed.

In operation, adhesive 2110 is applied in beads on upper surface 2140U of main plank section 2140 along its length. This may be accomplished by using a Nordson hot-melt extrusion system. The adhesive beads are preferably spaced apart by a small distance, such as about 1" or ½". The preferred amount of adhesive is about 1 gram/foot/bead, though the amount may be as small as about 0.5 grams/foot/bead or as large as about 2 grams/foot/bead. Immediately upon applying adhesive 2110 (e.g., within about 3 seconds), lower surface 2130L of butt piece 2130 is interfaced with upper surface 2140U of main plank section 2140 such that first end 2120 of butt piece 2130 faces the center of main plank section 2140 as shown in FIG. 9A. The arrangement of main plank section 2140 and butt piece 2130 forms two-piece plank 2100 having an upper surface 2100U and a lower surface 2100L. Preferably the bottom surfaces of the main plank section 2140 and the butt piece 2130 are preferably flush.

Figure 10:
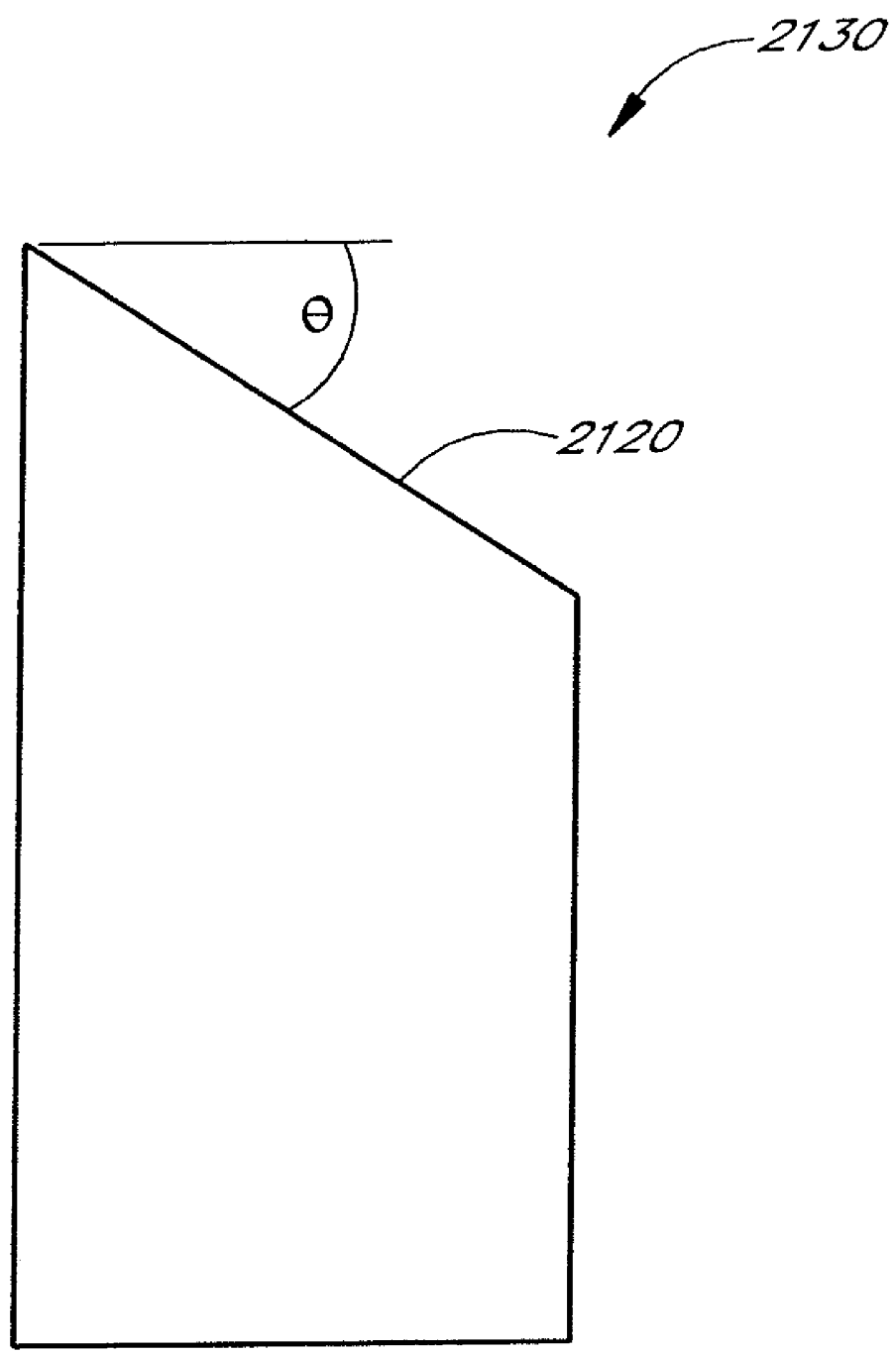
FIG. 10 shows a side view of a first end of a butt piece used to form the plank of FIG. 9A.

As shown in FIG. 10, first end 2120 of butt piece 2130 makes an angle theta θ of about 15 degrees, but may range from about 0 degrees to 60 degrees, with the horizontal plane. The function of the angled surface is to aid water drainage.

Figure 11A:
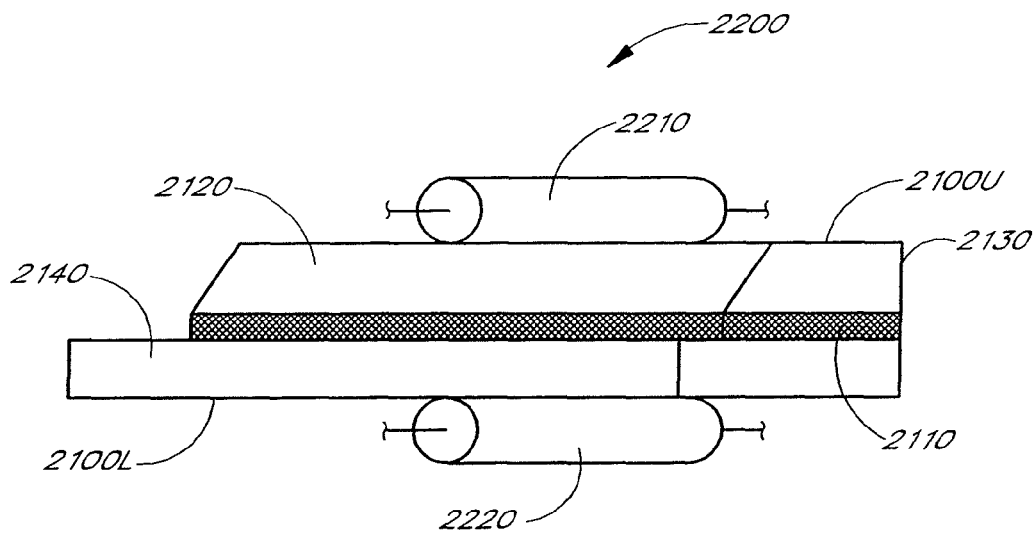
FIG. 11A shows an isometric view of the two-piece plank of FIG. 9A formed using a pressure roller system.
Figure 11B:
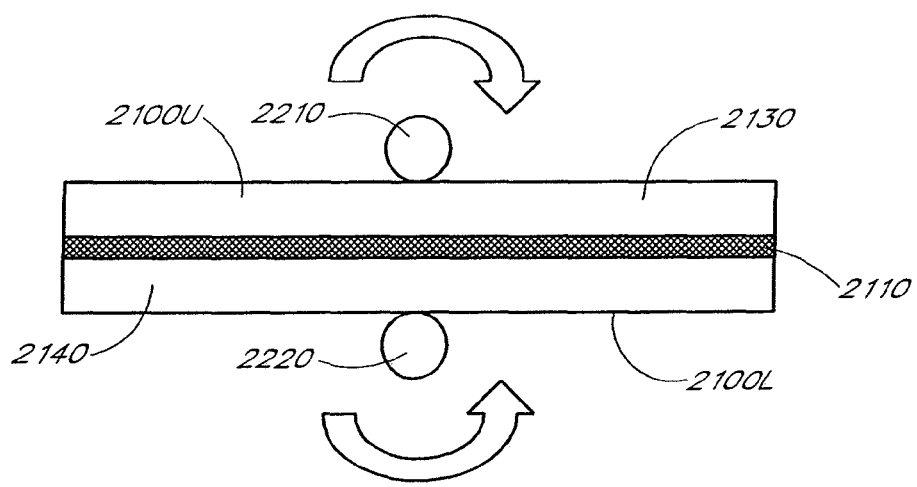
FIG. 11B shows an end view of the two-piece plank and pressure roller system of FIG. 11A.

FIGS. 11A and 11B show isometric and end views, respectively, of a pressure roller system 2200 for squeezing main plank section 2140 to butt end 2130. System 2200 includes a first roller 2210, and a second roller 2220.

First roller 2210 and second roller 2220 are preferably opposing 7-inch diameter steel rollers and are arranged parallel to and adjacent one another with a gap in between. In operation, plank 2100 is fed through the gap between first roller 2210 and second roller 2220. The gap between roller 2210 and 2220 is sized to engage plank 2100 with an interference fit. Thus, first roller 2210 is in direct contact with upper surface 2100U of butt piece 2130, and second roller 2220 is in direct contact with lower surface 2100L of plank 2140. Plank 2100 is transported through roller system 2200 at approximately 50 feet/minute. As plank 2100 transverses through roller system 2200, first roller 2210 and second roller 2220 compress plank 2100 at a pressure of approximately 750 lb/inch of roller width for approximately 3 to 5 seconds.

Figure 12:
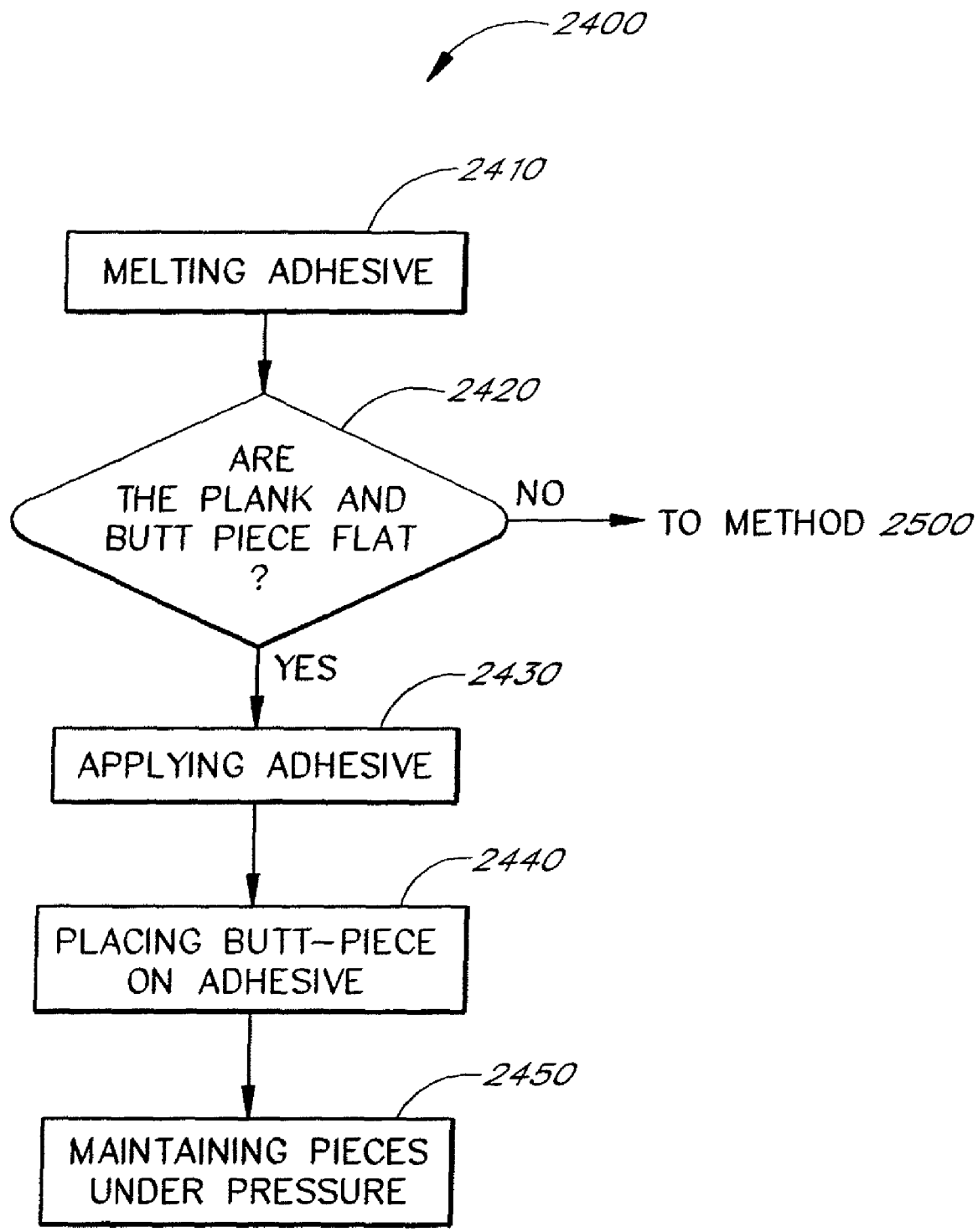
FIG. 12 shows one method for making a two-piece plank.

FIG. 12 describes a method 2400 for making a two-piece medium density plank 2100, which involves:

Melting adhesive 2410: Fast-setting, reactive hot-melt polyurethane is melted in a hot-melt application system. One such system is commercially available from Nordson Corporation. Application temperatures range from about 200° to 325° F.

Figure 13:
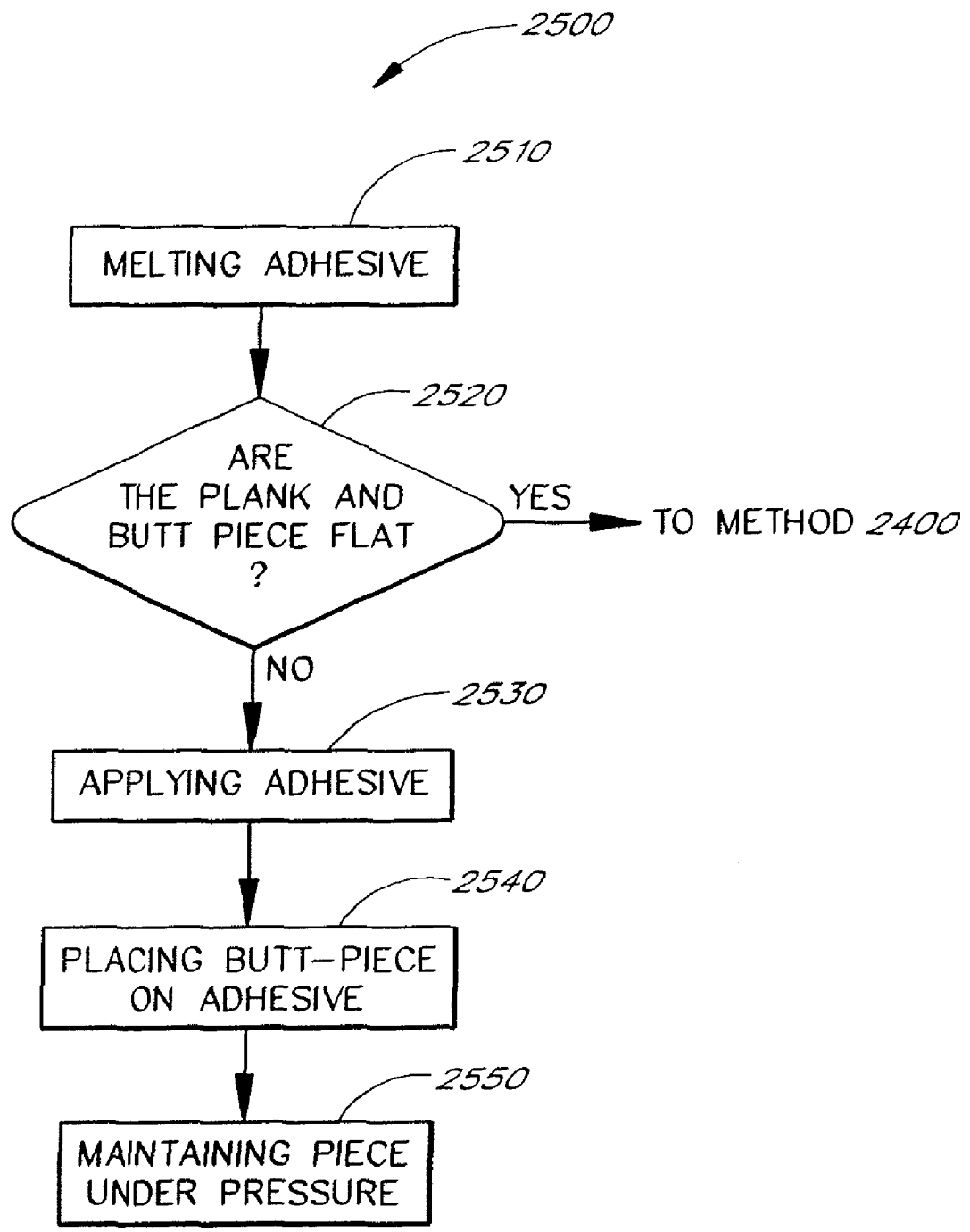
FIG. 13 shows another method for making a two-piece plank.

Are the plank and butt piece flat? 2420: The plank 2140 and butt piece 2130 are viewed for flatness. If plank 2140 and butt piece 2130 are determined to be flat, the process is continued to step 2430. If plank 2140 and butt piece 2130 are determined to be wavy or uneven, refer to method 2500, as shown in FIG. 13.

Applying adhesive 2430: Typically about 1 gram/foot/bead, but may be as small as about 0.5 g or as large as about 2 g, of hot-melt adhesive is applied in beads spaced about ½" to 1" apart on upper surface 2140U of main plank section 2140 (see FIG. 9A) using the Nordson Corporation system extrusion nozzle.

Placing butt-piece on adhesive 2440: Butt-piece 2130 is placed onto adhesive 2110, shown in FIG. 9A and as described above.

Maintaining pieces under pressure 2450: Immediately (preferably within 3 seconds) upon completion of step 2440, plank 2100 is passed through roller system 2200, which maintains the plank under pressure (about 750 lb/inch of roller width) preferably for a minimum of 3 seconds to allow adhesive 2110 time to cool and bond with main plank section 2140 and butt piece 2130. The squeezing of main plank section 2140 and butt end 2130 causes the beads of adhesive 2110 to spread out in a thin layer.

The method, shown in FIG. 12, is a process for maintaining pressure on plank 2100 when plank 2140 and butt piece 2130 are both flat. However, a further process was developed to bond surfaces that have variable flatness, shown in FIG. 13.

FIG. 13 describes another method 2500 for a making two-piece medium density plank 2100, which involve:

Melting adhesive 2510: Fast-setting, reactive hot-melt polyurethane is melted in a hot-melt application system. One such system is commercially available from Nordson Corporation. Application temperature of typically about 250°, but may range from about 200° to 325° F.

Are the plank and butt piece flat? 2520: The plank 2140 and butt piece 2130 are viewed for flatness. If plank 2140 and butt piece 2130 are determined to be flat, refer to method 2400, shown in FIG. 12. If plank 2140 and butt piece 2130 are determined to be wavy or uneven, continue process to step 2530.

Applying adhesive 2530: Typically about 1 gram/foot/bead, but may be as small as about 0.5 g or as large as about 2 g, of hot-melt adhesive is applied in beads spaced about ½" to 1" apart (a minimum of 2 beads are preferably applied) on upper surface 2140U of main plank section 2140 (see FIG. 9A) using the Nordson Corporation system extrusion nozzle.

Placing butt-piece on adhesive 2540: Butt-piece 2130 is placed onto adhesive 2110, shown in FIG. 9A and as described above.

Maintaining pieces under pressure 2550: Immediately (preferably within about 9 to 12 seconds) upon completion of step 2540, plank 2100 is placed in a conventional hydraulic plate press or continuous press (not shown), which maintains the plank 2100 under pressure (about 750 psi) for a minimum of about 4 seconds to allow adhesive 2110 time to cool and bond with main plank section 2140 and butt piece 2130. The squeezing of main plank section 2140 and butt end 2130 causes the beads of adhesive 2110 to spread out in a thin layer.

Advantageously, the two-pieces of FC material can be bonded quickly so that post-bonding processes can be initiated immediately. Furthermore, bonding two FC material members together is more cost-effective than machining a single rectangular FC section to form the equivalent structure. The siding plank assembly creates an enhanced shadow line by virtue of the first end of the butt end extending partially over the upper surface of the main plank section and provides a traditional cedar look with a thick butt edge. The butt end piece also results in increased rigidity of the FC panel product so that it can be easily handled and installed.

It will be appreciated that although the shapes described herein are formed from two pieces of fiber cement, an equivalent shape can be formed by machining a solid rectangular section. However, this method may be more costly and produce a high amount of waste material. It will also be appreciated that additional shapes can be produced, such as described below, by abutting the two pieces together.

B. Second Roller Method

In another embodiment, a cementitious adhesive mixture, described below, is located between upper surface 2140U of plank 2140 and lower surface 2130L of butt piece 2130, as shown in FIGS. 9A and 9B. In operation, adhesive is applied to either upper surface 2140U of plank 2140 or lower surface 2130L of butt piece 2130 along its length. The thickness of applied adhesive 2110 is dependant upon the uniformity of textured surfaces 2130L and 2140U, typically in an amount that covers surfaces 2130L or 2140U, but preferably does not exceed about ⅛ inch.

Figure 14A:
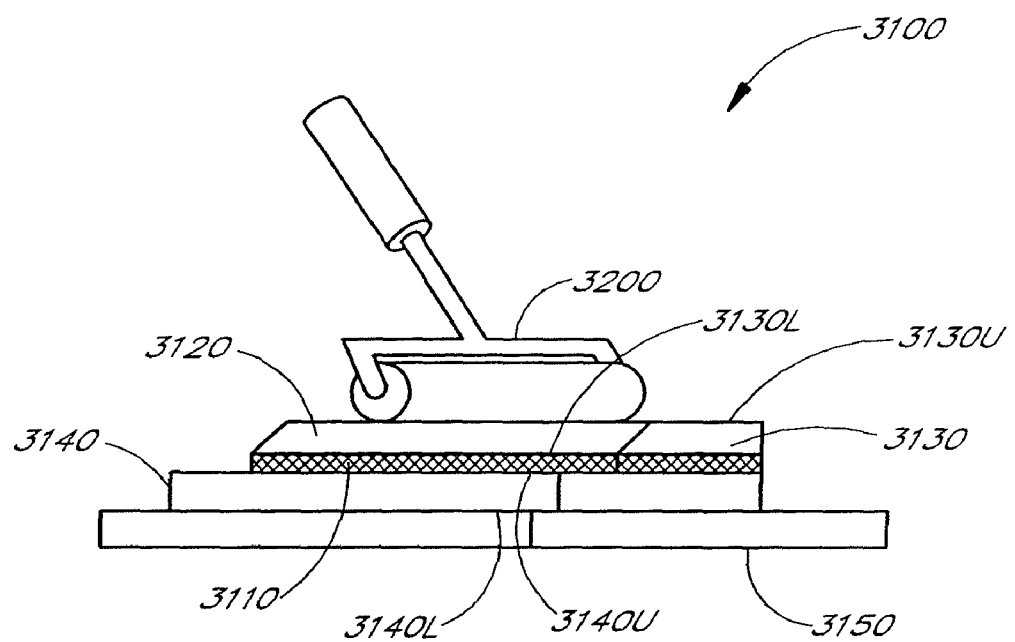
FIG. 14A shows an isometric view of a two-piece plank formed using a hand roller.
Figure 14B:
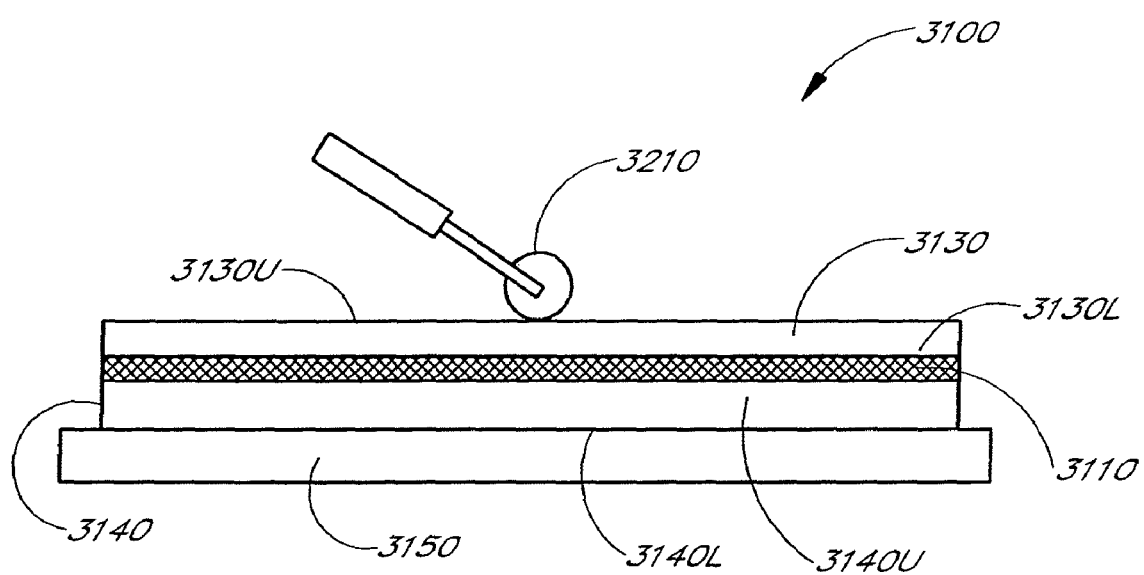
FIG. 14B shows an end view of the two-piece plank and hand roller of FIG. 14A.

As an alternative to the roller system described above, FIGS. 14A and 14B show plank assembly 3100, and include a hand roller 3210 and an interleaver 3150. Interleaver 3150 is a cured FC material used to support plank assembly and is in physical contact with lower surface 3140L of the plank. In operation, hand roller 3210 is in functional contact with upper surface 3130U of butt piece 3130. Hand roller 3210 is rolled along the length of plank assembly and is used to apply pressure to upper surface 3130U of butt piece 3130 while adhesive 3110 bonds plank 3140 and butt piece 3130 together.

Figure 15:
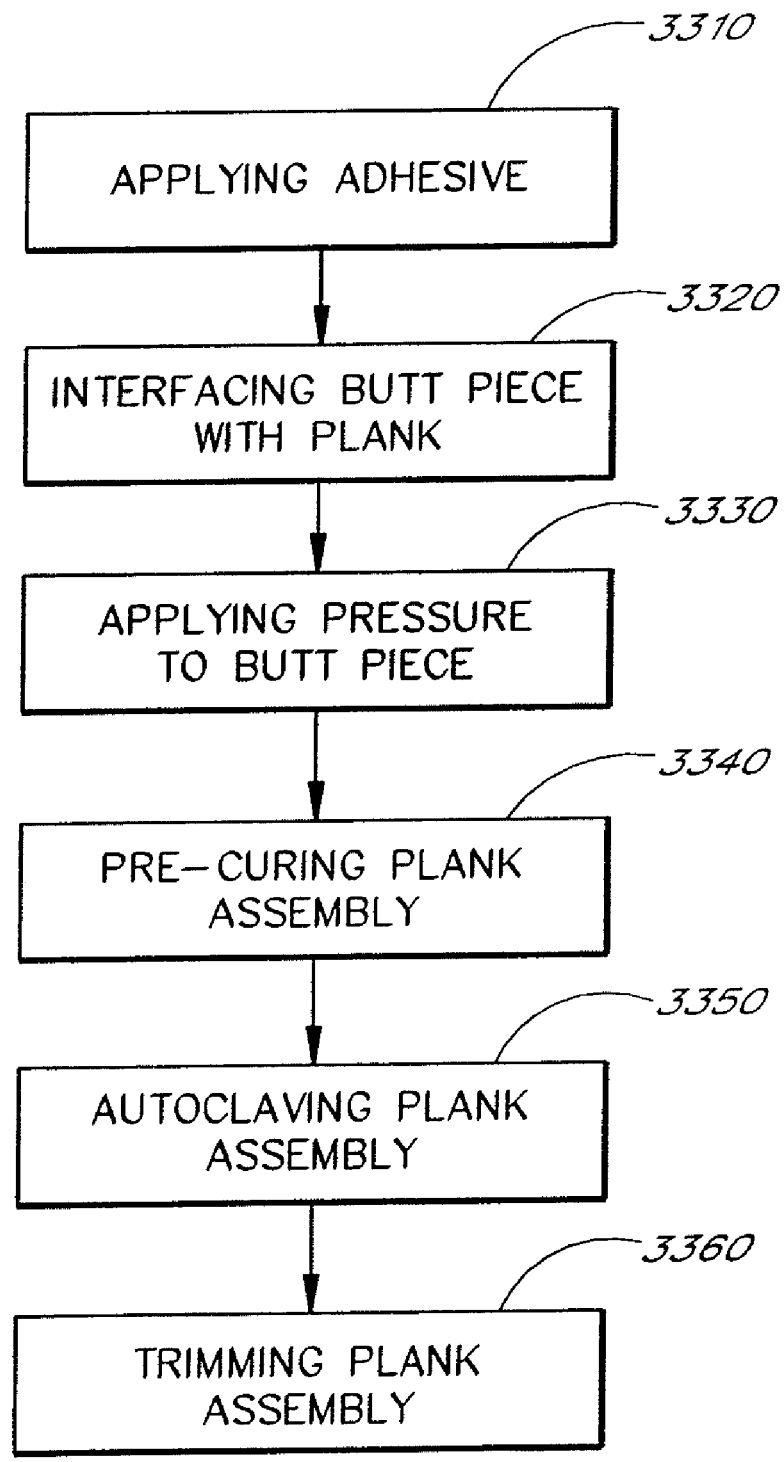
FIG. 15 shows a method of making a two-piece plank assembly using an adhesive.

FIG. 15 illustrates the process for making a two-piece medium density plank assembly with the cementitious adhesive, described below. The method involves:

Applying adhesive 3310: Adhesive 3110 is applied to upper surface 3140U of plank 3140, shown in FIGS. 14A, 14B.

Interfacing butt piece with plank 3320: Lower surface 3130L of butt-piece 3130 is interfaced with upper surface 3140U of plank 3140, shown in FIGS. 14A and 14B Applying pressure to butt piece 3330: Hand roller 3210 is rolled over the length of surface 3130U of plank assembly 3100 in a direction normal to the upper 3130U and lower 3140L surfaces, shown in FIGS. 14A and 14B, to force contact of adhesive with fiber cement pieces, and provide adhesion between butt piece 3130 and plank 3140.

Pre-curing adhesive 3340: Plank assembly is air dried typically for about 12 hours, but may be as long as about 24 hours or more, or as short as about 8 hours or less.

Autoclaving plank assembly 3350: Plank assembly is autoclaved at a temperature between about 350° to 400° F. at about 120 to 145 psi for a period of approximately 8 hours.

Trimming Plank Assembly 3360: Overflow of cementitious adhesive 3110 is trimmed from cured and autoclaved plank assembly.

The use of a cementitious adhesive as described below to adhere the two pieces of fiber cement together has all of the advantages described above for the polymeric adhesive. Another advantage is that a cementitious adhesive is compatible with fiber cement materials, is economical and can be co-cured with the fiber cement pieces to form a durable bond.

C. Cementitious Adhesive Composition

The embodiments described above for adhering two pieces of fiber cement plank together in one preferred embodiment utilize a novel cementitious adhesive composition. Thus, one aspect of the present invention provides a composition of matter for, and method of making a cementitious adhesive for bonding materials, preferably FC materials, and more preferably medium density FC materials. The adhesive ingredients preferably include cement, silica, thickener, and water, and may include organic fibers or inorganic fibers. The adhesive formulation can be used to bond FC materials prior to autoclaving.

It will be appreciated that a preferred adhesive is able to withstand autoclave temperatures and is compatible with FC materials. Most conventional polymeric adhesives and polymer-modified adhesives melt, burn, or degrade when exposed to temperatures in excess of approximately 375 degrees F. During the manufacturing process, FC materials are dried in an autoclave that can reach approximately 400 degrees F. Therefore, conventional polymeric adhesives cannot be used to bond FC materials prior to autoclaving.

Moreover, a preferred adhesive selected for use on FC materials should be compatible and as similar in composition as possible to the materials being bonded. This ensures that the system as a whole will respond to environmental factors in a similar manner within each component (environmental factors include temperature fluctuations, acid rain impacts, humidity, and wet-dry cycles). The adhesive and the FC materials will age similarly and thus will not weaken the system.

Advantageously, the adhesive composition of this embodiment can withstand curing temperatures in an autoclave and is compatible with the FC material to be bonded. Furthermore, the adhesive composition is less costly, more readily available, and more environmentally friendly compared with polymeric or polymer-modified adhesives. Unlike other adhesives, the adhesive composition also does not degrade under alkaline or moist conditions.

The cement, silica, and thickener are all added to the adhesive mix in powdered form, where the particle size for each ingredient may measure up to about 200 microns. The cement may be present in the formulation in an amount between about 10 and 90 wt %, the silica may be present in the formulation in an amount up to about 90 wt %, and the thickener may be present in the formulation in an amount up to about 2 wt %. Water may be present in the formulation in an amount up to about 90 wt %. (All references to weight in this document are provided on a dry material weight basis, unless otherwise indicated.)

The organic fiber in the formulation may be in the form of cellulose fiber (where the fiber may be bleached pulp), and may be present in the formulation in an amount up to about 5 wt %. The inorganic fiber in the formulation may be in the form of Wollastonite, and may be present in the formulation in an amount up to about 30 wt %. Both forms of fiber (organic and inorganic) may measure up to about 3 mm in length.

TABLE 2

Exemplifying formulations of cementitious adhesive.

| Raw Materials | Percent Raw Material by Dry Weight | | |
|---|---|---|---|
| | Formulation 1 | Formulation 2 | Formulation 3 |
| Organic fiber (e.g. bleached pulp) | 0.5% | 0% | 0% |
| Cement | 59.5% | 59.7% | 47.7% |
| Silica | 39.5% | 39.8% | 31.8% |
| Inorganic fiber (e.g. Wollastonite) | 0% | 0% | 20% |
| Thickener | 0.5% | 0.5% | 0.5% |
| Water | 430 to 470 milliliters of water per Kg of dry solids | | |

Table 2 shows three exemplifying formulations of cementitious adhesive. Each formulation contains cement to form the body of the bond, and fine-ground silica to react and bind with cement when autoclaved. The silica also acts as a filler/aggregate that lowers the cost of the matrix, without significantly reducing performance. Thickener slows the water being drawn from the slurry (adhesive) into the fiber cement. The presence of thickener ensures that the cementitious adhesive remains "tacky" during the bonding process of the fiber cement surfaces, ensures that the adhesive fills the gap between the pieces to be bonded, and "wets out" the second surface, which is necessary to develop a good cementitious bond. The thickener also slows/reduces settling in the slurry and prolongs "open time" to add viscosity to the wet adhesive.

Formulation 1 and Formulation 3 additionally contain fiber to increase the bond strength. Both organic and inorganic fibers perform similarly in the formulation; however, organic fiber requires preparation for use, and inorganic fiber tends to be more costly to purchase than organic fiber. Although fiber adds strength to the adhesive formulation, it can also clog some applicators during use. To address this issue, Formulation 2 contains no fiber. Water is added as a necessary reactant for the cement in forming the hydrated cementitious bond. Water also provides the mixture "viscosity" necessary to mix the adhesive, to disperse fibers and solids through the mixture, and to apply the adhesive.

Figure 16:
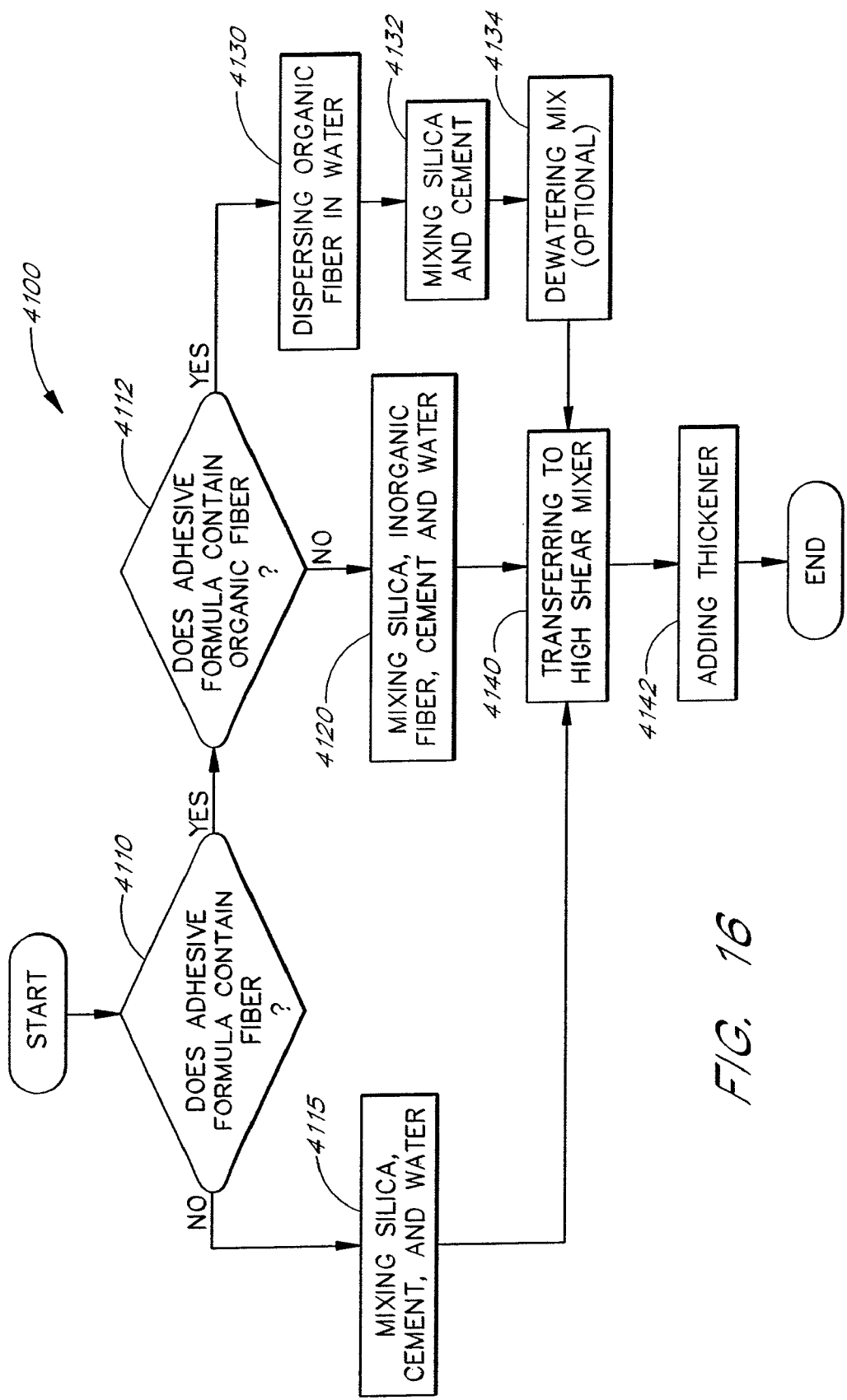
FIG. 16 shows a method of making a cementitious adhesive for bonding FC materials.

FIG. 16 shows a method 4100 of making cementitious adhesive for bonding medium-density FC materials that includes:

Step 4110: Does adhesive formula contain fiber? In this step, method 4100 proceeds to step 4112 if the formulation being made contains fibers. Otherwise, method 4100 proceeds to step 4115.

Step 4112: Does adhesive formula contain organic fiber? In this step, method 4100 proceeds to step 4130 if the formulation being made contains organic fibers. Otherwise, the formulation is presumed to contain inorganic fibers and method 4100 proceeds to step 4120.

Figure 17A:
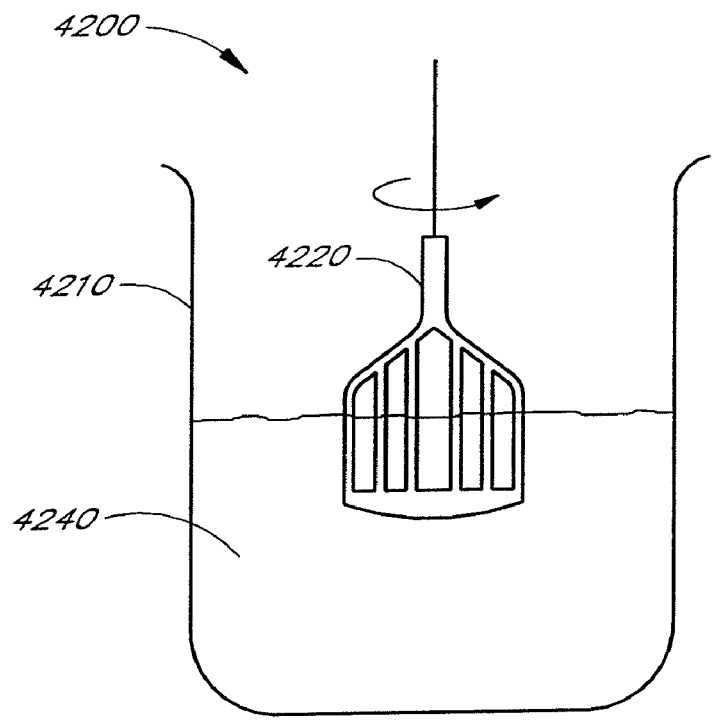
FIGS. 17A and 17B show schematic views of a Hobart style low shear mixer containing adhesive formulation in accordance with the method of FIG. 16.
Figure 17B:
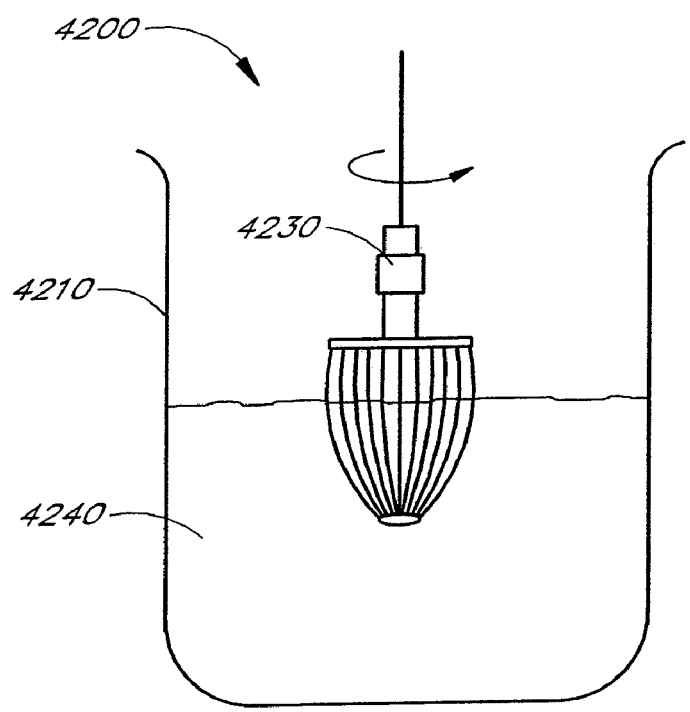

Step 4115: Mixing silica, cement and water. In this step, method 4100 adds the powdered silica to water to produce a 50 wt % silica slurry, and then transfers the silica slurry to a mixer (such as a Hobart mixer). Method 4100 adds powdered cement and water to bring the percent by weight of solids to approximately about 68% to 70% (approximately about 430 to 470 milliliters total water per kilogram of solids), and then mixes the adhesive formulation for about five minutes to attain homogeneity in the mixture. An example of a Hobart mixer is shown in FIG. 17. Method 4100 then proceeds to step 4140. FIG. 17 is a schematic of Hobart style low shear mixer 4200 containing an adhesive formulation. Both views A and B include a Hobart mixing bowl 4210 and an adhesive formulation 4240. In view A, a ribbon blade 4220 blends adhesive formulation 4240, and in alternate view B, a whisk blade 4230 blends adhesive formulation 4240. Either blade may be used to obtain similar results.

Step 4120: Mixing silica, inorganic fiber, cement, and water. In this step, method 4100 adds the powdered silica to water to produce a 50 wt % silica slurry, and then transfers the silica slurry to a mixer (such as a Hobart mixer, shown in FIG. 17). Method 4100 adds the powdered cement and water, adds extra water to bring the percent by weight of solids to approximately 67% to 68% (approximately 470 to 500 milliliters total water per kilogram of solids), and mixes the adhesive formulation for about five minutes. Method 4100 then proceeds to step 4140.

Step 4130: Dispersing organic fiber in water. In this step, method 4100 adds the organic fiber, such as unbleached or bleached pulp. The pulp is previously hydropulped, refined, and diluted with water to about 0.4% by weight. Method 4100 mixes and disperses the organic fiber for approximately five minutes.

Step 4132: Mixing silica and cement. In this step, method 4100 adds the silica and then the cement to the organic fiber, and mixes the mixture. The preferable approach is to mix the ingredients of silica, cement, and fiber, then to blend the ingredients for five minutes in a mixer (such as a Hobart mixer, shown in FIG. 17) to attain homogeneity in the mixture.

Step 4134: Dewatering mix (optional). Following step 4132, a dewatering apparatus 4300, shown in FIG. 18, dewaters the mix to achieve a thin paint consistency as described below. Method 4100 then proceeds to step 4140.

FIG. 18 is a schematic of a dewatering apparatus 4300, which includes a first side 4310, a second side 4320, a third side 4330, and a fourth side 4340. In one embodiment, each side of dewatering apparatus 4300 preferably has identical length, width, and height. In another embodiment, each side would measure approximately ten inches long and three inches high. The sides are arranged such that first side 4310 and third side 4330 are parallel to each other, second side 4320 and fourth side 4340 are parallel to each other, and each side is joined to two other sides at 90 degree angles (e.g., first side 4310 is arranged at a 90 degree angle to second side 4320 and fourth side 4340), as shown in FIG. 18.

Dewatering apparatus 4300 is designed to hold a perforated metal plate 4316, a coarse mesh screen 4314 and a fine mesh screen 4312. Views A, B, and C in FIG. 18 show plan views of screens 4312 and 4314, and plate 4316, respectively. Fine mesh screen 4312 conforms to ASTM#325; coarse mesh screen 4314 conforms to ASTM#10; and plate 4316 is approximately 3/16" thick, and is perforated with round 1/4" diameter holes 4317, at a frequency of 9 holes per square inch. Screens 4312 and 4314, and plate 4316 may be made of metal or other comparable materials to provide similar functionality.

In operation, the adhesive formulation is poured into dewatering apparatus 4300. A set of mesh screens and a metal plate (not shown) identical to 4312, 4314, and 4316 are stacked in reverse order on top of the set inside 4300 so that the screens and plates are parallel to each other, and the adhesive formulation is contained between the two sets. Downward pressure applied to the screens and plates dewaters the adhesive formulation. Water either exits through the bottom of dewatering apparatus 4300 or a vacuum apparatus (not shown) may optionally be used to remove pooled liquid from the top of the screens and plates.

Figure 19:
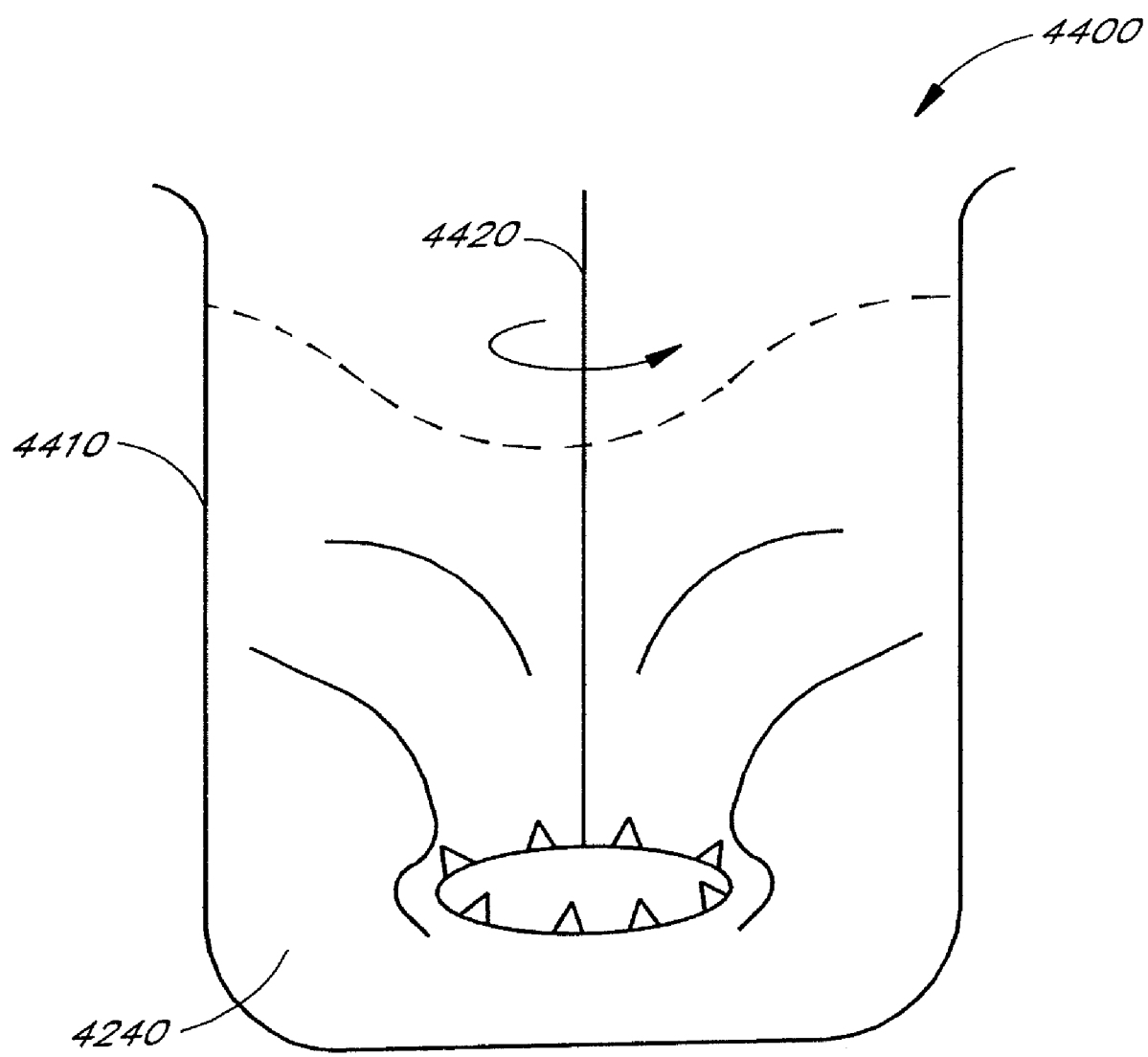
FIG. 19 shows a high shear mixer containing an adhesive formulation in accordance with the method of FIG. 16.

Step 4140: Transferring to high shear mixer. In this step, the adhesive formulation 4240 is added to a high shear mixer, as shown in FIG. 19. FIG. 19 shows a high shear mixer 4400 containing an adhesive formulation 4240. The adhesive formulation 4240 is added to a high shear mixing bowl 4410, where a high shear mixing blade 4420 revolves at a speed sufficient to create a vortex in the center of the mixing bowl (approximately 6000 RPM) and completely integrate all ingredients.

Step 4142: Adding thickener. In this step, method 4100 adds thickener to high shear mixer 4400 as required to achieve a thick paint consistency. Thickeners may be made of commercially available cellulose derivatives, polyurethane and polyacrylate, such as "Bermocell" (cellulose ether), "Ethocel" (ethyl cellulose polymer), "Cellosize" (hydroxy ethyl cellulose), or "Natrosol" (hydroxyl ethyl cellulose and derivatives). One preferred thickener is "Natrosol Plus D430", a cellulosic derivative (hydrophobically modified hydroxy ethyl cellulose). The amount of thickener in one embodiment is nominally 0.5 wt %; however, more may be added to achieve the desired viscosity. A visual determination is sufficient to ascertain desired viscosity of the adhesive formulation.

It will be appreciated that other adhesives may be used to bond the FC materials. These include polymers or polymer-modified adhesives (called "thin-sets") to bond the FC materials. However, these products may not be suited for exposure to high temperatures in an autoclave. Plastics degrade at approximately 375 degrees F. and break down during autoclaving. In addition, the polymers and polymer-modified adhesives are more costly to use compared with the preferred adhesives described above.

IV. Various Designs of Two-Piece FC Planks

The one and two-piece FC planks described above advantageously enable the formation of a variety of different shapes that provide a variety of desired features to the plank. Various designs are described below with respect to two-piece planks. However, it will be appreciated that similar shapes can be formed using one piece of material or other combinations of materials, such as described below.

Figure 20A:
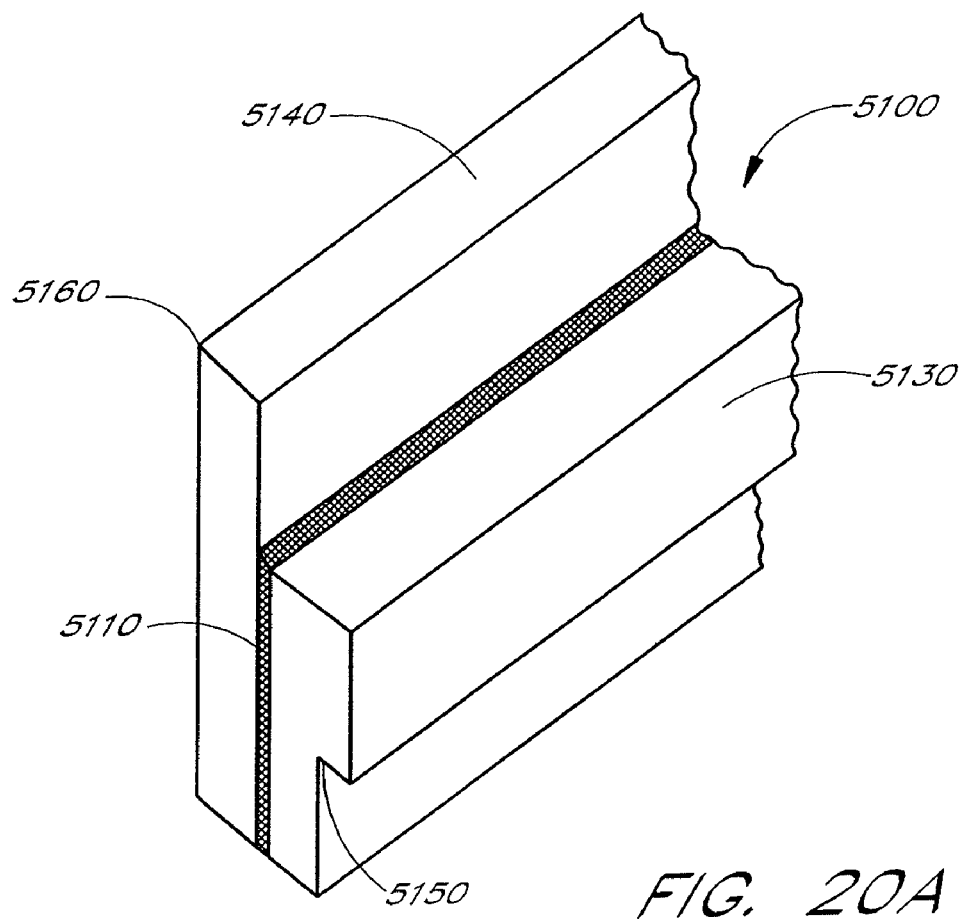
FIG. 20A shows a partial perspective view of a two-piece FC plank assembly according to another embodiment of the present invention.
Figure 20B:
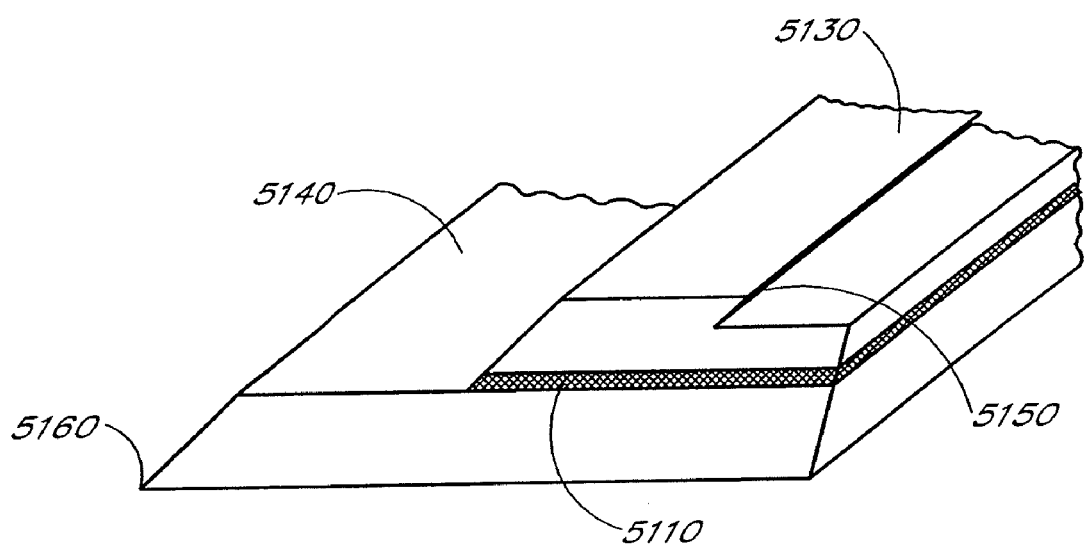
FIG. 20B shows a partial perspective view of a two-piece FC plank assembly rotated 90° from FIG. 20A.

A. Two-Piece Medium Density Plank with Locking Feature and Method of Making the Same In one embodiment, a two-piece FC plank includes a butt piece having a lock such as described above. As shown in FIG. 20A and FIG. 20B, plank assembly 5100 includes a plank 5140, a butt piece 5130, and adhesive 5110. In this embodiment, plank 5140 further includes a key 5160, and butt piece 5130 further includes a lock 5150.

Figure 21:
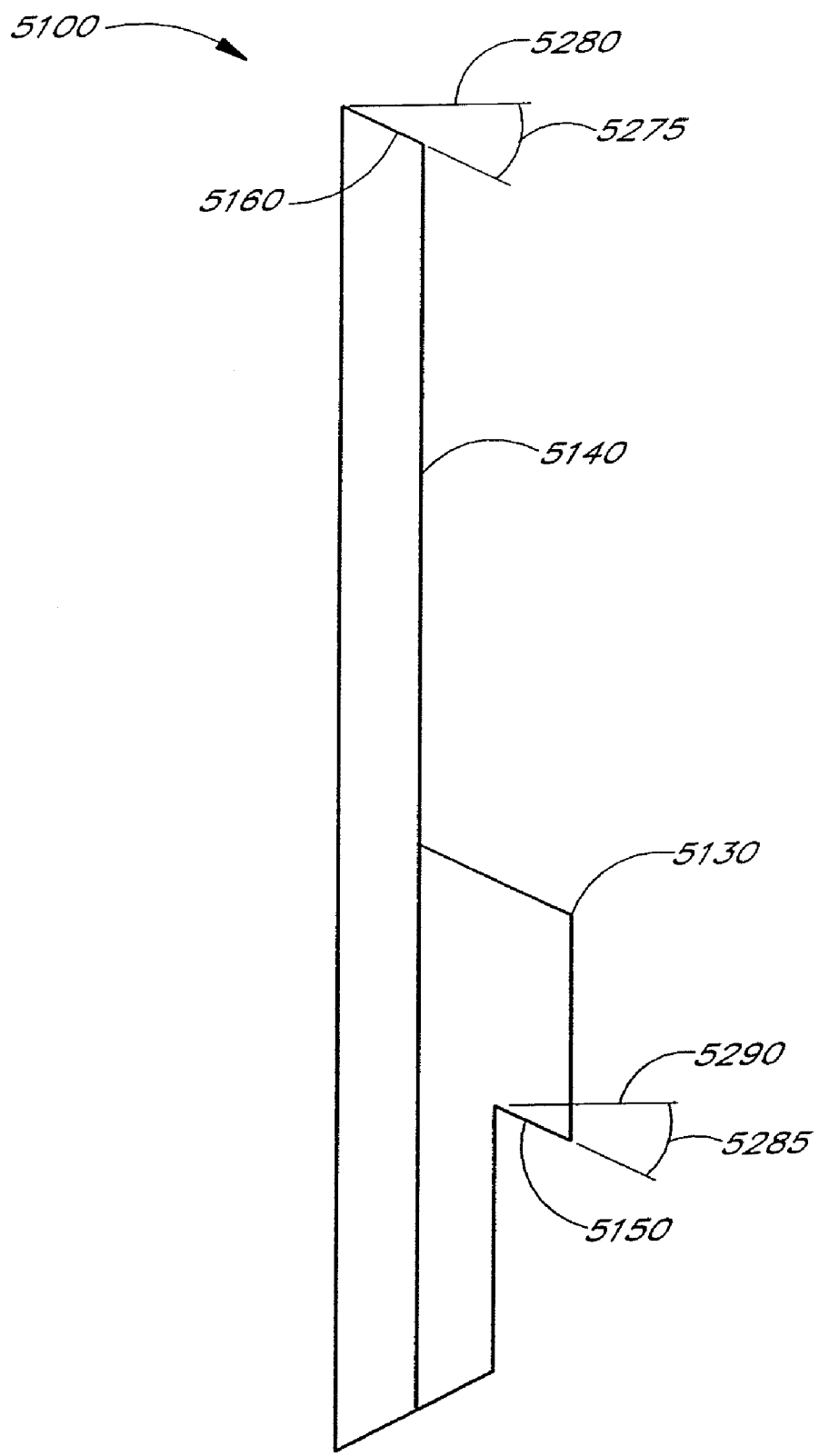
FIG. 21 shows a side view of the plank assembly of FIG. 20A.

FIG. 21 shows a side view of plank assembly 5100. As shown in FIG. 21, lock 5150 makes a lock angle 5285 with respect to horizontal line 5290. Lock angle 5285 in one embodiment ranges from approximately 5 degrees to 60 degrees, more specifically about 45 degrees is preferred. Key 5160 makes an angle of key angle 5275 in one embodiment with respect to horizontal line 5280. Key angle 5275 ranges from approximately 5 degrees to 60 degrees, more specifically about 45 degrees is preferred, but in any case substantially equal to lock angle 5285. Methods of cutting lock 5150 and key 5160 (e.g. using saw blades, high speed molders, abrasive grinding tools, or a router fitted with cutting tools for FC materials) are well known in the art.

Figure 22:
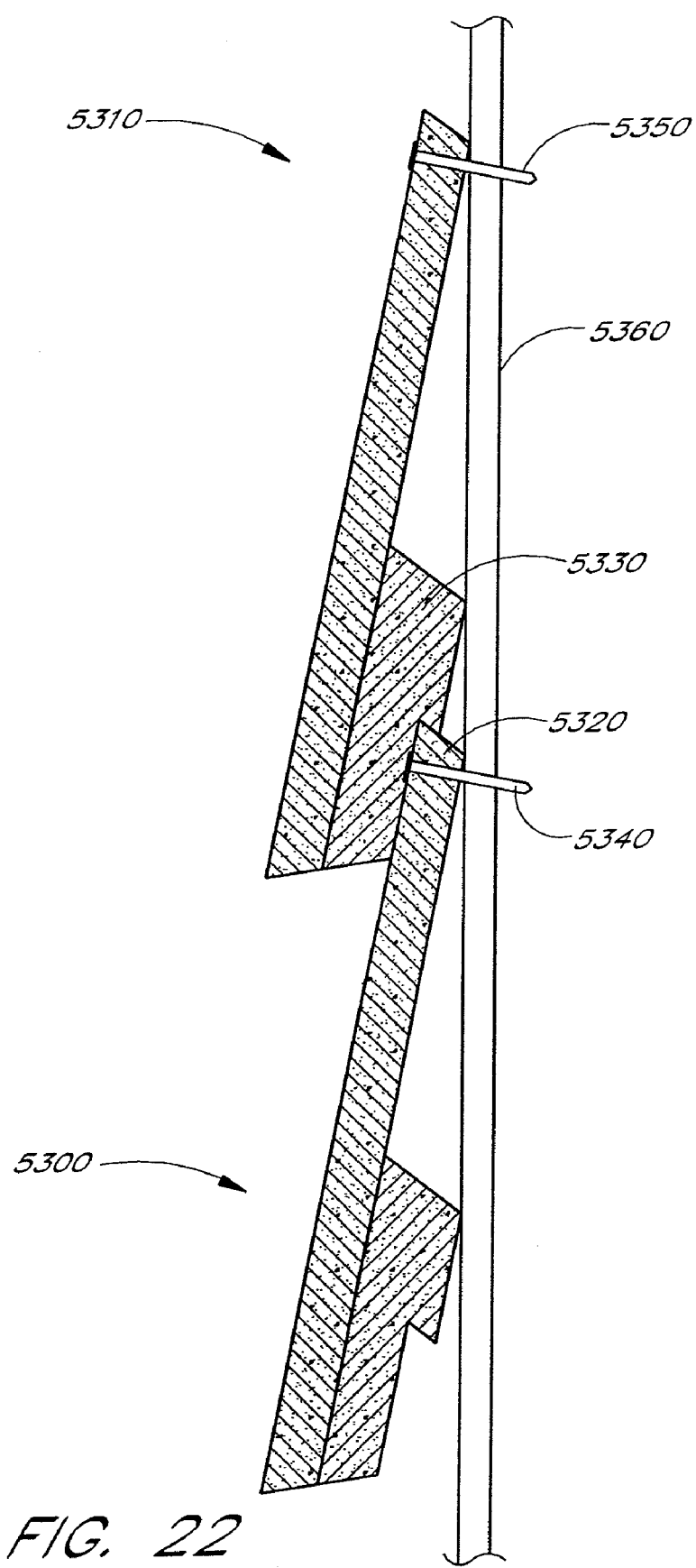
FIG. 22 shows a cross-sectional view of two installed plank assemblies of FIG. 20A.

FIG. 22 shows a cross-sectional view of two installed plank assemblies. As shown in FIG. 22, a first nail 5340 rigidly attaches a first plank assembly 5300 to a mounting surface 5360. Mounting surface 5360 is typically a wall stud. A second nail 5350 rigidly attaches a second plank assembly 5310 to mounting surface 5360. First plank assembly 5300 and second plank assembly 5310 are substantially identical to plank assembly 5100 previously described. First plank assembly 5300 includes key 5320, which is inserted into lock 5330 of second plank assembly 5310.

Figure 23:
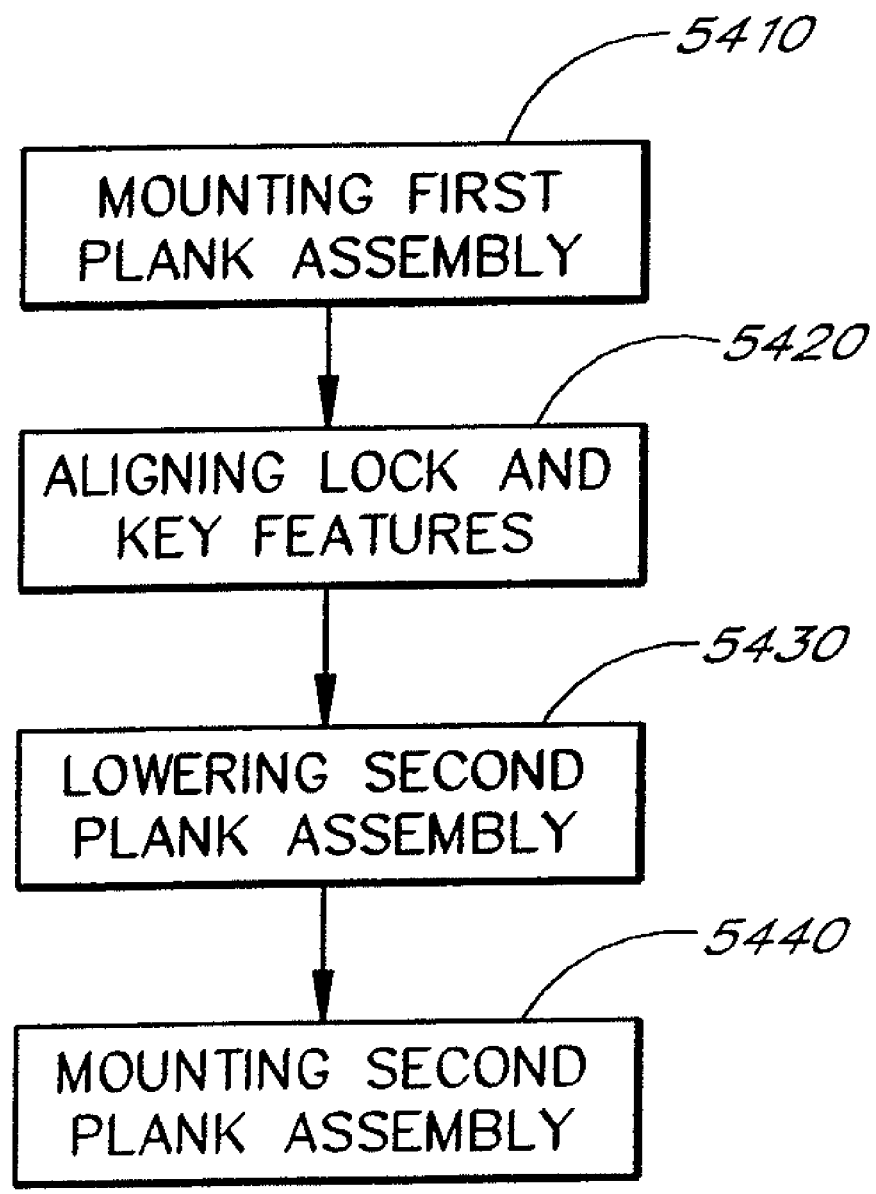
FIG. 23 shows a method of the installing plank assemblies of FIG. 20A.

FIG. 23 shows a method of installing plank assemblies onto a mounting surface, including the following steps:

Step 5410: Mounting first plank assembly. In this step, first plank assembly 5300 is placed against mounting surface 5360 as shown in FIG. 22. First nail 5340 is driven into first plank assembly 5300 to rigidly attach it to mounting surface 5360.

Step 5420: Aligning lock and key features. In this step, second plank assembly 5310 is placed against mounting surface 5360 above first plank assembly 5300 such that lock 5330 of second plank assembly 5310 is aligned with key 5320 of first plank assembly 5300, as shown in FIG. 22.

Step 5430: Lowering second plank assembly. In this step, second plank assembly 5310 is lowered onto first plank assembly 5300. As plank assembly 5310 is lowered (with the help of gravity) onto first plank assembly 5300, key 5320 of first plank assembly 5300 automatically engages and aligns lock 5330 of second plank assembly 5310 into a locked position. In this locked position, key 5320 of first plank assembly 5300 prevents second plank assembly 5310 from moving under the influence of wind forces, and therefore prevents wind-induced damage.

Step 5440: Mounting second plank assembly. In this step, second nail 5350 is driven into second plank assembly 5310 to rigidly attach it to mounting surface 5360.

Advantageously, the siding plank assembly of this assembly can be used to mate two siding planks tightly and uniformly without requiring a visible nail fastening the overlapping region of the two planks to resist high wind loads. Furthermore, the siding plank assembly requires no starter strip at the base of the wall to provide the lap plank angle of the first installed plank. The lock and key also set the horizontal gauge of the exposed plank face without requiring frequent measuring.

It will be appreciated that another way to prevent wind forces from damaging planks is to nail the butt piece down. However, this method is time extensive, may cause breaks or splits in the FC material, and reduces the aesthetic appeal of the installed plank.

B. Plank Having Oversized "V" Style Lock and Compressible Regions, and Method of Making Same In another embodiment, a two-piece FC plank utilizes an oversized "V" style lock system and added compressible material to provide added ease of installation and aesthetic value. This embodiment also applies to any plank of similar shape that uses a locking mechanism in place of face nailing an outer plank bottom edge to an inner plank top edge, where the inner plank top edge has been nailed to a frame. The "V" style lock allows planks to be locked into one another without requiring extensive measurement to maintain gauge (the visible vertical distance between planks) and overlap (the vertical distance the plank overhangs the plank below) during installation.

The design described below is particularly advantageous for walls that are not completely planar. When installing exterior siding, it is common to encounter walls that are not completely planar. For example, wood studs within a wall may bow when the wood dries after installation and create a non-planar or "wavy" wall. This presents both installation problems and finishing issues. If a "V" style FC plank does not lock completely (such that both planks being locked are flat against the wall), the gauge and overlap vary across the wall. As a result of being poorly fitted, the plank may subsequently experience lateral movement (flapping) when subjected to wind.

Advantageously, the planks described herein are more easily installed on non-planar walls because they can fit together without excessive force. Furthermore, the lock and key design will maintain gauge and overlap better than other "V" style lock designs. As such, the planks will look better on the wall because they will be straighter than the frame, which is often non-planar.

Figure 24:
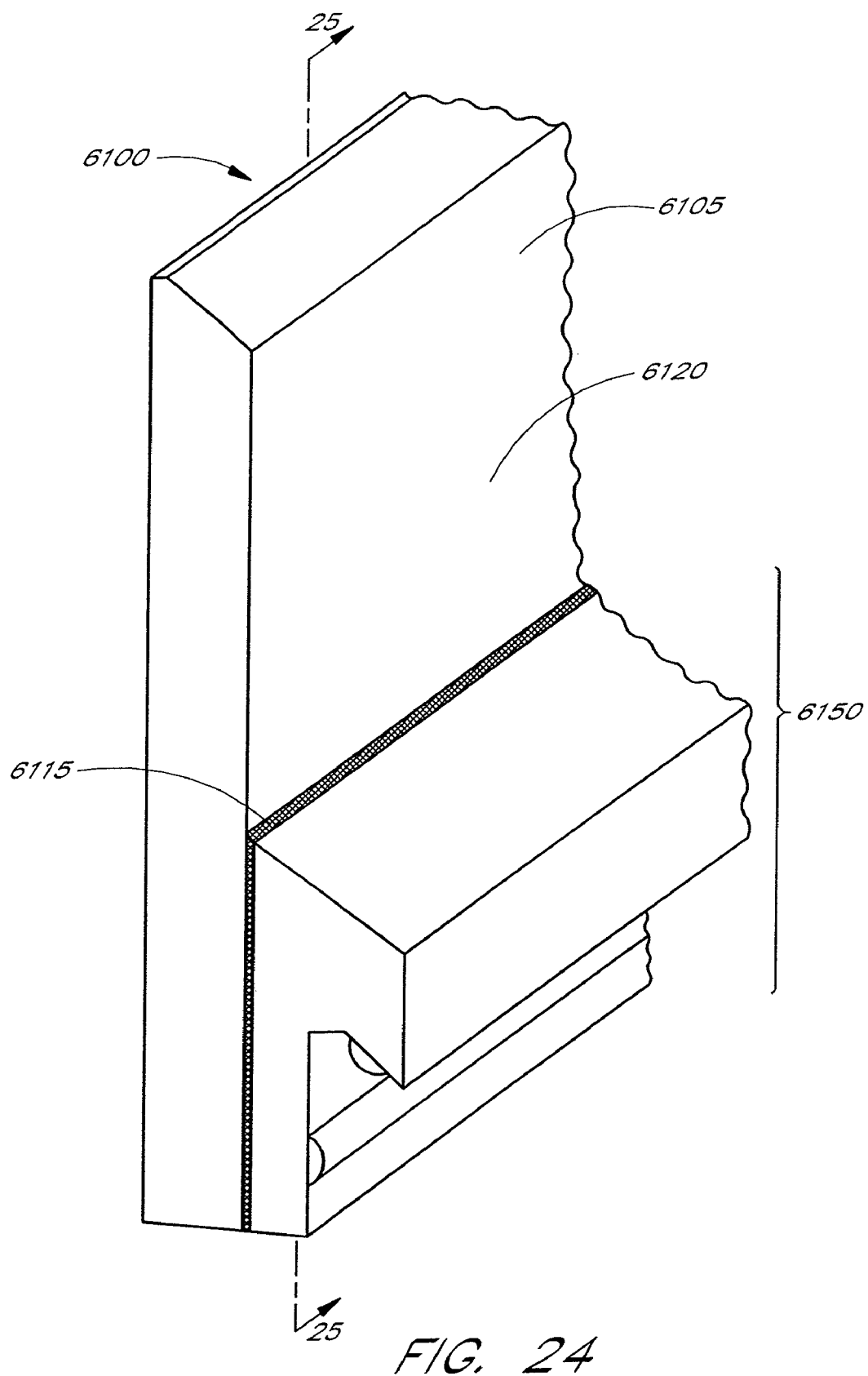
FIG. 24 shows an isometric view of another embodiment of the FC plank assembly.

FIG. 24 shows an isometric view of a FC plank assembly 6100, which includes a plank body 6105, a lock assembly 6150, and an adhesive 6115. Plank body 6105 is fixedly connected to lock assembly 6150 via an adhesive layer 6115, as shown in FIG. 24. Adhesive 6115 is preferably a polymeric hot-melt adhesive or a cementitious adhesive. The method of making a two-piece plank bonded with one of these two adhesives is described above. Table 3 shows preferred ranges of plank body 6105 dimensions for one embodiment:

TABLE 3

Preferred range of plank dimensions

| Dimension | Range/Units |
| --- | --- |
| Thickness | about 3/16-1/2 inch |
| Width | about 5-12 inches |
| Length | about 12-16 feet |

Figure 25:
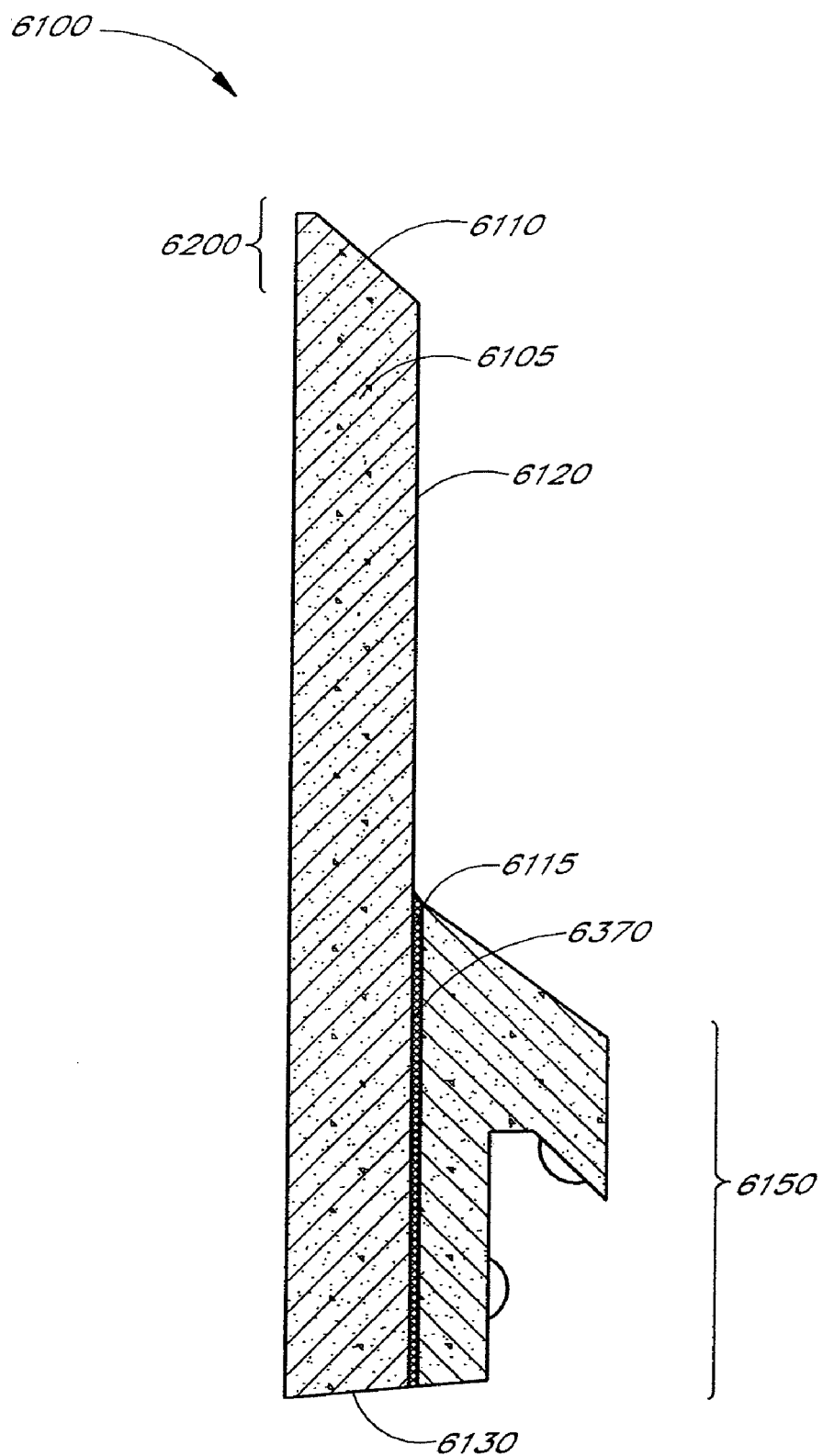
FIG. 25 shows a cross-section of the plank assembly of FIG. 24.
Figure 26:
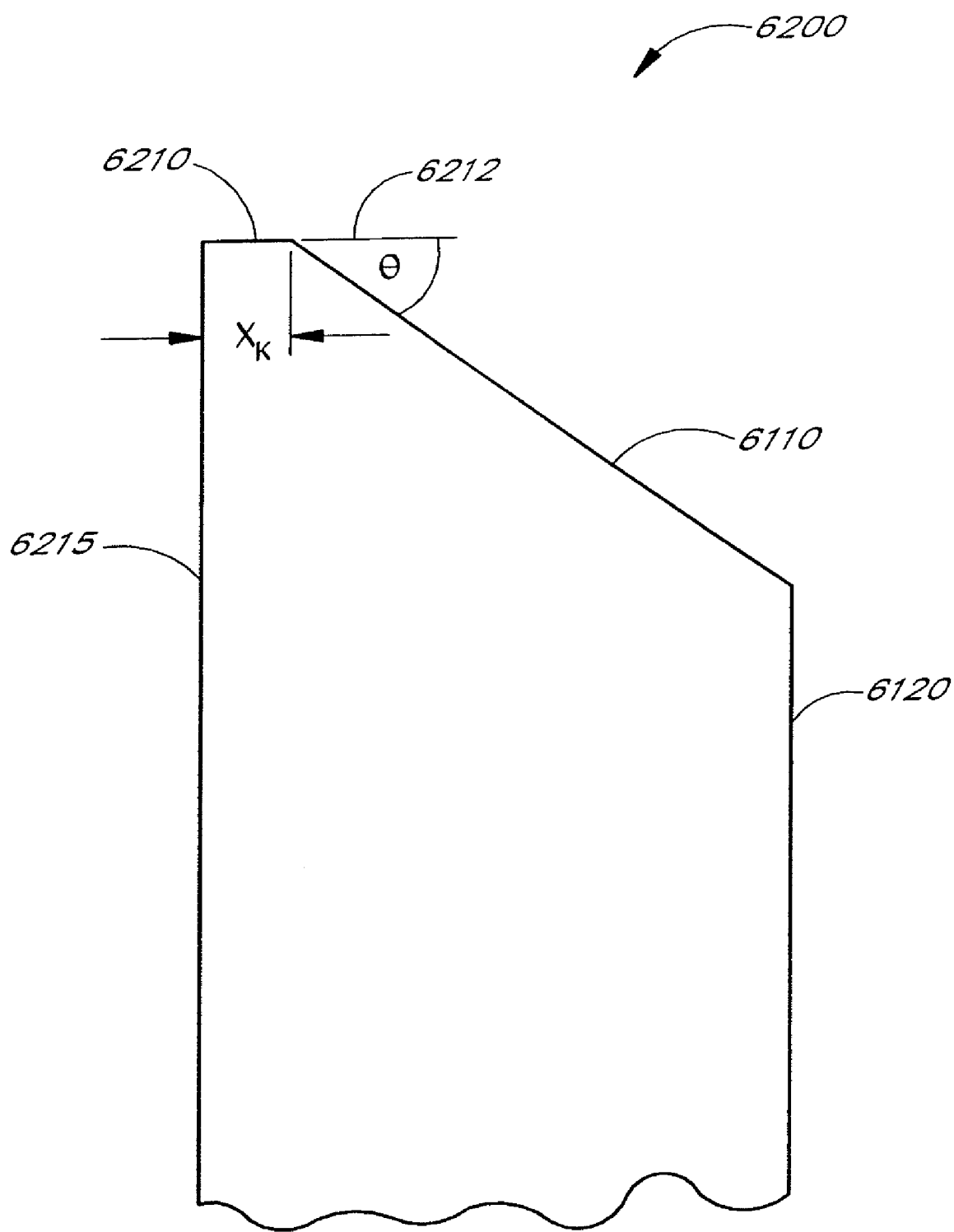
FIG. 26 shows a key tip on the FC plank assembly of FIG. 24.

FIG. 25 shows a cross-section of plank assembly 6100 taken along line 25-25 shown in FIG. 24. This view shows how lock front surface 6370 is bonded to plank back surface 6120 via adhesive 6115. The method used to bond lock front surface 6370 to plank back surface 6120 is the same as that described above. FIG. 26 shows a key 6200, part of plank assembly 6100, in greater detail. Key 6200 includes key tip 6210, which is a surface cut on a horizontal plane, parallel to horizontal line 6212, to "blunt" the edge between plank front surface 6215 and plank top surface 6110. The length of key tip 6210 is $X_k$, as shown in FIG. 26. Length $X_k$ may vary in one embodiment from about 1/16" to 3/16". Plank top surface 6110 is cut at an angle θ, relative to horizontal line 6212, which may range from about 5 degrees to 60 degrees.

Figure 27:
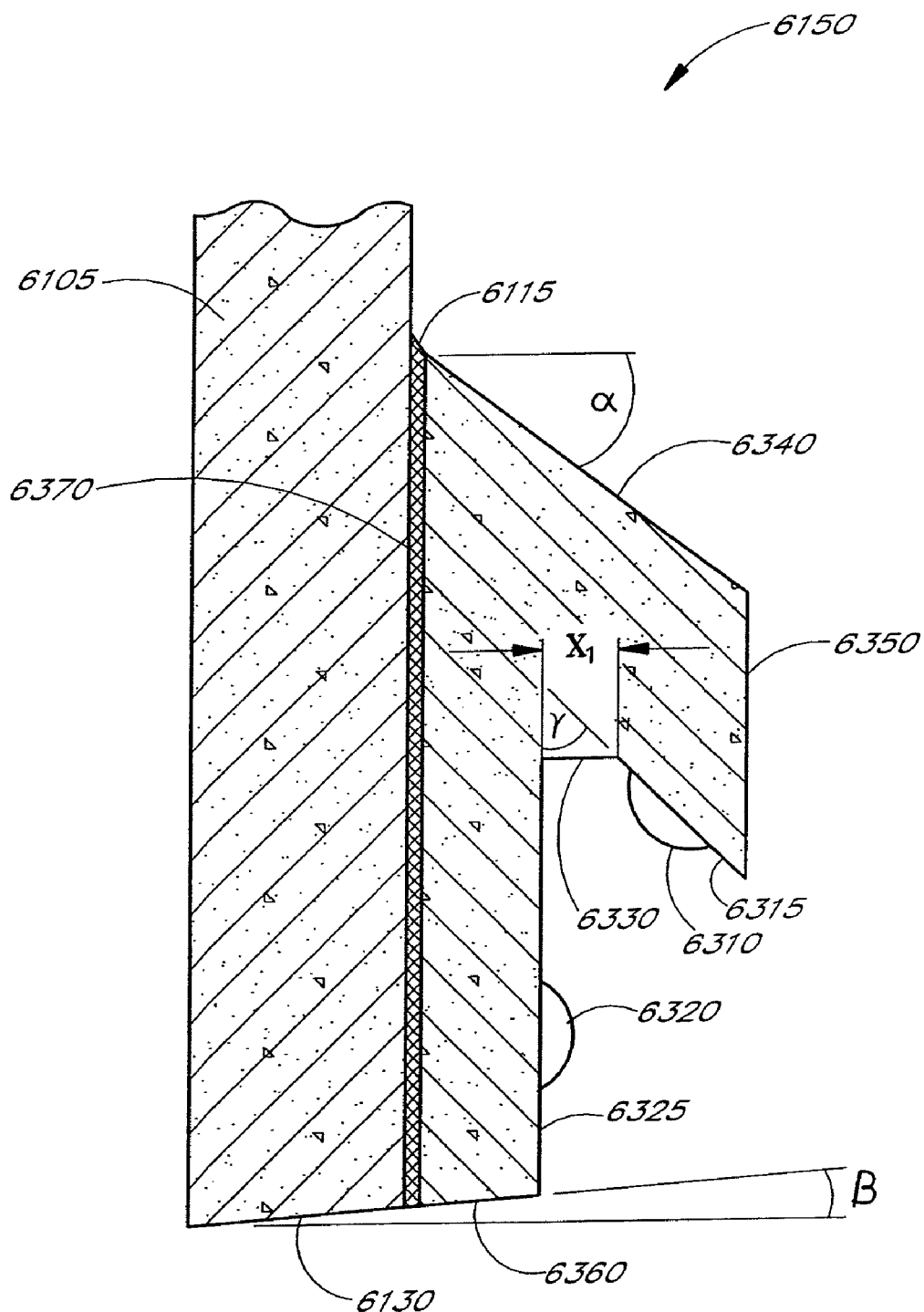
FIG. 27 shows an enlarged cross-sectional view of the lock assembly on the FC plank assembly of FIG. 24.

FIG. 27 shows the lock assembly 6150 in greater detail, including a lock inner angled surface 6315, where first compressible region 6310 is located, a lock inner surface 6325, where second compressible region 6320 is located, and a lock inner blunted surface 6330. The length of lock inner blunted surface 6330 is $X_1$, as shown in FIG. 27. Length $X_1$ may range from about $X_k+1/16"$ to $X_k+1/8"$. First compressible region 6310 and second compressible region 6320 may be constructed of compressible materials, such as polyurethane elastomeric foam, rubber, rubber foam, or silicone rubber.

Again in reference to FIG. 27, lock inner blunted surface 6330 is shown at an about 90-degree angle to lock front surface 6370. The purpose of "blunting" the sharp cut where lock inner surface 6325 and lock inner angled surface 6315 meet is to provide a substantially flat surface rather than a sliding point for the plank assembly to be locked into the plank assembly above. Lock inner blunted surface 6330 provides a more positive gauge for the plank assembly.

Figure 28:
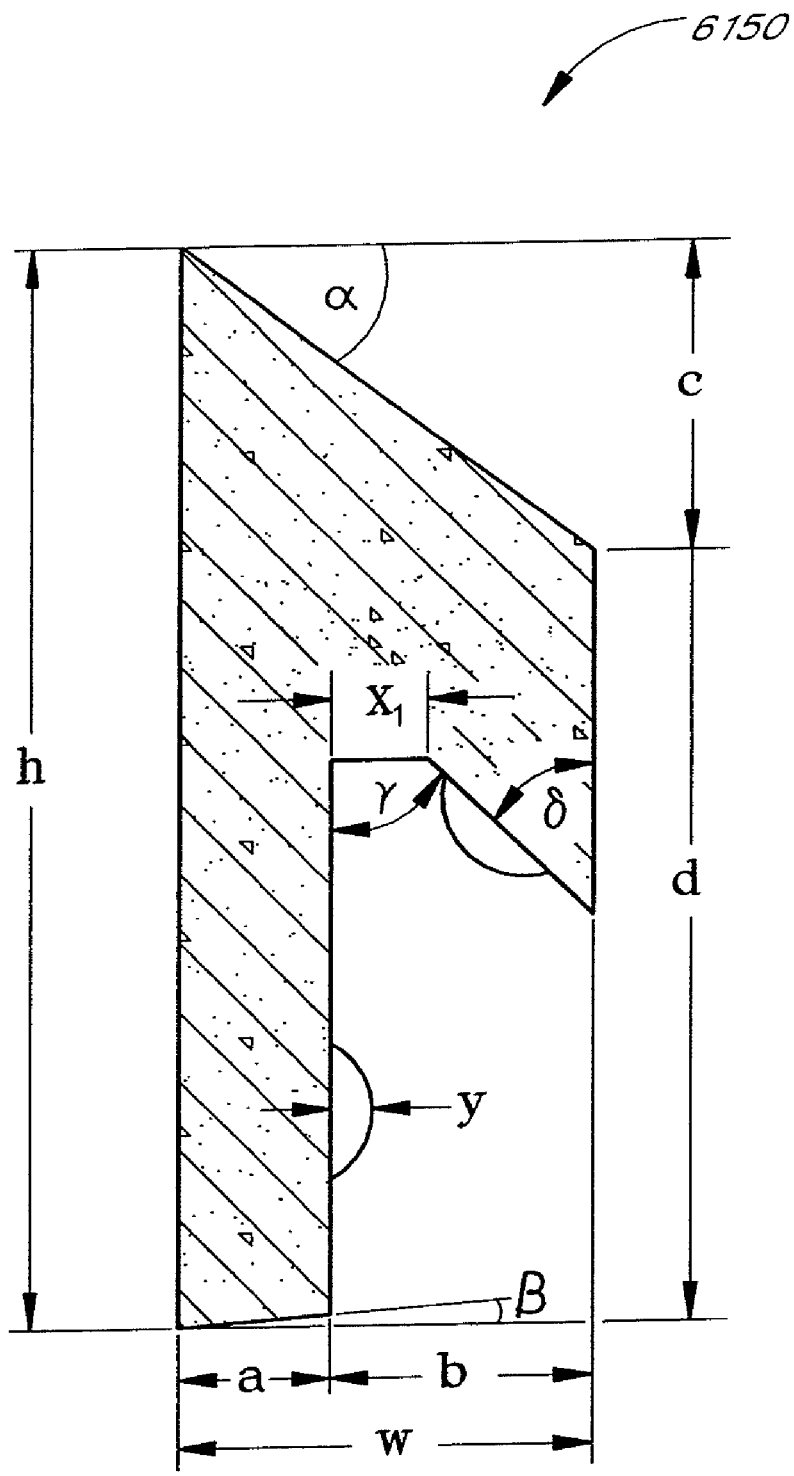
FIG. 28 shows a cross-sectional view of the lock assembly of FIG. 27 with approximate dimensions.

FIG. 28 shows the approximate dimensions of lock assembly 6150. Preferred ranges for the labeled dimensions in FIG. 27 and FIG. 28 are shown below in Table 4.

TABLE 4

Figure 29:
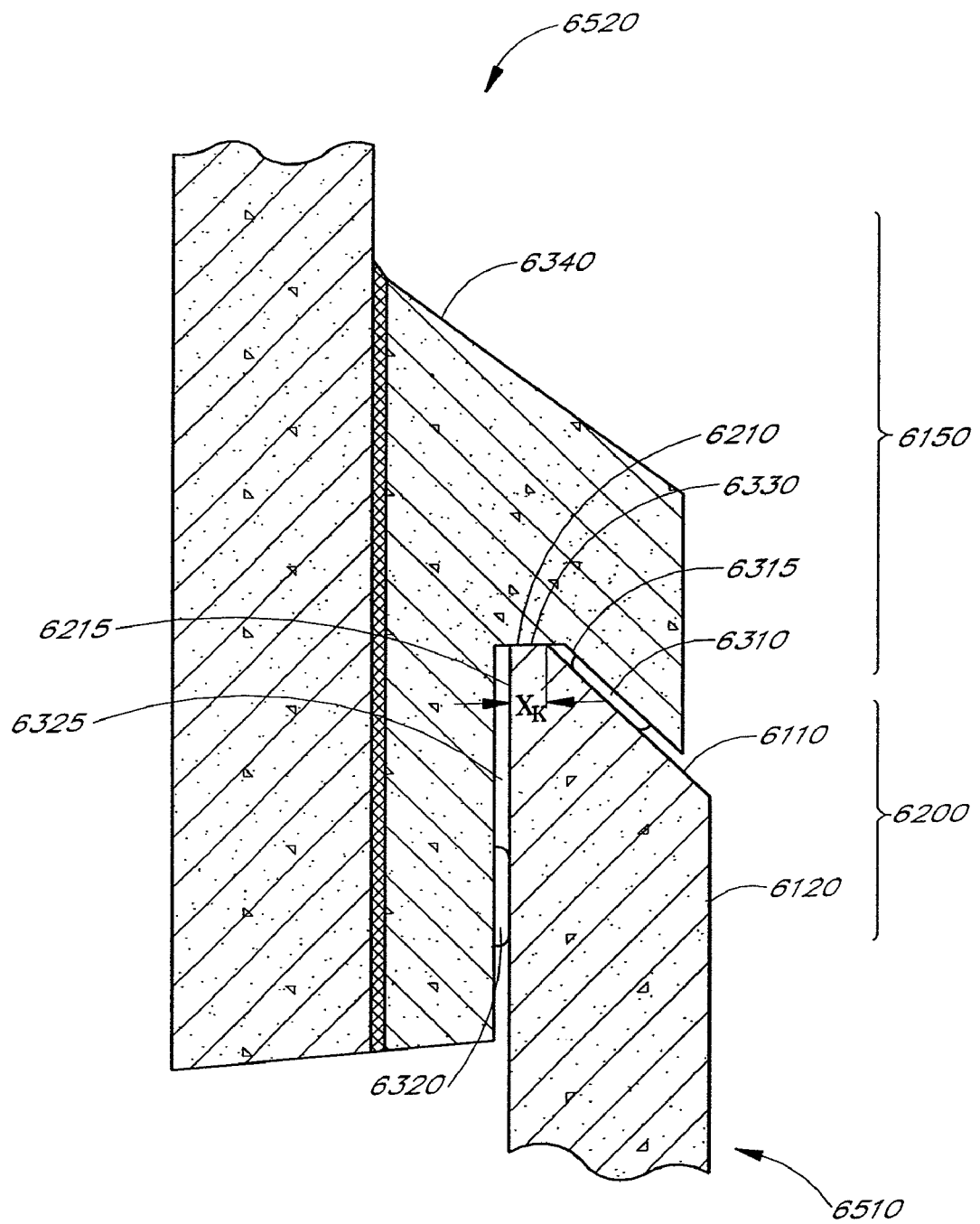
FIG. 29 shows a cross-sectional view of lock assembly and key of two adjacent FC plank assemblies.

Preferred range of variables for lock assembly dimensions as shown in FIGS. 27 through 29

| Dimension as Labeled in FIG. 28 and FIG. 29 | Range of Dimension |
| --- | --- |
| A | about 3/16" to 1/2" |
| B | about 3/16 to 1/2" |
| C | about 0" to 1 1/4" |
| D | about 1/2" to 2.0" |
| H | about 1/2" to 2.0" |
| W | about 3/8" to 3/4" |
| $X_k$ (key) | about 1/16" to 3/16" |
| $X_1$ (lock) | about $X_k + 1/16"$ to $X_k + 1/8"$ |
| Y | about 1/32" to 1/8" |
| α (alpha) | about 0 degrees to 60 degrees |
| β (beta) | about 0 degrees to 30 degrees |
| γ (delta) | about 30 to 85 degrees |
| δ (gamma) | about 30 to 85 degrees |

FIG. 29 illustrates how key 6200 of a first plank assembly 6510 fits into lock assembly 6150 of a second plank assembly 6520, and how the shape of lock assembly 6150 and key 6200 enhance the performance of the plank assembly. Lock inner blunted surface 6330 and key tip 6210 are each cut at 90-degree angles to plank front surface 6215. This design allows the plank assemblies some lateral compensation for installation on non-planar walls. Although lock assembly 6150 may shift laterally after being installed, the overlap is maintained because key tip 6210 and blunted surface 6330 do not shift vertically. First compressible region 6310 and second compressible region 6320 have been added to the embodiment to seal lock assembly 6150 with key 6200, and to absorb lateral movement of plank assembly 6510 and 6520. The existence of compressible regions 6310 and 6320 also increases the ease of installation because the plank assemblies can be locked into place without requiring excessive force. The second plank assembly 6520 locked into the first plank assembly 6510 below it can move within the compressible distance between lock inner angled surface 6315 and the top of first compressible region 6310, and between lock inner surface 6325 and the top of second compressible region 6320.

Because the wall frame is often not "plumb" (the wall may be non-planar), the top surface of key 6200 does not form a straight line. By allowing the bottom surface of second plank assembly 6520 to move relative to the key 6200, the lock assembly 6150 can still be straight when placed over the key 6200 (it is being held straight by its own stiffness). Although not perfect, the arrangement is a considerable improvement in the waviness of the wall compared with just following the faults in the frame.

Figure 30:
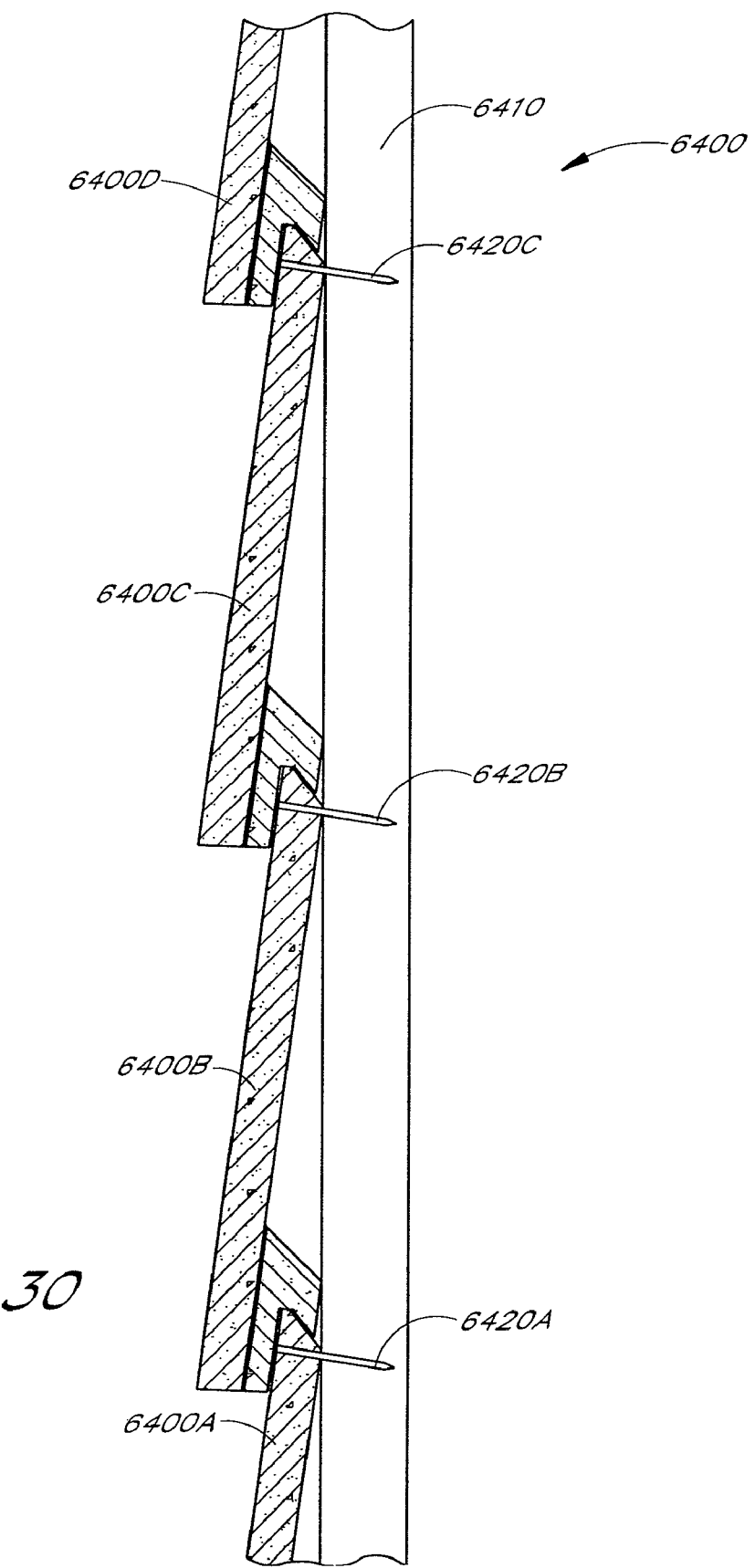
FIG. 30 shows a cross-sectional view of a siding system made up of two-piece planks with oversized "V" style lock and compressible regions in accordance with FIG. 24.

FIG. 30 shows how a siding system 6400 appears after installation on a mounting surface 6410. Mounting surface 6410 is typically made of a series of wall studs (not shown). Plank assemblies 6400A, 6400B, 6400C, and 6400D are installed such that each plank assembly locks into the plank assembly below it. For example, nail 6420A fixes the top of plank assembly 6400A to mounting surface 6410. Plank assembly 6400B is installed directly above it, such that the oversized "V" style lock secures plank assembly 6400B. Nail 6420B then fixes the top of plank assembly 6400B to mounting surface 6410. This process is repeated with plank assembly 6400C, plank assembly 6400D, nail 6420C, and any additional plank assemblies and nails required to cover the mounting surface as desired.

The lock and key design, combined with compressible regions 6310 and 6320, provide some "give" (lateral compensation) in siding system 6400. As a result, the siding will compensate for moderate non-planarity of mounting surface 6410 and siding system 6400 will appear planar (flat).

Figure 31:
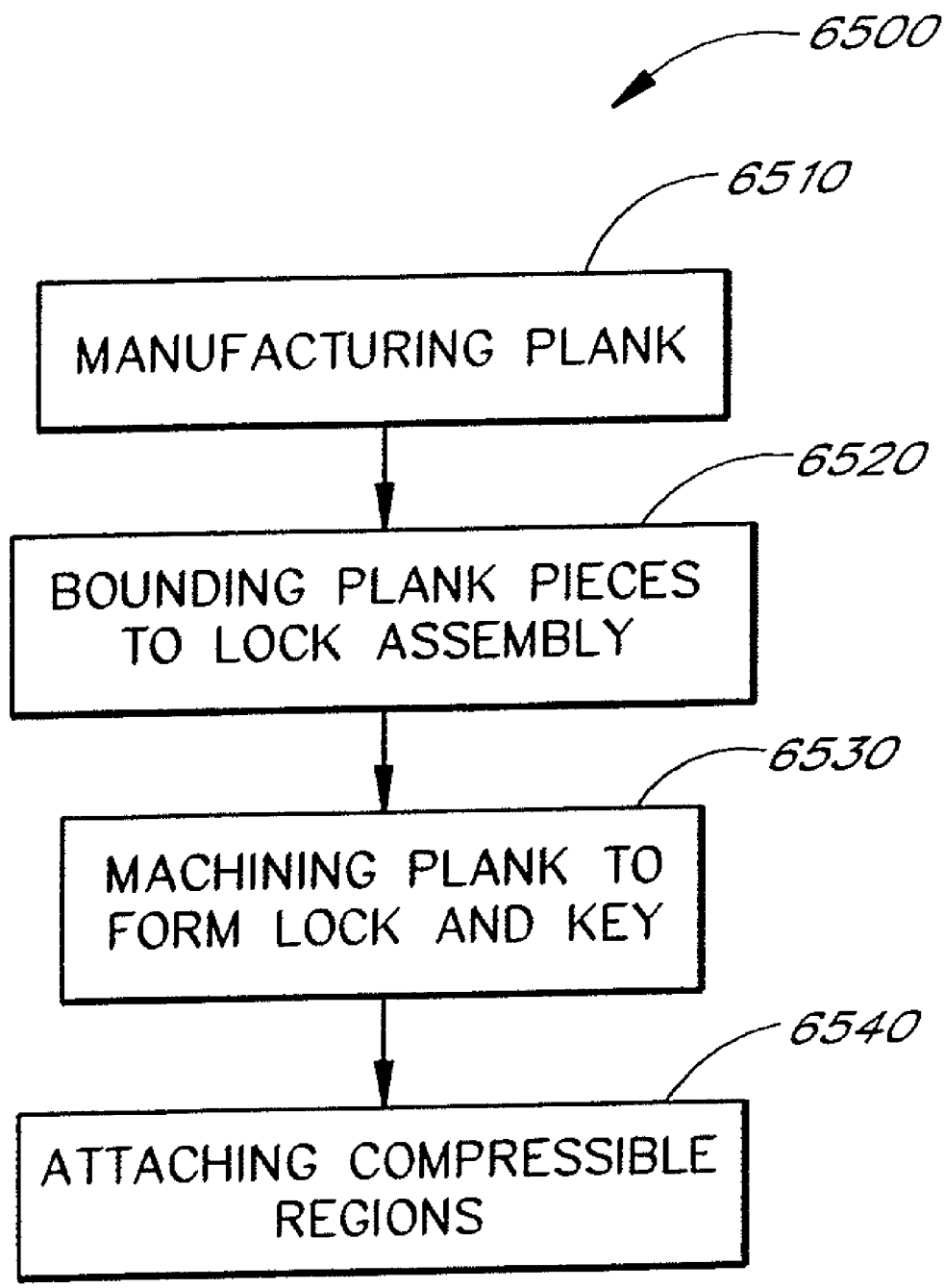
FIG. 31 shows a method of making the plank of FIG. 24 with an oversized "V" style lock and compressible regions.

FIG. 31 shows a flow chart of a method 6500 of making a two-piece FC plank with an oversized "V" style lock and compressible regions, including the steps of:

Step 6510: Manufacturing plank. In this step, a plank is preferably manufactured according to conventional Hatschek methods.

Step 6520: Bonding plank pieces. In this step, plank body 6105 is bonded to lock assembly 6150 to form the plank assembly 6100 shown in FIG. 24. The method of bonding two pieces of FC material to form a two-piece plank either using a polymeric hot-melt adhesive or a cementitious adhesive is described above in greater detail. Some alternate embodiments may not require this step if they do not include bonded pieces.

Step 6530: Machining plank to form key and lock. In this step, planks are fabricated and machined to the requisite shape. In reference to FIGS. 24-26, plank body 6105 is cut to form the plank top surface 6110 and plank bottom surface 6130. Specifically, plank top surface 6110 is cut (to form the key) at an angle of θ, which ranges from about 5 degrees to 60 degrees, as shown in FIG. 26. Plank bottom surface 6130 is cut at an angle of β, which ranges from about 0 to 30 degrees, as shown in FIG. 27. To form the lock assembly 6150, the bonded piece is first cut at angle beta to form lock bottom surface 6360, as shown in FIG. 27. The remaining surfaces of lock assembly 6150 are cut to meet the specifications of length and angle listed in Table 4 above. Moreover, this step uses the same method as described above in making a two-piece plank with a lock and key design, including steps required to cut the plank.

Step 6540: Attaching compressible regions. In this step, first compressible region 6310 and second compressible region 6320 are attached to lock assembly 6150. Materials that may be used for compressible regions 6310 and 6320 include commercially available products such as polyurethane elastomeric foam, rubber, rubber foam, and silicone rubber. The compressible regions are applied using conventional application methods, such as "Nordsons" FoamMelt® application equipment such as the Series 130, applied at about 250 degrees F. to 350 degrees F. First compressible region 6310 is applied to the length of the lock assembly 6150 along lock inner angled surface 6315, and second compressible region 6320 is applied to the length of lock assembly 6150 along lock inner surface 6325, as shown in FIG. 27. The thickness y of compressible region 6310 and compressible region 6320, as shown in Table 4, may range from about 1/32" to 1/8".

This particular embodiment describes a two-piece plank; however, the use of compressible regions may be applied to other plank designs as well. Some examples of planks that could utilize this feature are any of the above-described one or two piece planks and the below-described plank having a plastic spline. An extruded plank could utilize this feature, as could any plank of similar shape that uses a locking mechanism in place of face nailing an outer plank bottom edge to an inner plank top edge, where the inner plank top edge has been nailed to a frame. Exemplifying diagrams of two plank designs that could utilize the compressible regions are shown in FIG. 32.

Figure 32A:
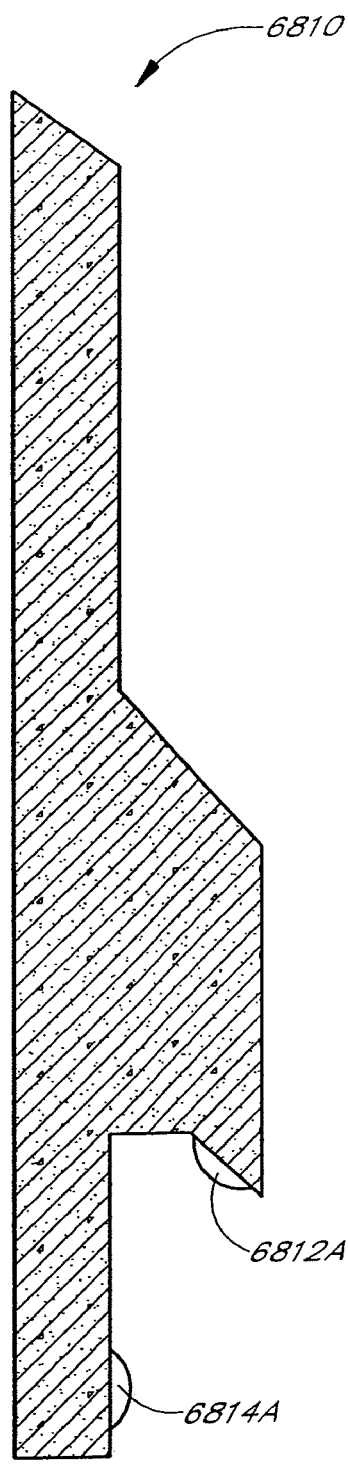
FIGS. 32A and 32B show alternate cross-sectional views of plank designs that could utilize first and second compressible regions.
Figure 32B:
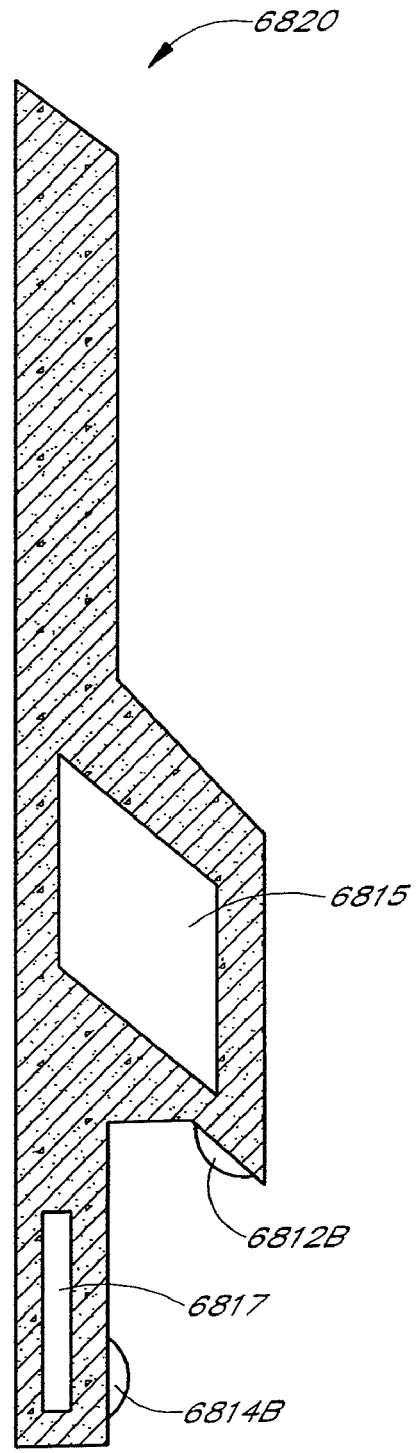

FIGS. 32A and 32B show plank designs that could utilize compressible regions to enhance the plank functionality. FIG. 32A shows extruded plank 6810 with first compressible region 6812A and second compressible region 6814A. FIG. 32B shows hollow plank 6820 with first hollow region 6815 and second hollow region 6817, where the hollow regions may be filled with foam or other material, or left open with no fill, and also shows first compressible region 6812B and second compressible region 6814B.

The design described above advantageously allows planks to be more easily installed on non-planar walls because they can be fit together without excessive force. The compressible material also advantageously forms a capillary break, such as described below. Furthermore, the compressible material acts as a seal against wind and rain.

V. Two-Piece Plank Having a Plastic Spline

In additional embodiments, a plastic spline having a butt and lock is provided, which is designed for use in combination with a FC plank for a siding application. The result is a two-piece FC plank assembly having an FC siding plank bonded with an adhesive to a plastic spline having a butt and lock.

Advantageously, the siding assembly of these embodiments provide a lightweight siding assembly having a reduced amount of the FC material while maintaining an aesthetically pleasing shadow line when installed. They also provide for a low-cost siding assembly with increased stiffness and strength, which reduces breakage and improves handleability and ease of installation. The siding assembly is also suitable for blind nailing and capable of high wind loads. The spline can also be easily manufactured from plastic with fine details using an extrusion and or molding processes well known in the art. The term plastic includes, but is not limited to, polymeric resins, copolymers and blends thereof with suitable flexural and tensile strength for the anticipated use and a heat deflection point well above the maximum normally experienced in the building environment (approximately 40° C. to 60° C.). Such plastics could include but are not limited to: polystyrene, polyvinyl chloride, polyolefin, polyamide (nylon), and ABS. These plastics can contain mineral fillers to reduce cost or weight and improve strength or toughness properties. Alternatively, these plastics may also contain fibers to improve tensile strength. The plastic spline can be manufactured using low grade or recycled plastic for additional cost savings without sacrificing desired attributes.

A. Spline with Angled Lock

Figure 33:
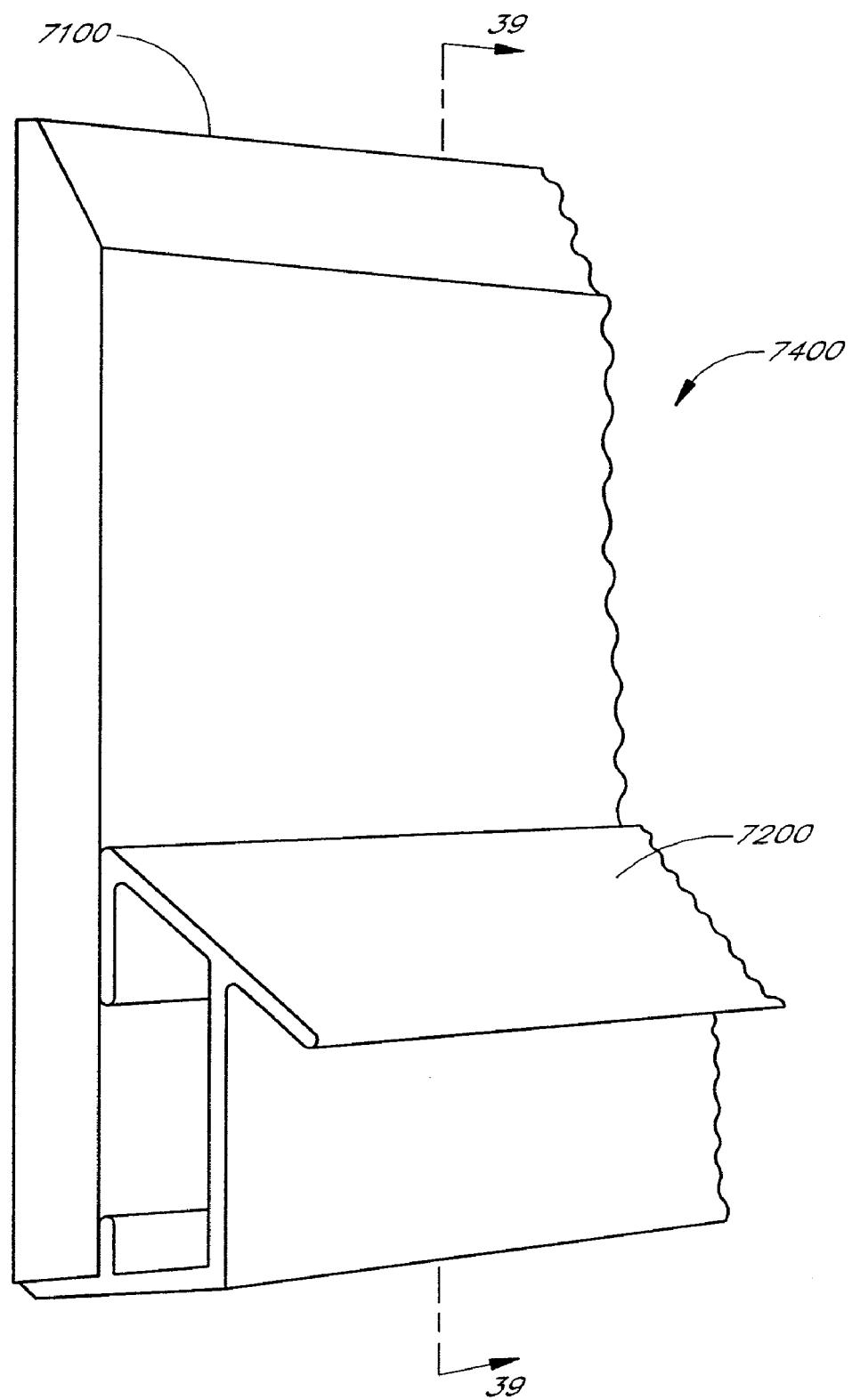
FIG. 33 shows an isometric view of a section of a siding plank assembly with a locking spline in accordance with another embodiment of the present invention.

FIG. 33 shows an isometric view of the siding plank assembly of one preferred embodiment. Plank assembly 7400 includes a plank 7100 and a spline 7200. Plank 7100 is preferably a siding plank manufactured of medium-density FC material using a well-known Hatschek process. Spline 7200 is a "butt and lock" type spline manufactured of rigid plastic using a well-known extrusion process. Spline 7200 is aligned and is fixedly connected with an adhesive to plank 7100 (described in greater detail below).

Figure 34:
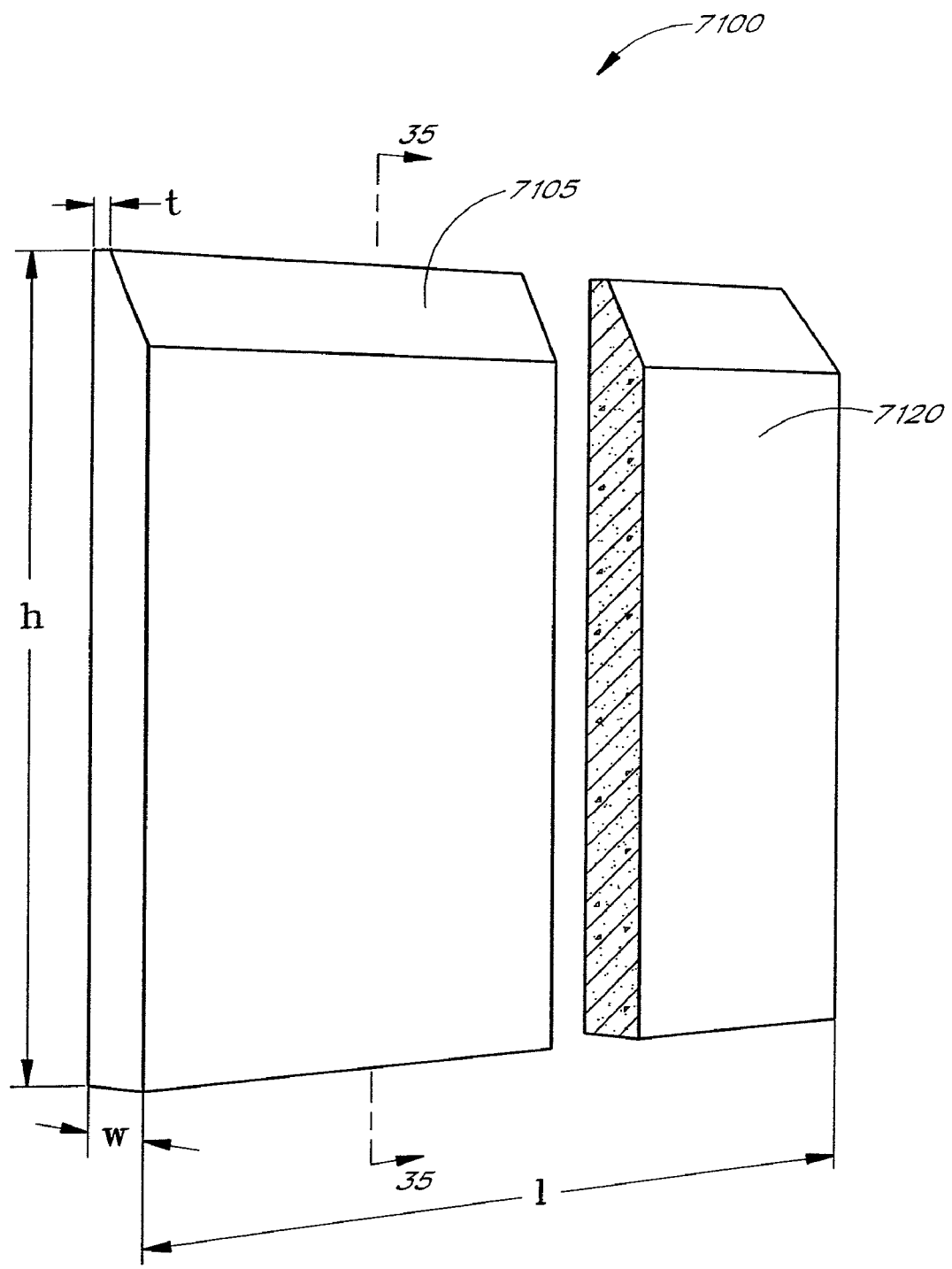
FIG. 34 shows an isometric view of the plank of FIG. 33.

FIG. 34 shows an isometric view of the FC siding plank of a preferred embodiment. Plank 7100 is a siding plank that includes a plank top surface 7105, and a plank back surface 7120. Plank 7100 has a length "l", a width "w", a height "h", and a flat "t". An example of plank 7100 dimensions include "l" between about 12 and 16 feet, "w" between about 3/16 and 1/2 inches, "h" between about 5 and 12 inches, and "t" between about 0 and 1/4 inches. A cross-sectional diagram of plank 7100 is shown in FIG. 35.

Figure 35:
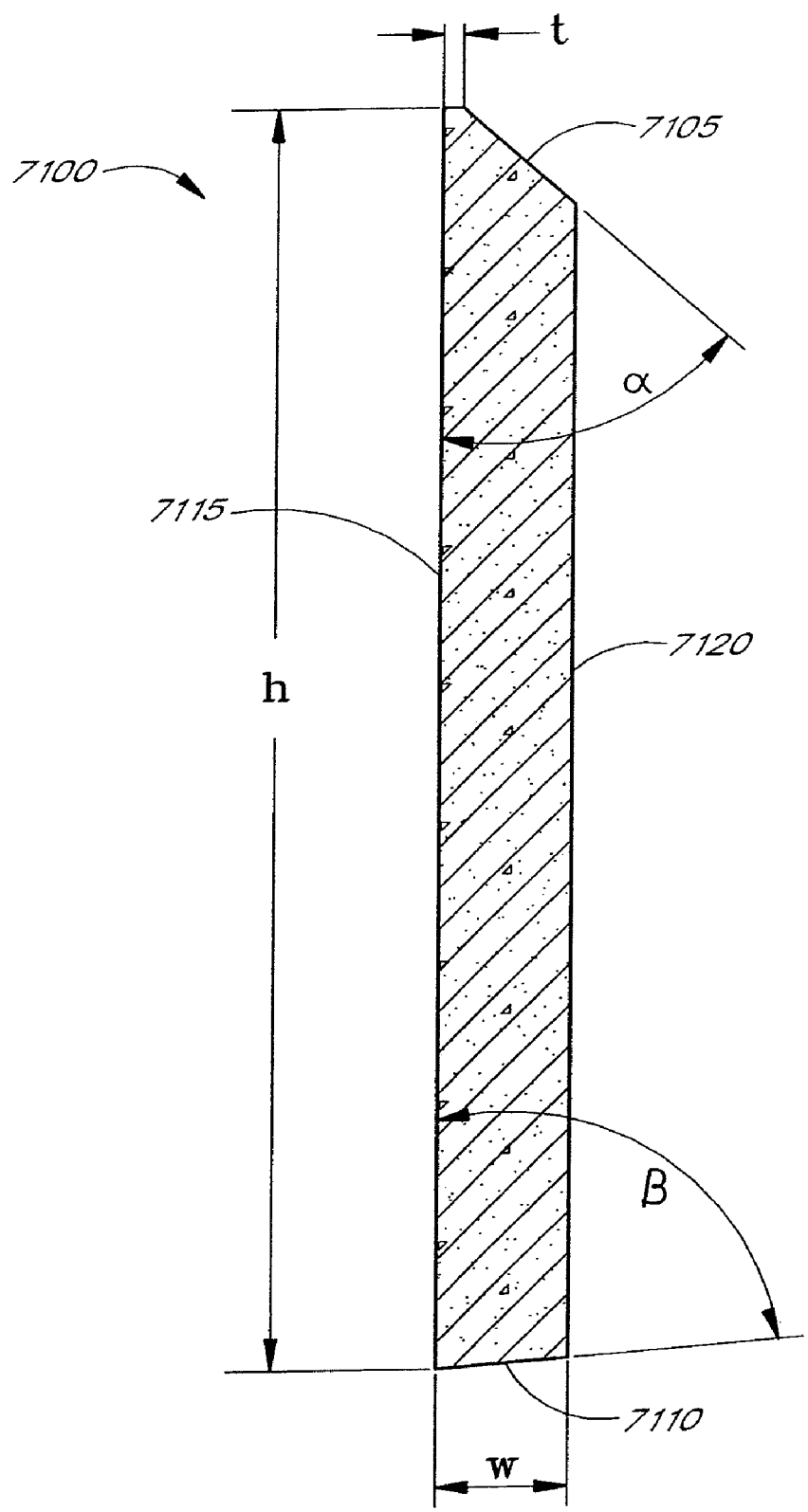
FIG. 35 shows a cross-sectional view of the plank of FIG. 33.

FIG. 35 is a cross-sectional diagram of plank 7100 taken along line 35-35 of FIG. 34. In this view, additional details of the plank 7100 are visible. Plank 7100 further includes a plank bottom surface 7110 and a plank front surface 7115. Also shown are plank top surface 7105 and plank back surface 7120. Plank top surface 7105 is set at an angle "α" to plank front surface 7115. Plank bottom surface 7110 is set at an angle "β" to plank front surface 7115. In one example, "α" is 45° and "β" is 84°. Angles "α" and "β" of plank 7100 are cut using angled water jet cutters during normal Hatschek manufacturing processing. Preferred dimensions and angles of plank 7100 are indicated in Table 5.

TABLE 5

Plank 7100 dimensions

| Dimension | Range of Dimension |
| --- | --- |
| Width "w" | about 0.1875 to 0.500 inches |
| Height "h" | about 5 to 12 inches |
| Length "l" | about 12 to 16 feet |
| Flat "t" | about 0 to 0.250 inches |
| angle "α" | about 5 to 60 degrees |
| angle "β" | about 60 to 90 degrees |

Figure 36:
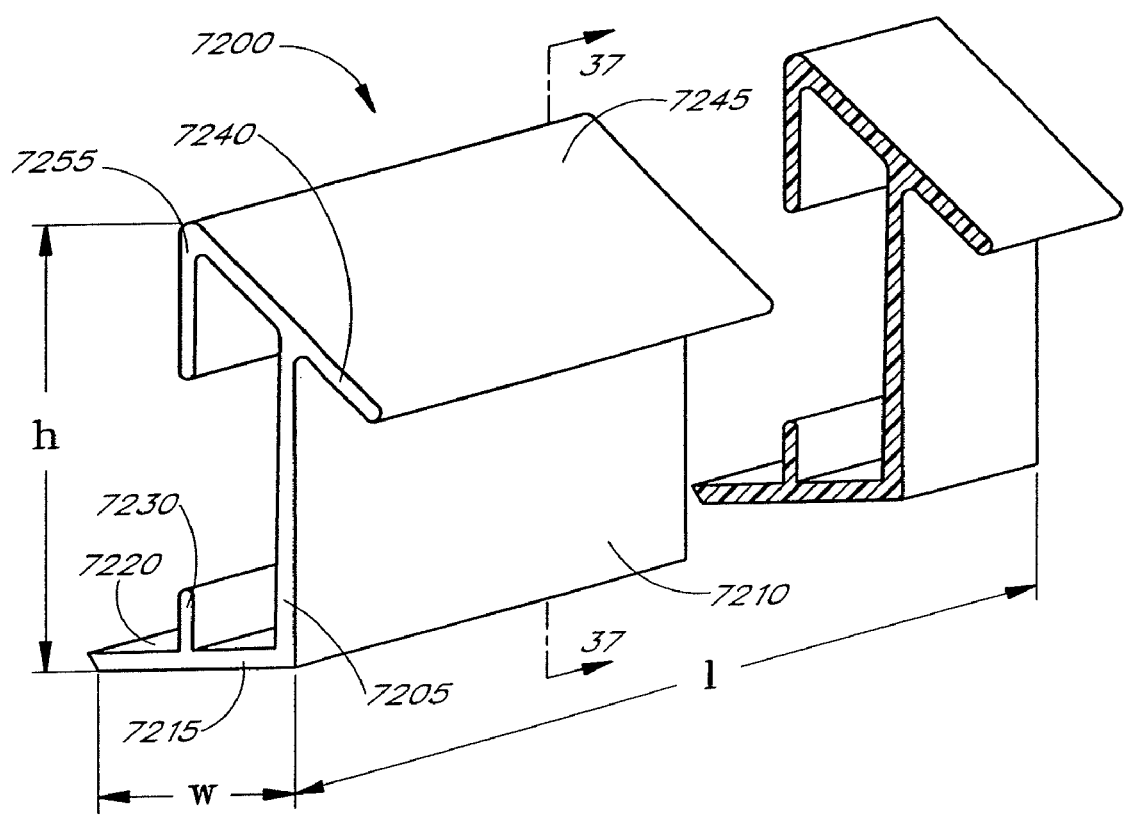
FIG. 36 shows an isometric view of the locking spline of FIG. 33.

FIG. 36 shows an isometric view of the plastic locking spline of a preferred embodiment. Spline 7200 includes a generally vertical plate 7205, a plate back surface 7210, a first flange 7215, a first flange top surface 7220, a second flange 7230, a third flange 7240, a third flange top surface 7245, and a fourth flange 7255. Spline 7200 has a length "l", a width "w", and a height "h". An example of spline 7200 dimensions include "l" between about 12 and 16 feet, "w" between about 3/8 and 3/4 inches, and "h" between about 1/2 and 2 inches. A cross-sectional diagram of spline 7200 is shown in FIG. 37.

Figure 37:
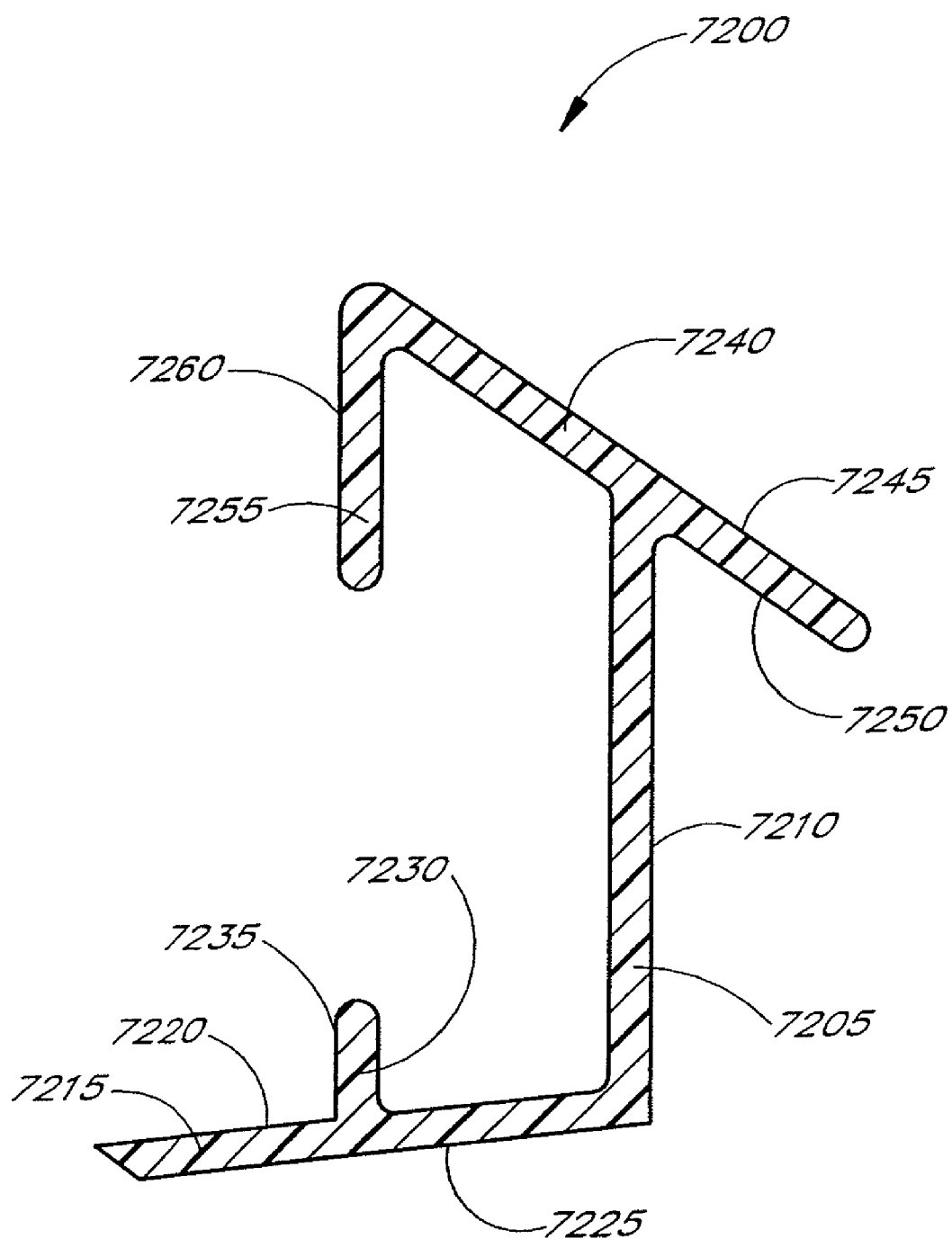
FIG. 37 shows a cross-section of the locking spline of FIG. 33.

FIG. 37 is a cross-sectional diagram of spline 7200 taken along line 37-37 of FIG. 36. In this view, additional details of the spline 7200 are visible. Spline 7200 further includes a first flange bottom surface 7225, a second flange front surface 7235, a third flange bottom surface 7250, and a fourth flange front surface 7260. Also shown is plate 7205, plate back surface 7210, first flange 7215, first flange top surface 7220, second flange 7230, third flange 7240, third flange top surface 7245, and fourth flange 7255.

A first edge of first flange 7215 is integrally connected at an angle to a first edge of elongated plate 7205. A second edge of elongated plate 7205 is integrally connected at an angle along third flange 7240 between the first and second edges of third flange 7240. A first edge of fourth flange 7260 is integrally connected to a second edge of third flange 7240 in parallel with plate 7205. A first edge of second flange 7230 is integrally connected along first flange 7215 between the first and second edges of first flange 7215 in parallel with plate 7205. Second flange 7230 and fourth flange 7260 are coplanar.

Figure 38:
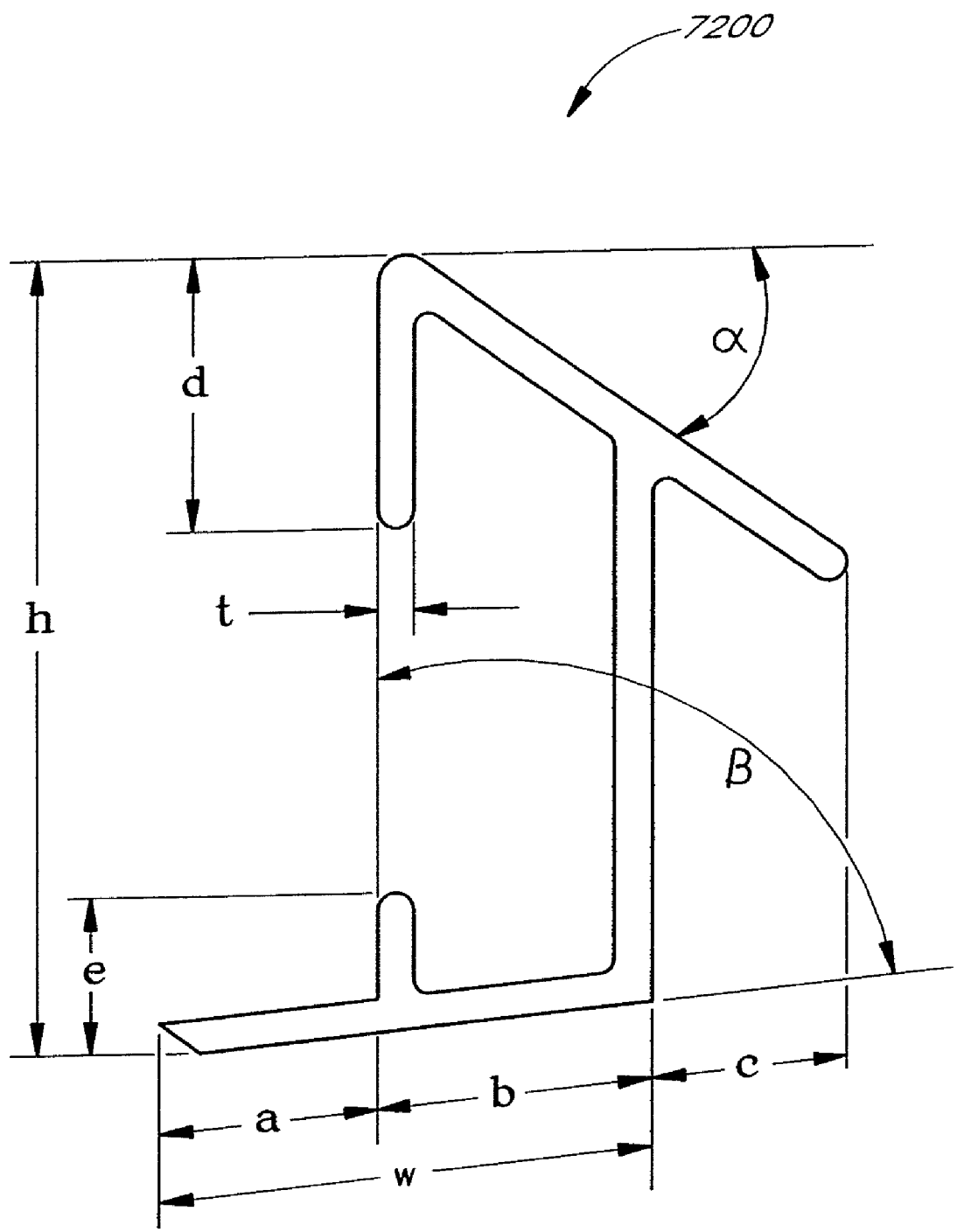
FIG. 38 or end view shows an end view of the locking spline of FIG. 33, with approximate dimensions.

FIG. 38 is an end view of spline 7200. Approximate dimensions and angles of a preferred embodiment of spline 7200 are indicated in Table 6.

TABLE 6

Spline 7200 dimensions

| Dimension | Range of Dimension |
| --- | --- |
| Width "w" | about 0.375 to 0.750 inches |
| Height "h" | about 0.500 to 2.0 inches |
| Length "l" (shown in FIG. 36) | about 12 to 16 feet |
| "a" | Plank 100 width* − 0.0625 inches |
| "b" | w − a |
| "c" | Plank 100 width* − 0.0625 inches |
| "d" | (h − e) to (0.1 × h) |
| "e" | (h − d) to (0.1 × h) |
| "f" | about 0.020 to 0.080 inches |
| "α" | about 5 to 60 degrees |
| "β" | about 60 to 90 degrees |

*Plank 100 width = about 0.375 to 0.500 inches

Figure 39:
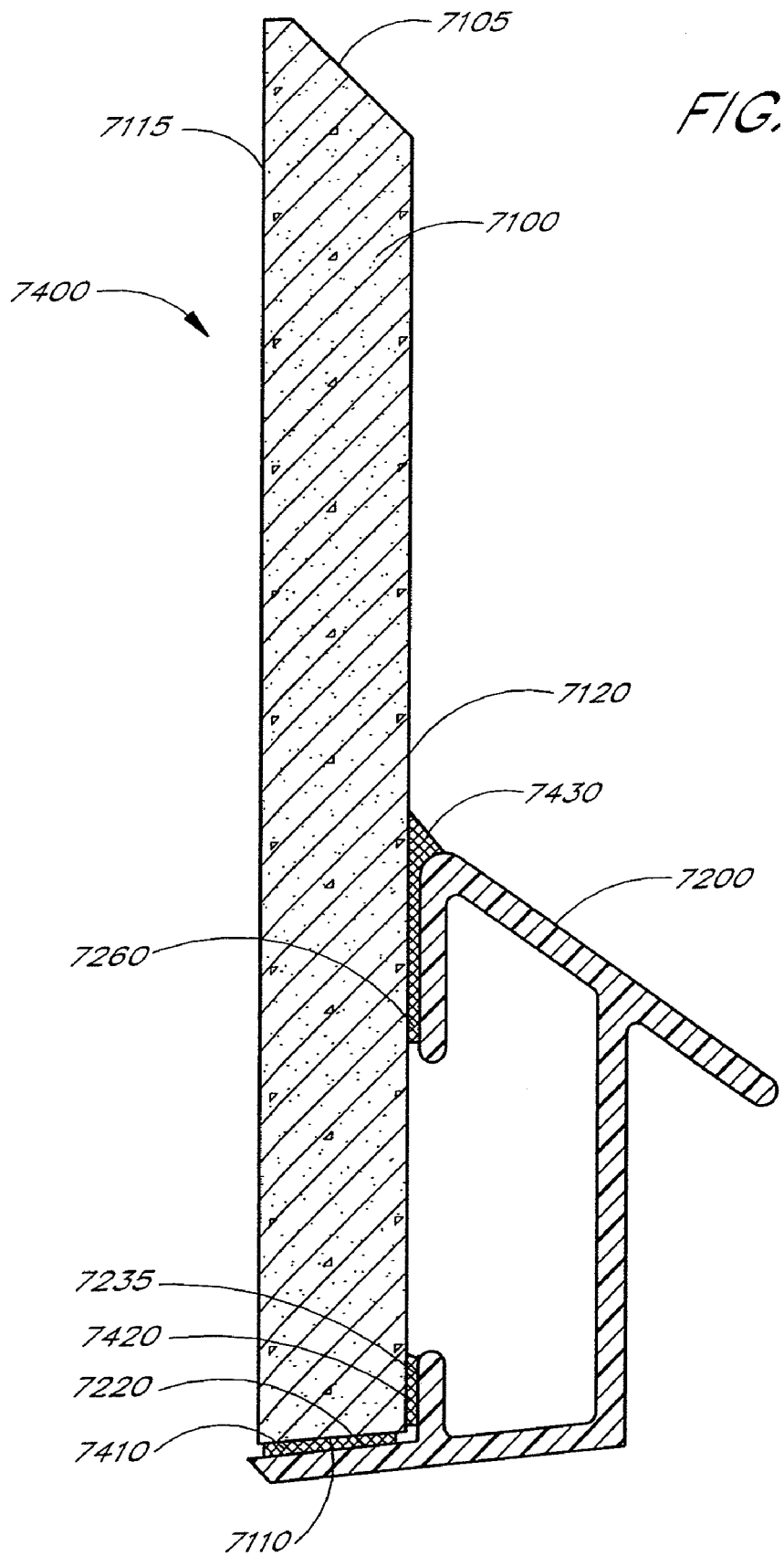
FIG. 39 shows a cross-sectional view of the siding plank assembly of FIG. 33.

FIG. 39 is a cross-sectional diagram of plank assembly 7400 taken along line 39-39 of FIG. 33. In this view, additional details of the plank assembly 7400 are visible. Plank assembly 7400 further includes a first adhesive layer 7410, a second adhesive layer 7420, and a third adhesive layer 7430. With continuing reference to FIG. 39, the position of spline 7200 is shown in relation to plank 7100. First flange top surface 7220 forms a landing adapted to support a bottom portion of the plank 7100 and is fixedly connected to plank bottom surface 7110 with first adhesive layer 7410. Second flange front surface 7235, which forms part of the landing, is fixedly connected to plank back surface 7120 with second adhesive layer 7420. Fourth flange front surface 7260 is fixedly connected to plank back surface 7120 with third adhesive layer 7430. Third adhesive layer 7430 is formed to direct water away from the joint.

Adhesive layer 7410, 7420 and 7430 is preferably a fast setting, reactive hot-melt polyurethane such as H.B. Fuller 2570x or H.B. Fuller 9570 with a viscosity of about 10,000 to 100,000 CPS at application temperatures ranging from about 200° to 350° F. The adhesion time ranges from about 3 to 5 seconds.

Figure 40:
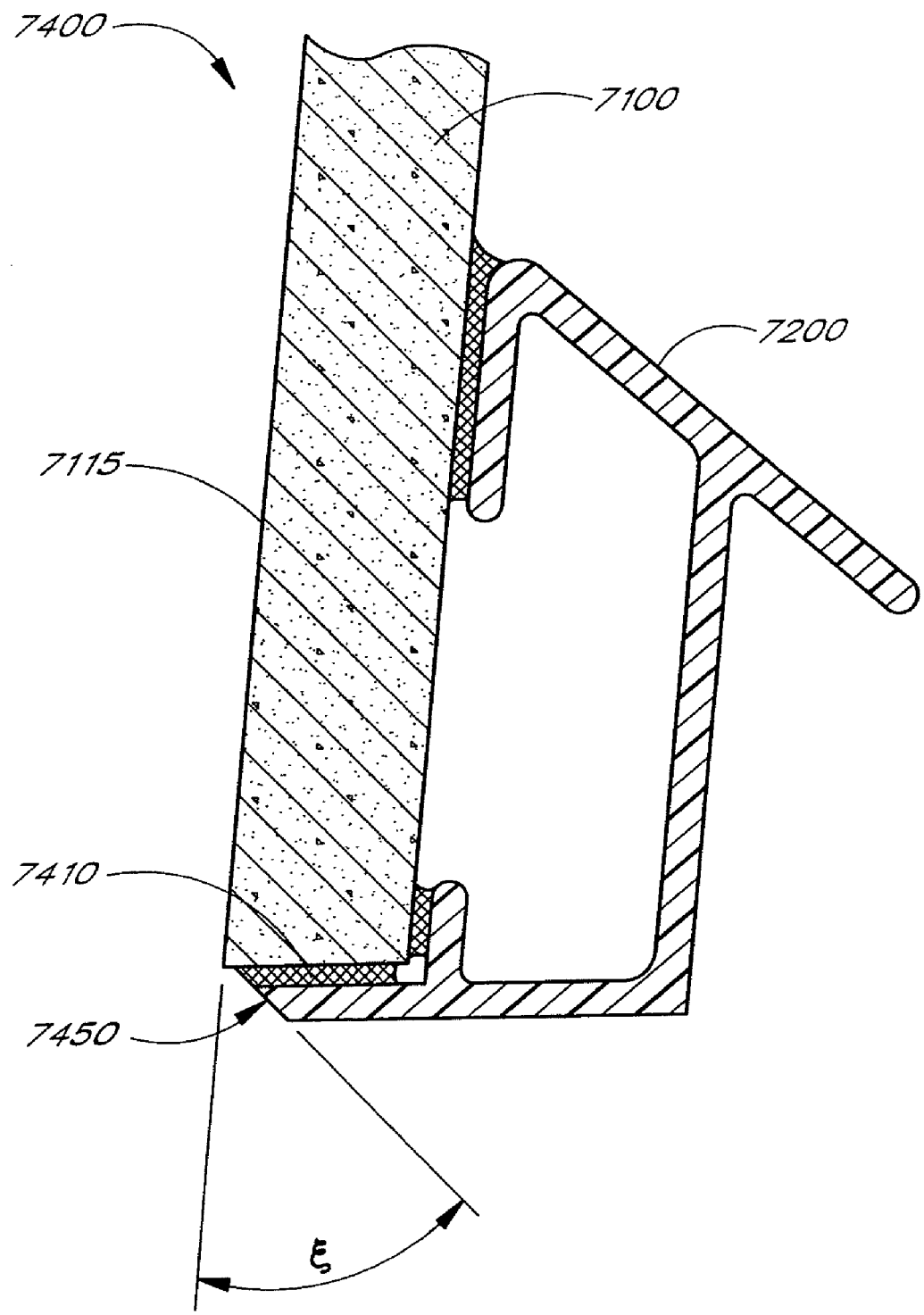
FIG. 40 shows a cross-sectional view of an alternative siding plank assembly having a locking spline with a chamfer.

FIG. 40 shows the same details as FIG. 39 with the addition of a chamfer 7450. Chamfer 7450 is placed at an angle "ε" relative to plank front surface 7115 and may be flat or slightly rounded. Angle "ε" is preferably in the range of about 30 to 60 degrees. With continuing reference to FIG. 40, chamfer 7450 is accomplished by cutting or grinding plank 7100, first adhesive 7410 and spline 7200 such that the three elements are "blended". Chamfer 7450 creates a smooth and aesthetically pleasing drip-edge for plank assembly 7400, suitable for painting. As chamfer 7450 is exposed to the weather, first adhesive 7410 acts as a seal between plank 7100 and spline 7200, blocking wind and moisture.

Figure 41:
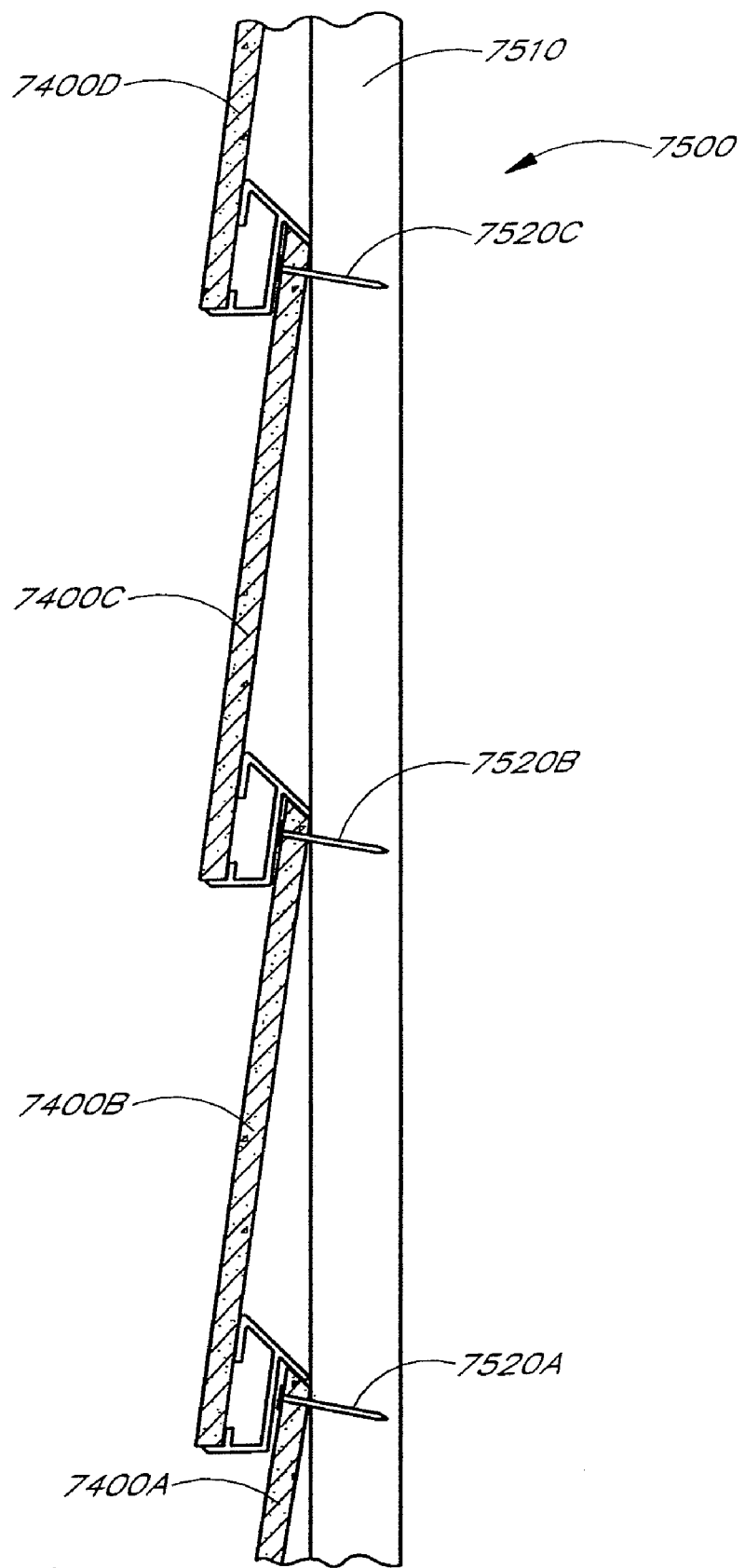
FIG. 41 shows a cross-sectional view of the two-piece siding plank system of FIG. 33 affixed to a mounting surface.

FIG. 41 shows a two-piece siding plank system of a preferred embodiment. Siding system 7500 includes plank assemblies 7400A, 7400B, 7400C and 7400D, a wall 7510, and nails 7520A, 7520B, and 7520C. Using a well-known blind nailing technique, plank assemblies 7400A, 7400B, 7400C, and 7400D are fixedly connected to wall 7510 using nails 7520A, 7520B, and 7520C, respectively (i.e. nails are driven through plank front surface 7115 of plank 7100 (FIG. 35) in proximity to plank top surface 7105).

Third flange bottom surface 7250 and plate back surface 7210 of plank assembly 7400B are positioned in contact with plank top surface 7105 and plank front surface 7115 of plank assembly 7400A, respectively. Likewise plank assembly 7400C and 7400D are positioned in contact with plank assembly 7400B and 7400C, respectively.

Another example of this embodiment is a two-piece siding plank assembly with a plastic spline and lock, wherein the plastic spline has one or more dove-tail grooves in the first flange top surface, second flange front surface, and fourth flange front surface, with the grooves running along the length of the surfaces, such as described below.

Figure 42A:
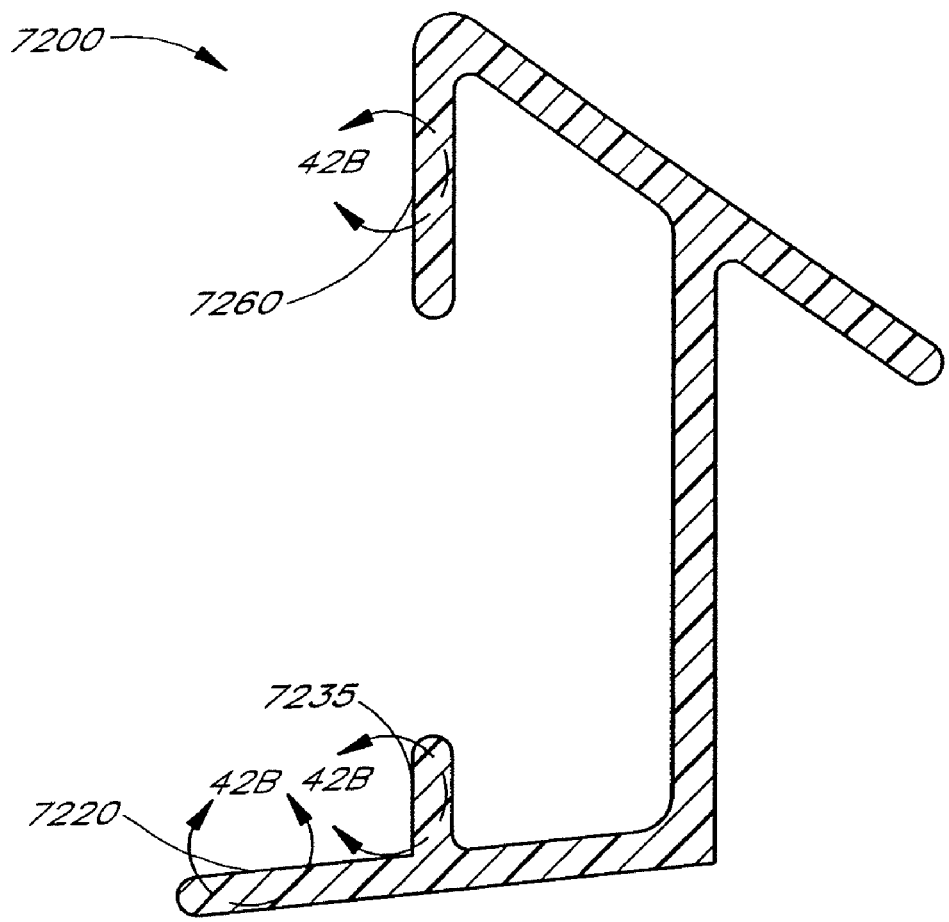
FIG. 42A shows a cross-sectional view of a plastic spline having a capillary break and dovetail grooves.
Figure 42B:
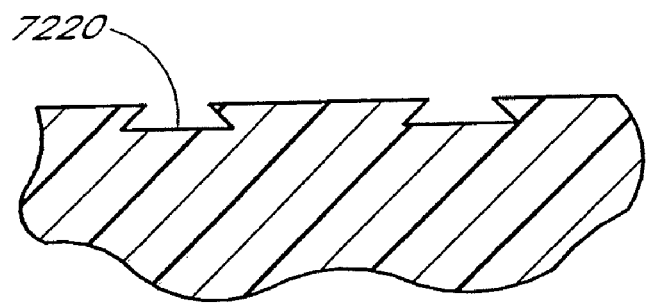
FIG. 42B shows an enlarged cross-sectional view of a surface of the spline of FIG. 42A having dovetail grooves.

FIG. 42A shows a cross-sectional view of spline 7200 with the above-mentioned dovetail grooves. The exploded view in FIG. 42B shows one or more dovetail grooves in first flange top surface 7220, second flange front surface 7235 and fourth flange front surface 7260 of spline 7200. The dovetail groove 7220 provides a mechanical bond together with the adhesive bond to plank 7100 of plank assembly 7400 (FIG. 33). This is illustrated in FIGS. 43A and 43B.

Figure 43A:
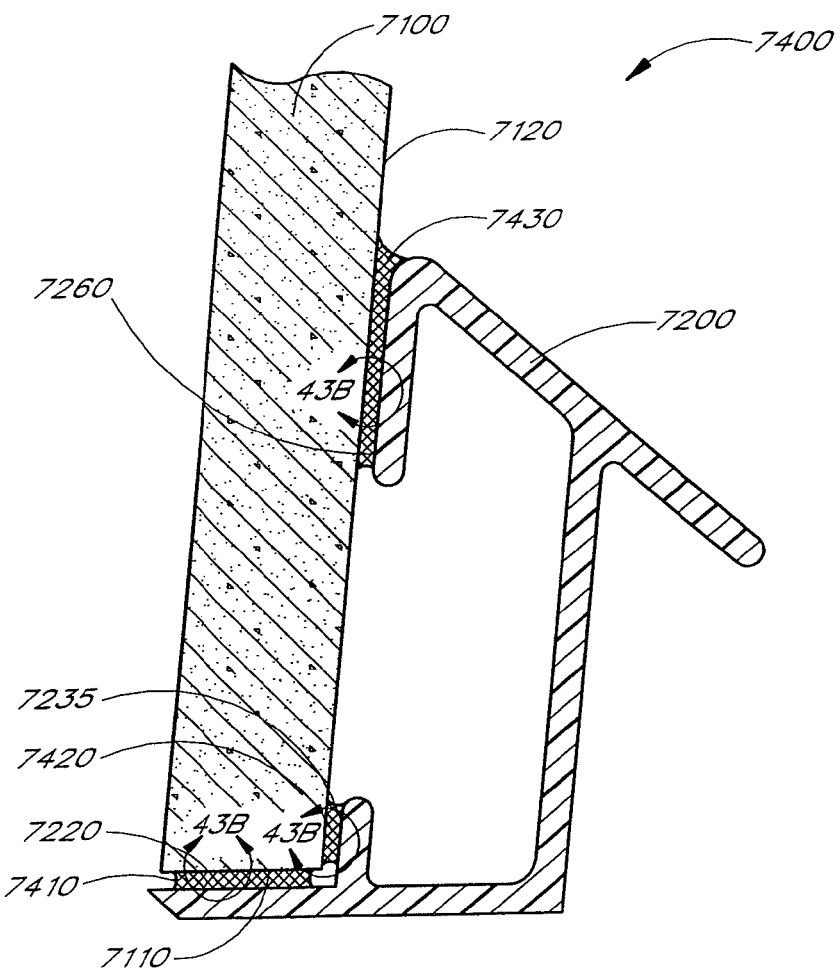
FIG. 43A shows a cross-sectional view of the spline of FIG. 42A bonded to a main plank.
Figure 43B:
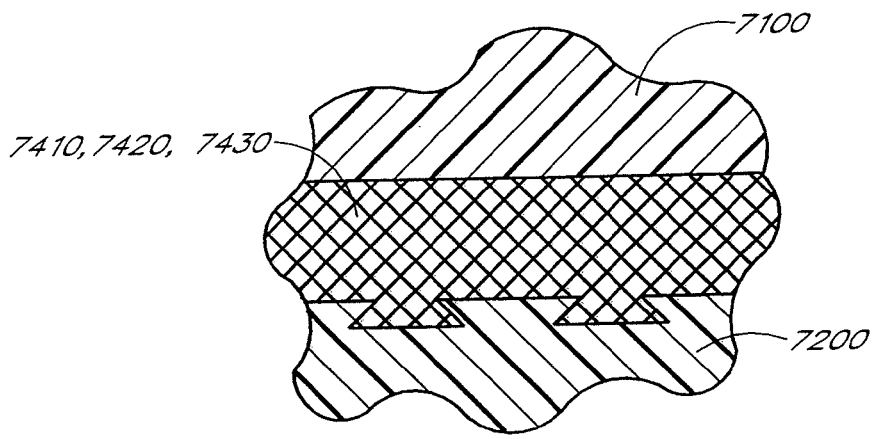
FIG. 43B shows an enlarged cross-sectional view of the bond between the spline and main plank of FIG. 43A.

FIG. 43A shows a cross-sectional view of plank assembly 7400. The exploded view in FIG. 43B illustrates the interface of spline 7200, adhesive layer 7410, 7420 or 7430 and plank 7100. FIG. 43B shows adhesive layer 7410, 7420 or 7430 filling the dovetail grooves of spline 7200. Due to the dissimilar expansion attributes (temperature and moisture) between plank 7100 and spline 7200, stresses are induced in adhesive layers 7410, 7420 and 7430. In the event that the adhesive bond between the adhesive layers and the plastic spline fails due to these stresses, there is still a mechanical connection by means of the dovetail groove(s).

Another example of this embodiment is a two-piece siding plank assembly using a plastic spline without a lock, without an overlap guide (such as formed by the third flange 7240 of FIG. 36), and with or without dovetail grooves, as shown in FIGS. 44A and 44B. FIGS. 44A and 44B show a two-piece siding plank assembly 7600 and siding system 7700, respectively. Plank 7610 is identical to plank 7100 of FIG. 33 except that plank top surface 7105 (FIG. 35) is not angled. Spline 7620 is identical to spline 7200 of FIG. 33 except that third flange 7240 (FIG. 36) is not extended to create the locking mechanism. Siding system 7700 is assembled as described in FIG. 44B except that the gauge of the plank must be measured during the installation process. This embodiment will create a thick butt (deep shadow line) but does not provide a natural overlap guide for installation.

Figures 45A, 45B:
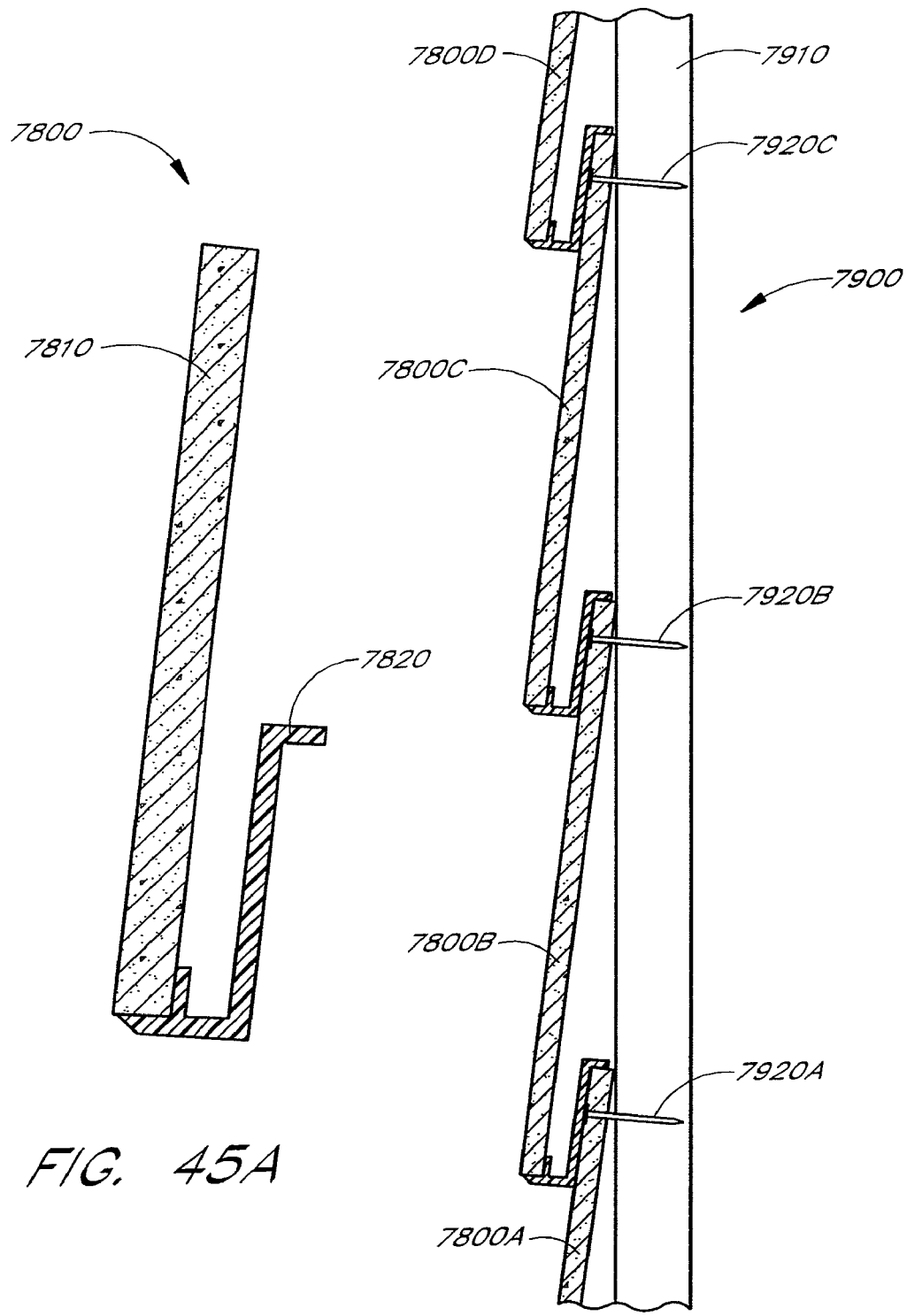
FIG. 45A shows a cross-sectional view of the two-piece siding plank assembly in accordance with another embodiment of the present invention.
FIG. 45B shows a cross-sectional view of the siding system of FIG. 45A affixed to a mounting surface.

Another example of this embodiment is a two-piece siding plank assembly using a plastic spline without a lock and with or without dovetail grooves as shown in FIGS. 45A and 45B. FIGS. 45A and 45B shows a two-piece siding plank assembly 7800 and siding system 7900, respectively. Plank 7810 is identical to plank 7610 of FIG. 44A. Spline 7820 is similar to spline 7200 of FIG. 33 except that fourth flange 7255 (FIG. 36) is eliminated and third flange 7240 (FIG. 36) is shortened and angled to about 90°. Siding system 7900 is assembled as described in FIG. 45B. This embodiment will create a thick butt (deep shadow line) and provide a natural overlap guide for easy installation, but will not handle high wind loads.

Another example of this embodiment is a two-piece plank for a siding application using a natural wood or engineered wood siding plank bonded with an adhesive to a plastic spline with or without a lock.

Figure 46:
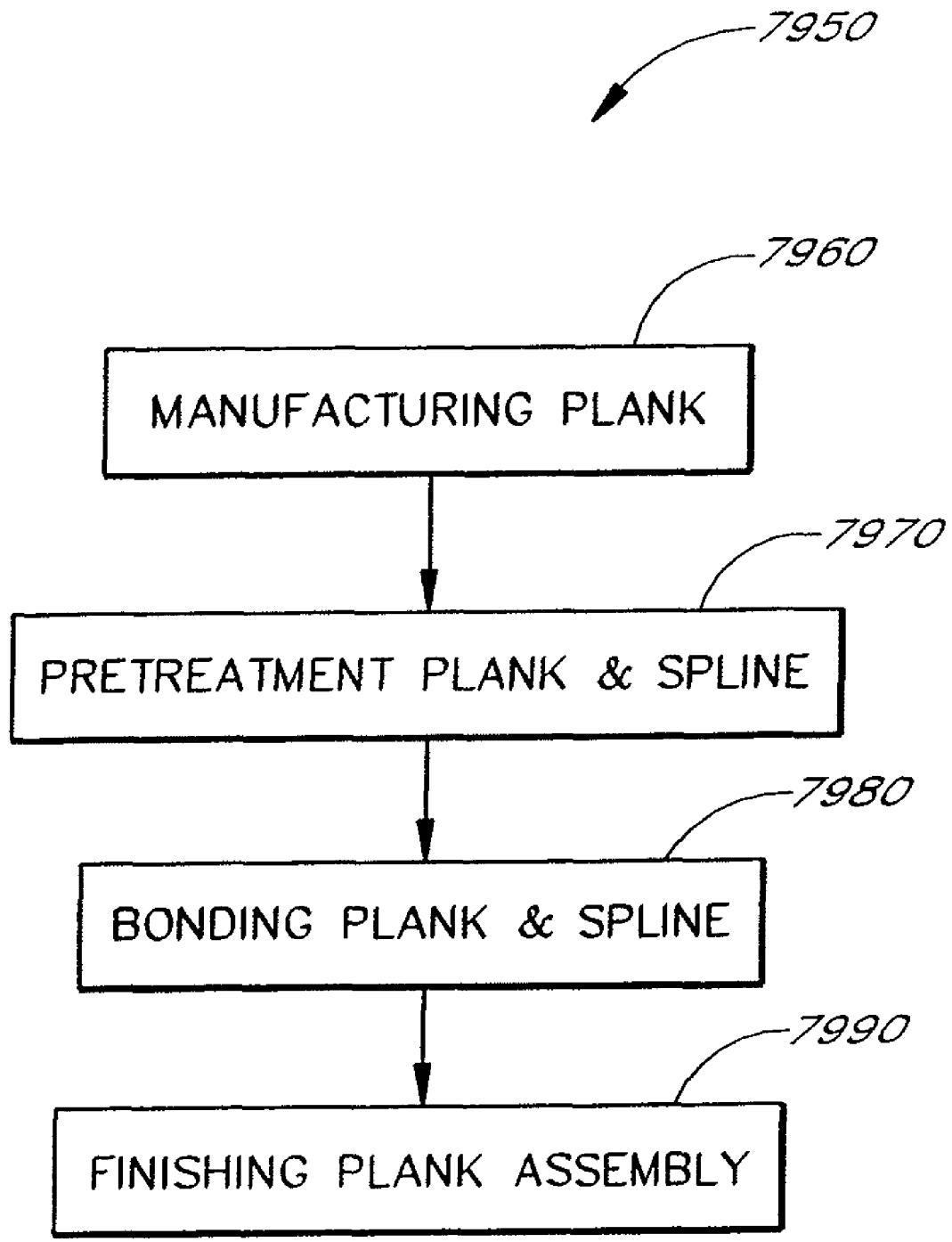
FIG. 46 shows the method steps for making a two-piece plank assembly using an FC siding plank bonded with an adhesive to a plastic spline.

FIG. 46 shows a flow chart 7950 of the method for making a two-piece plank assembly using an FC siding plank bonded with an adhesive to a plastic spline that involves:

Manufacturing plank 7960: A plank is formed according to conventional Hatschek methods. The plank top and bottom edges are cut to an angle using angled water jet cutters during the conventional Hatschek manufacturing process. The plank is pre-cured then autoclaved as per conventional methods. See Table 5 for preferred ranges of plank dimensions.

Pre-treatment of plank & spline 7970: Plank 7100 and plastic spline 7200 (manufactured according to Table 6) are pre-cut to a desired and equal length. The surfaces of plastic spline 7200 are pre-treated in one of four ways to improve the adhesive bonding capabilities. The four methods of pre-treating the surfaces of the plastic spline are:

Sanding, using conventional power sanding tools;
Cleaning, using a solvent such as Isopropyl Alcohol;
Flame, expose to oxidizing flame fueled by propane gas for about 0.5 to 4 seconds;
A combination of the above.

Bonding plank & spline 7980: Plank 7100 is bonded to plastic spline 7200 to form the plank assembly 7400 shown in FIG. 33. Plank 7100 is placed on a first conveyer traveling at a rate up to about 250 feet/minute and three beads of polymeric hot-melt adhesive are applied at a rate of about 1 gram/foot per bead along the length of the plank. The beads are formed so as to align with first flange top surface 7220, second flange front surface 7235, and fourth flange front surface 7260 of spline 7200 (FIG. 37). Spline 7200 is placed on a second conveyer traveling at a rate up to 250 feet/minute. The first and second conveyers feed plank 7100 and spline 7200, respectively, to a common destination such that the spline aligns to the plank, makes contact with the adhesive, and is fed into a "nip" machine. The rollers of the nip machine are set to the desired overall plank assembly thickness and press plank 7100 and spline 7200 together. The nip machine then feeds the plank assembly 7400 to a press where about 2 to 10 psi of pressure is applied for about 3 to 5 seconds.

Finishing plank assembly 7990: Plank assembly 7400 is cut to a specified length and chamfer 7450 is applied (FIG. 40) using conventional cutting or grinding tools.

B. Spline with Square Lock

The embodiments above using a "V" style lock system allow planks to be locked into one another without requiring extensive measurement to maintain gauge (the visible vertical distance between planks) and overlap (the vertical distance the plank overhangs the plank below) during installation. While the "V" style lock design has many inherent advantages, this design does not function satisfactorily for small variations in gauge that are sometimes desired by installers, especially when trying to level-out inaccuracies in framing and installation around window and door openings. As a result of being poorly fitted, the plank may subsequently experience lateral movement (flapping) when subjected to wind. Rather, a lock design that allows for small variations in gauge while preventing lateral movement (flapping) when subjected to wind would be beneficial.

Figure 47:
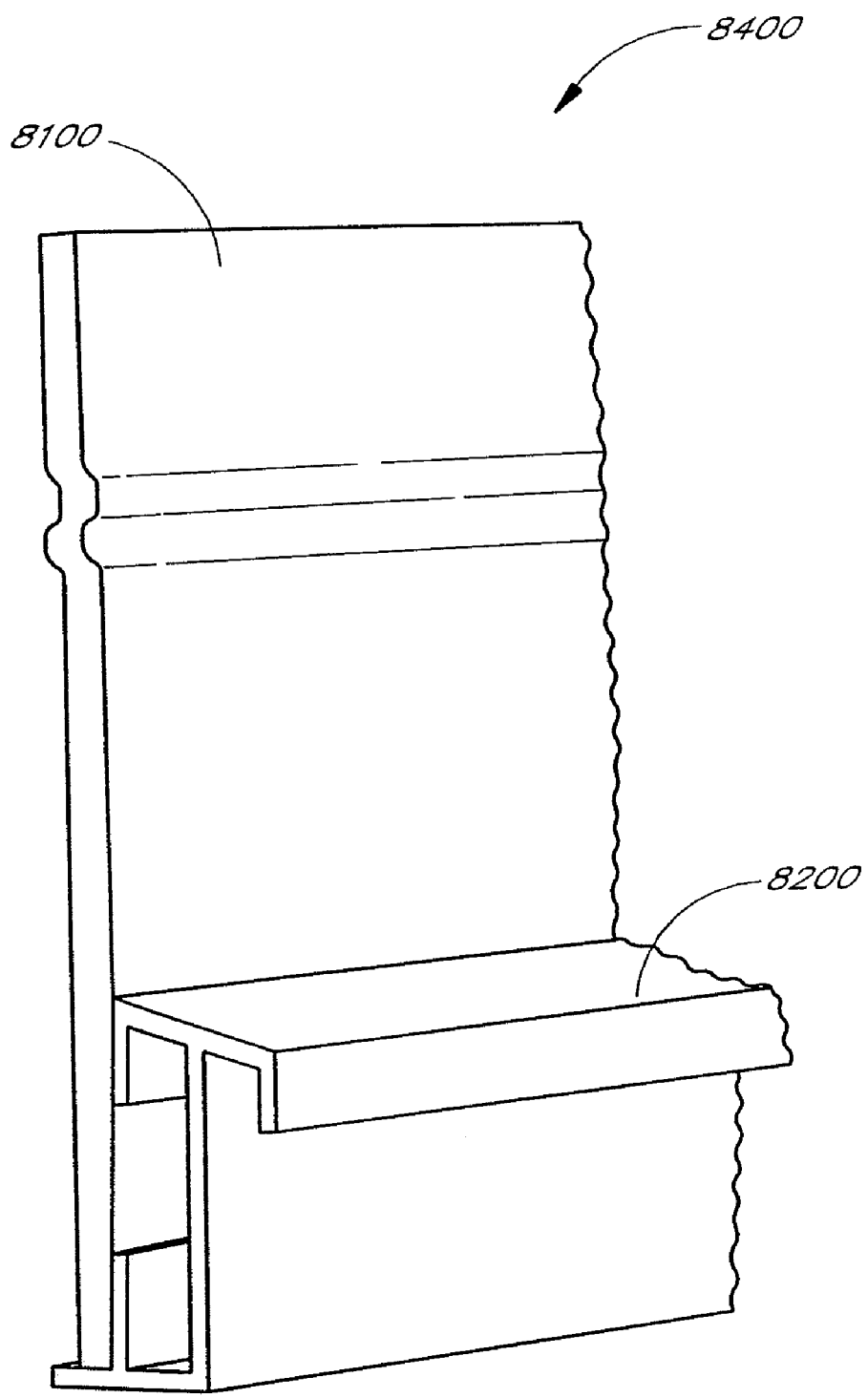
FIG. 47 shows an isometric view of a section of a siding plank assembly in accordance with another embodiment of the present invention.

FIG. 47 shows an isometric view of the siding plank assembly of another embodiment of the present invention that solves these problems. Plank assembly 8400 includes a plank 8100 and a spline 8200. Plank 8100 is preferably a siding plank manufactured of medium-density FC material using the well-known Hatschek process. Further information regarding the manufacture of plank 8100 may be found in Australian Patent No. AU 515151.

Figure 48:
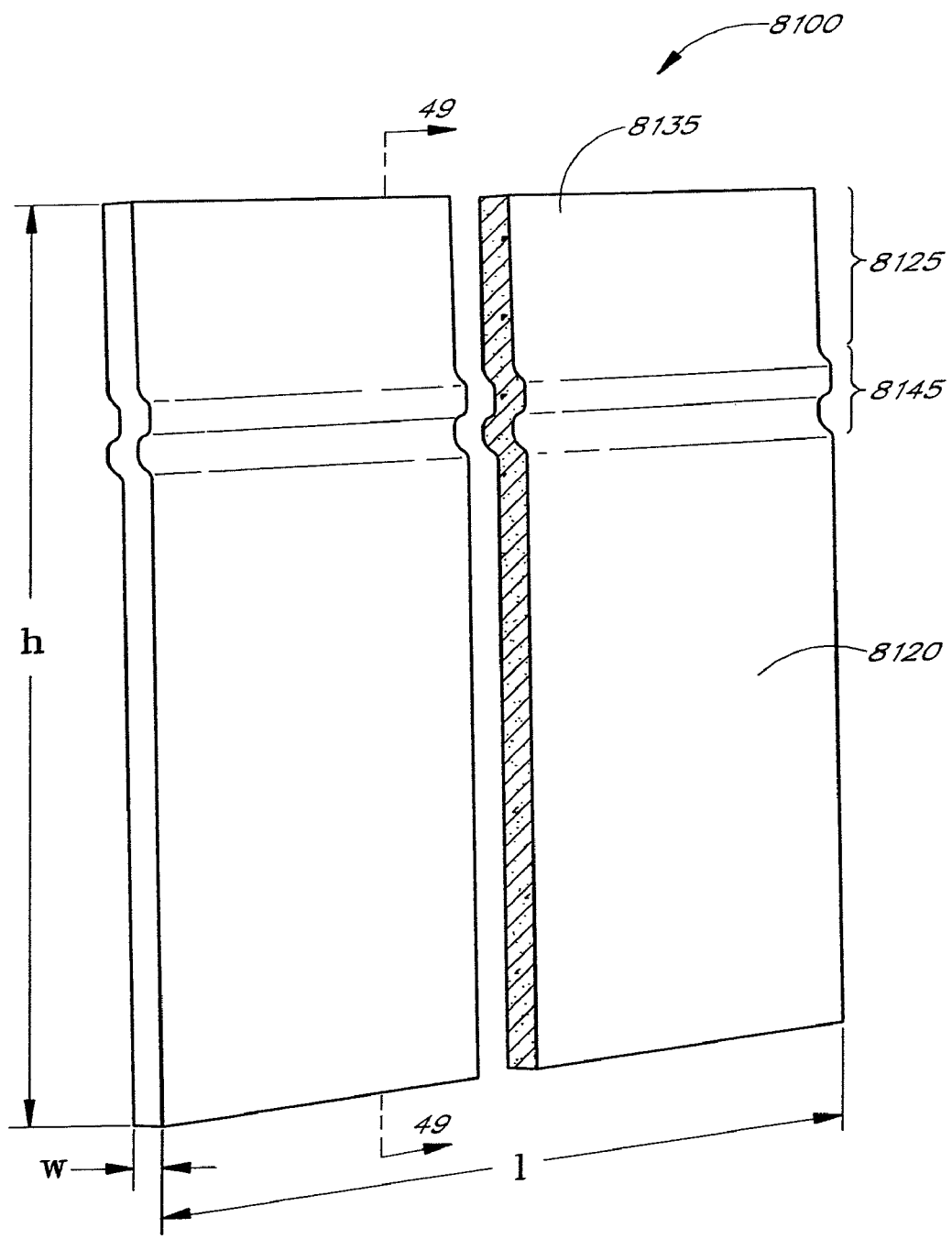
FIG. 48 shows an isometric view of the plank of FIG. 47.

Spline 8200 is preferably a "butt and lock" type spline made of rigid plastic formed by extrusion. Spline 8200 is aligned and is fixedly connected with an adhesive to plank 8100 (described in greater detail below). FIG. 48 shows an isometric view of the FC siding plank of a preferred embodiment. Plank 8100 is a siding plank that includes a plank back surface 8120, a plank key 8125, a plank key back surface 8135, and a nailing region 8145. Plank 8100 has a length "l", a width "w", and a height "h." An example of plank 8100 dimensions include "l" between about 12 and 16 feet, "w" between about 3/16 and 1/2 inches, and "h" between about 5 and 12 inches. A cross-sectional diagram of plank 8100 is shown in FIG. 49.

Figures 49A, 49B:
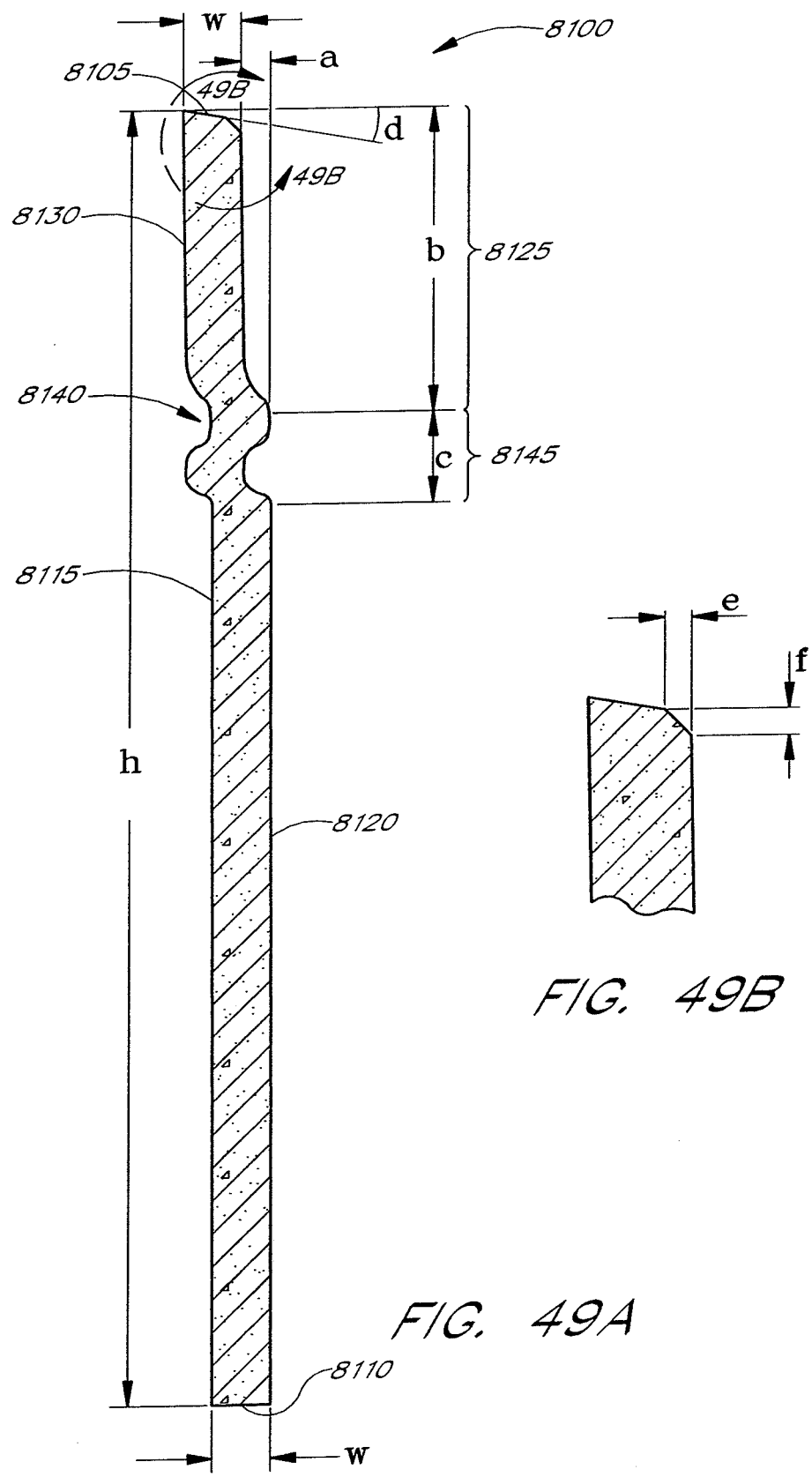
FIG. 49A shows a cross-sectional view of the plank of FIG. 48.
FIG. 49B shows a side view of the key tip of FIG. 49A.

FIG. 49A is a cross-sectional diagram of plank 8100 taken along line 49-49 of FIG. 48. In this view, additional details of the plank 8100 are visible. Plank 8100 further includes a plank top surface 8105, a plank bottom surface 8110, a plank front surface 8115, a plank key front surface 8130, and a bevel edge 8140. Also shown is plank back surface 8120, plank key 8125, plank key back surface 8135, and nailing region 8145.

Plank top surface 8105 is set at an angle "d" to plank key front surface 8130. Angle "d" of plank 8100 is cut using angled water jet cutters during the normal Hatschek manufacturing process. Plank 8100 has a key depth "a," a key height "b," and a nailing region "c."

FIG. 49B is an exploded view of the plank top surface 8105 taken along line 49B-49B. In addition to being set at an angle "d" to the plank key front surface 8130, the plank top surface 8105 has a cant. The cant has a depth "e" from the plank key back surface 8135 and a height "f" Preferred dimensions and angles of plank 8100 are indicated in Table 7.

TABLE 7

Preferred Plank 8100 dimensions

| Dimension | Range of Dimension |
|---|---|
| Length "l" | about 12 to 16 feet |
| Width "w" | about 0.1875 to 0.50 inches |
| Height "h" | about 5 to 12 inches |
| Key depth "a" | ("t" of Table 8) + (about 0.0625 to 0.375) inches |
| Key height "b" | ("d" of Table 8) + about 0.125 inches |
| Nailing region "c" | about 0.250 to 1.0 inches |
| Top angle "d" | about 0° to 20° |
| "e" | about 0.0 to 0.125 inches |
| "f" | about 0.0 to 0.125 inches |

Figure 50:
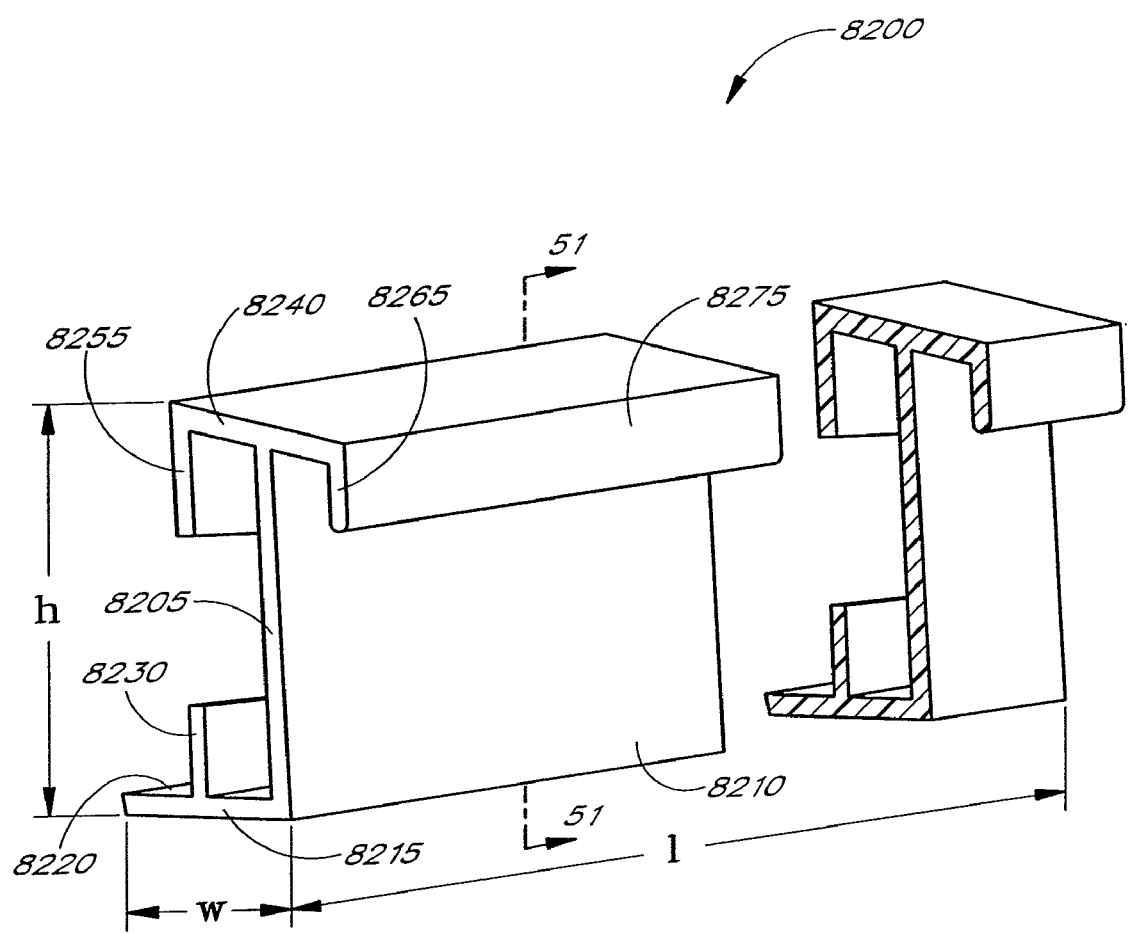
FIG. 50 shows an isometric view of the locking spline of FIG. 47.

FIG. 50 shows an isometric view of the plastic locking spline of a preferred embodiment. Spline 8200 includes a plate 8205, a plate back surface 8210, a first flange 8215, a first flange top surface 8220, a second flange 8230, a third flange 8240, a fourth flange 8255, a fifth flange 8265, and a fifth flange back surface 8275. Spline 8200 has a length "l," a width "w," and a height "h."

Figure 51:
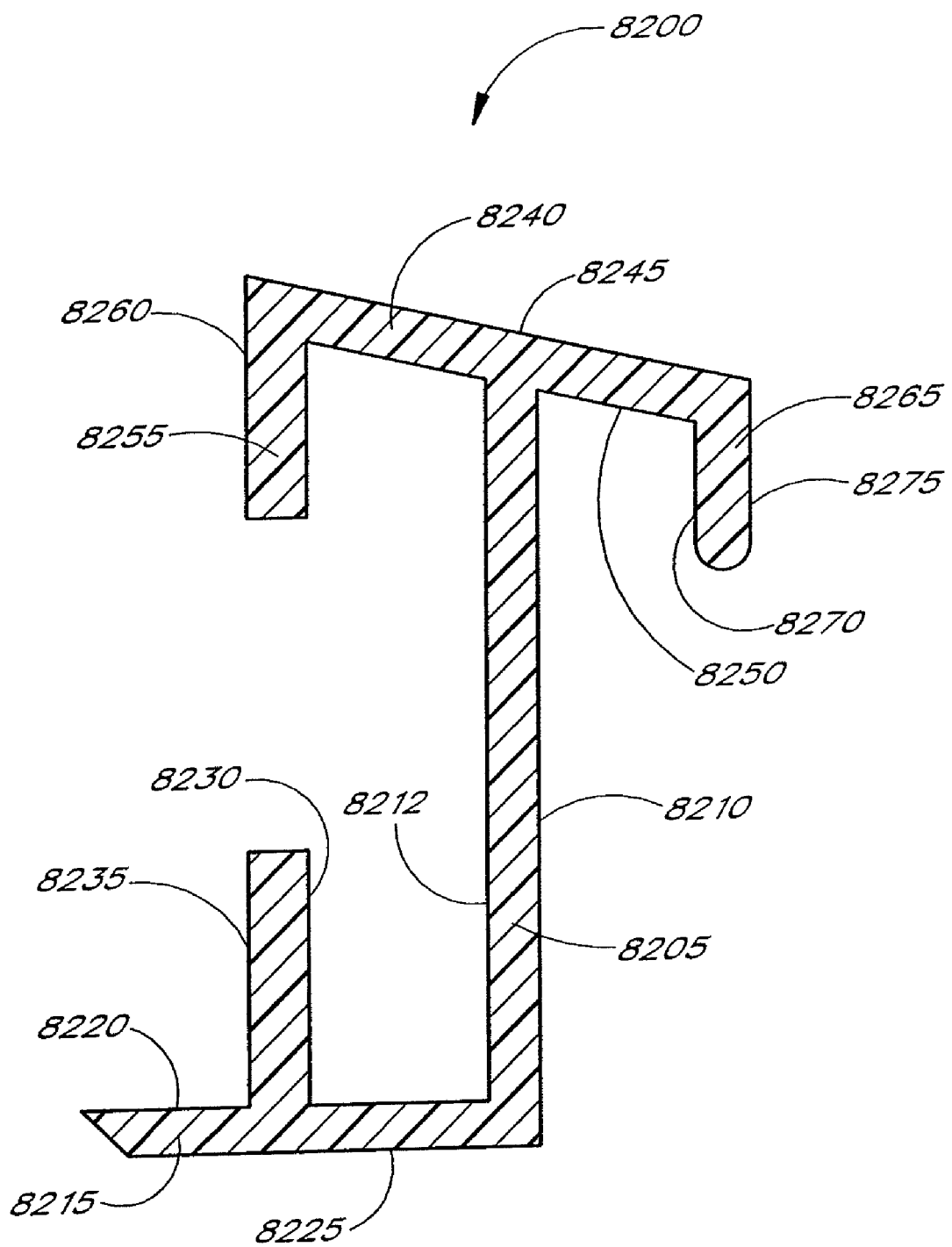
FIG. 51 shows a cross-sectional view of the locking spline of FIG. 50.

FIG. 51 is a cross-sectional diagram of spline 8200 taken along line 51-51 of FIG. 50. In this view, additional details of the spline 8200 are visible. Spline 8200 further includes a plate front surface 8212, a first flange bottom surface 8225, a second flange front surface 8235, a third flange top surface 8245, a third flange bottom surface 8250, a fourth flange front surface 8260, and a fifth flange front surface 8270. Also shown is plate 8205, plate back surface 8210, first flange 8215, first flange top surface 8220, second flange 8230, third flange 8240, fourth flange 8255, fifth flange 8265, and fifth flange back surface 8275. All elements are present along the entire length of spline 8200 as shown in FIG. 50.

A first edge of first flange 8215 is integrally connected orthogonal or at an angle to a first edge of plate 8205 extending from plate front surface 8212. A second edge of plate 8205 is integrally connected at an angle along third flange 8240 between the first and second edges of third flange 8240 extending from third flange bottom surface 8250. A first edge of fourth flange 8260 is integrally connected to a first edge of third flange 8240 in parallel with plate 8205 extending from third flange bottom surface 8250. A first edge of second flange 8230 is integrally connected orthogonal or at an angle along first flange 8215 between the first and second edges of first flange 8215 in parallel with plate 8205 extending from first flange top surface 8220. Second flange 8230 and fourth flange 8260 are coplanar. A first edge of fifth flange 8265 is integrally connected to a second edge of third flange 8240 in parallel with plate 8205 extending from third flange bottom surface 8250.

Figure 52:
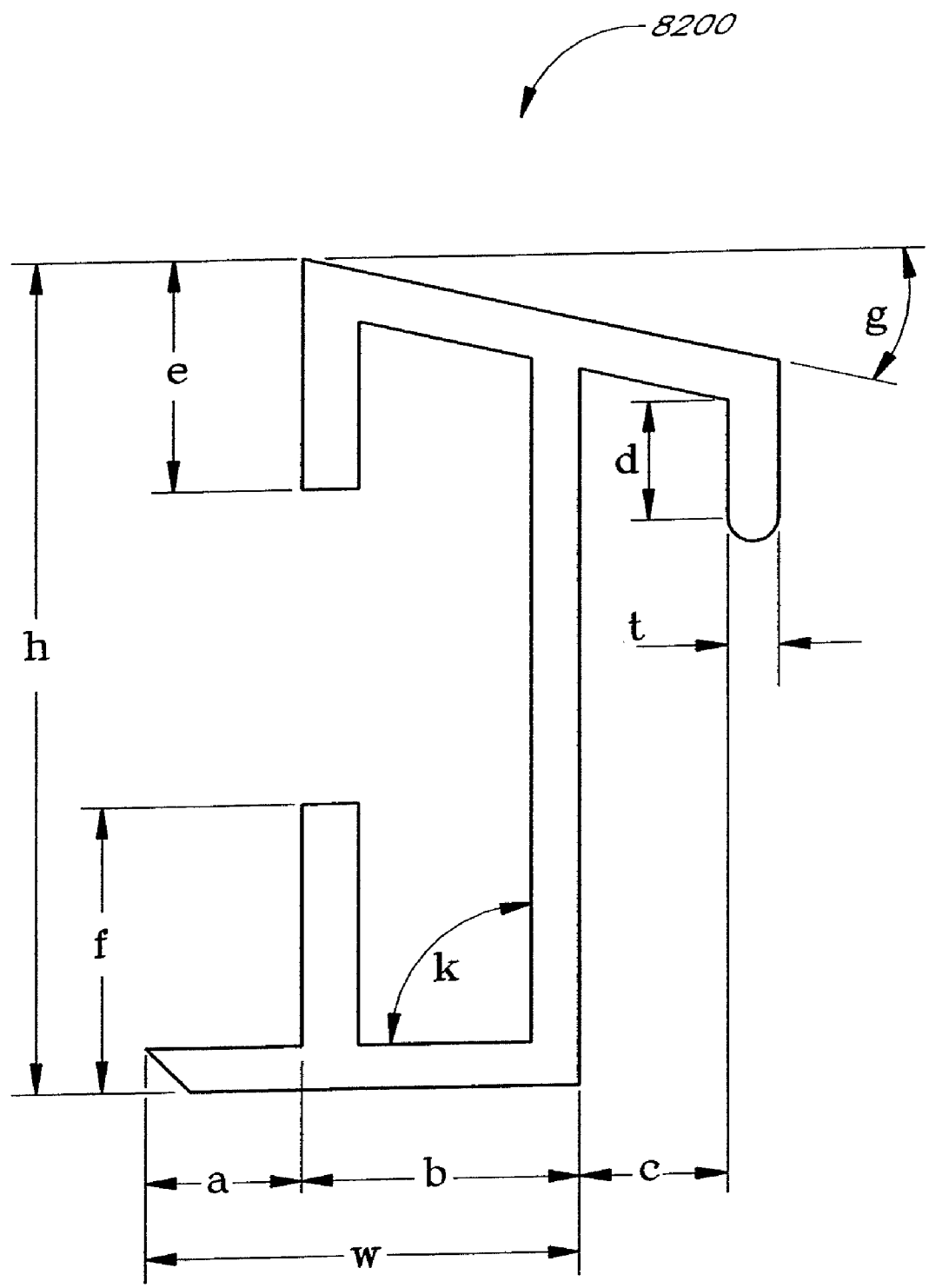
FIG. 52 shows an end view of the locking spline of FIG. 50 with approximate dimensions.

FIG. 52 is an end view of spline 8200. Preferred dimensions and angles of spline 8200 are indicated in Table 8 below.

TABLE 8

Preferred Spline 8200 dimensions

| Dimension | Range of Dimension |
|---|---|
| Length "l" (not shown) | about 12 to 16 feet |
| Width "w" | about 0.375 to 0.750 inches |
| Height "h" | about 0.500 to 2.0 inches |
| Thickness "t" | about 0.020 to 0.080 inches |
| "a" | Plank 8100 width* − about 0.0625 inches |
| "b" | w − a |
| "c" | Plank 8100 width* + (about 0.0 to 0.040) inches |
| "d" | about 0.250 to 1.50 inches |
| "e" | (h − f) to (0.1 × h) |
| "f" | (h − e) to (0.1 × h) |
| "g" | about 0° to 20° |
| "k" | about 90° to 120° |

*Plank 8100 width = about 0.375 to 0.500 inches

There is no gap if h=e+f. The gap is provided to save material and to eliminate the need for an extrusion mandrel to form the hollow, thereby simplifying the manufacturing process.

Figure 53:
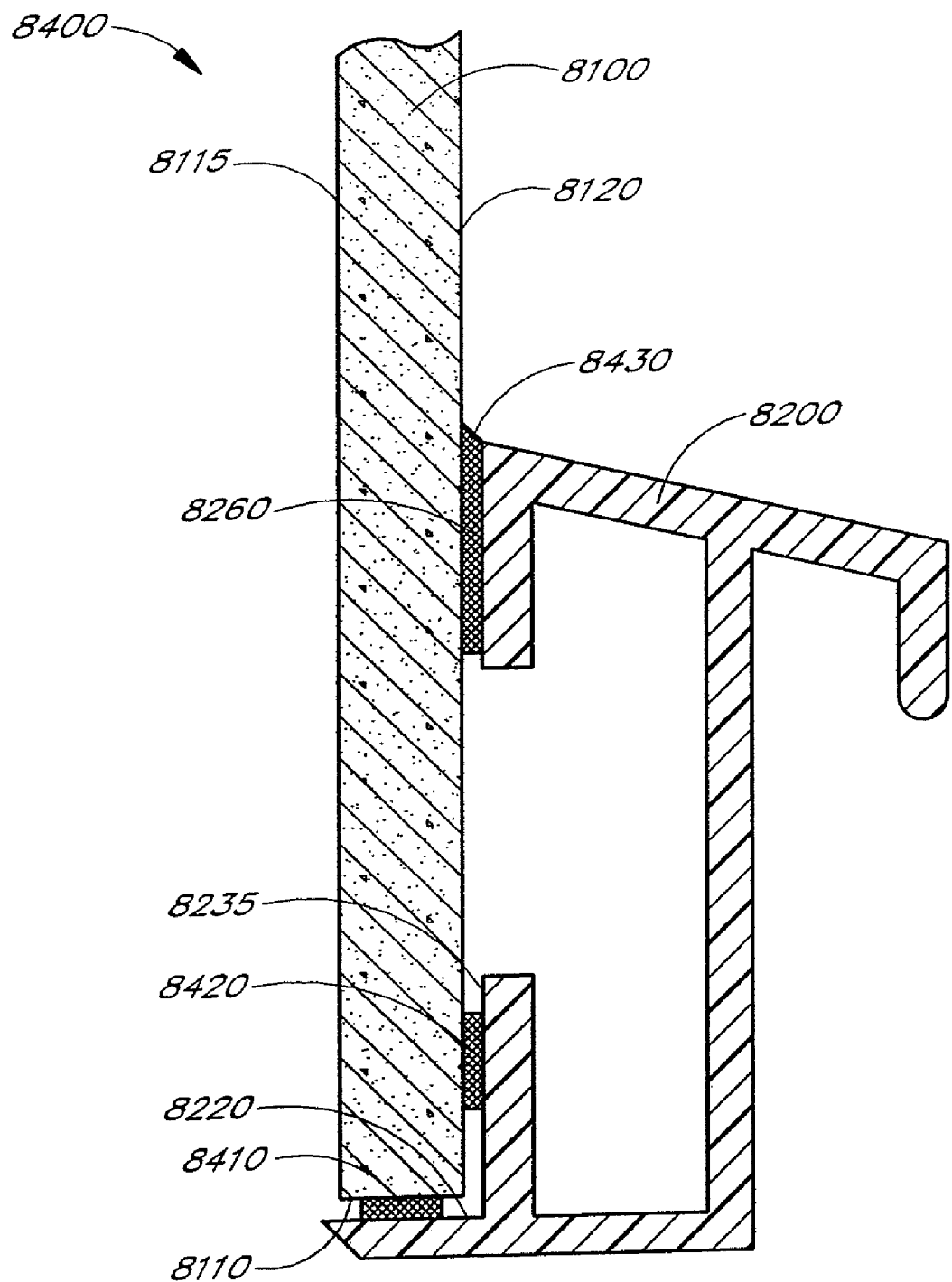
FIG. 53 shows a cross-section of the siding plank assembly of FIG. 47.

FIG. 53 is a cross-sectional diagram of plank assembly 8400 of FIG. 47. In this view, additional details of the plank assembly 8400 are visible. Plank assembly 8400 further includes a first adhesive layer 8410, a second adhesive layer 8420, and a third adhesive layer 8430. With continuing reference to FIG. 53, the position of spline 8200 is shown in relation to plank 8100. First flange top surface 8220 is fixedly connected to plank bottom surface 8110 with first adhesive layer 8410. Second flange front surface 8235 is fixedly connected to plank back surface 8120 with second adhesive layer 8420. Fourth flange front surface 8260 is fixedly connected to plank back surface 8120 with third adhesive layer 8430.

Figure 54:
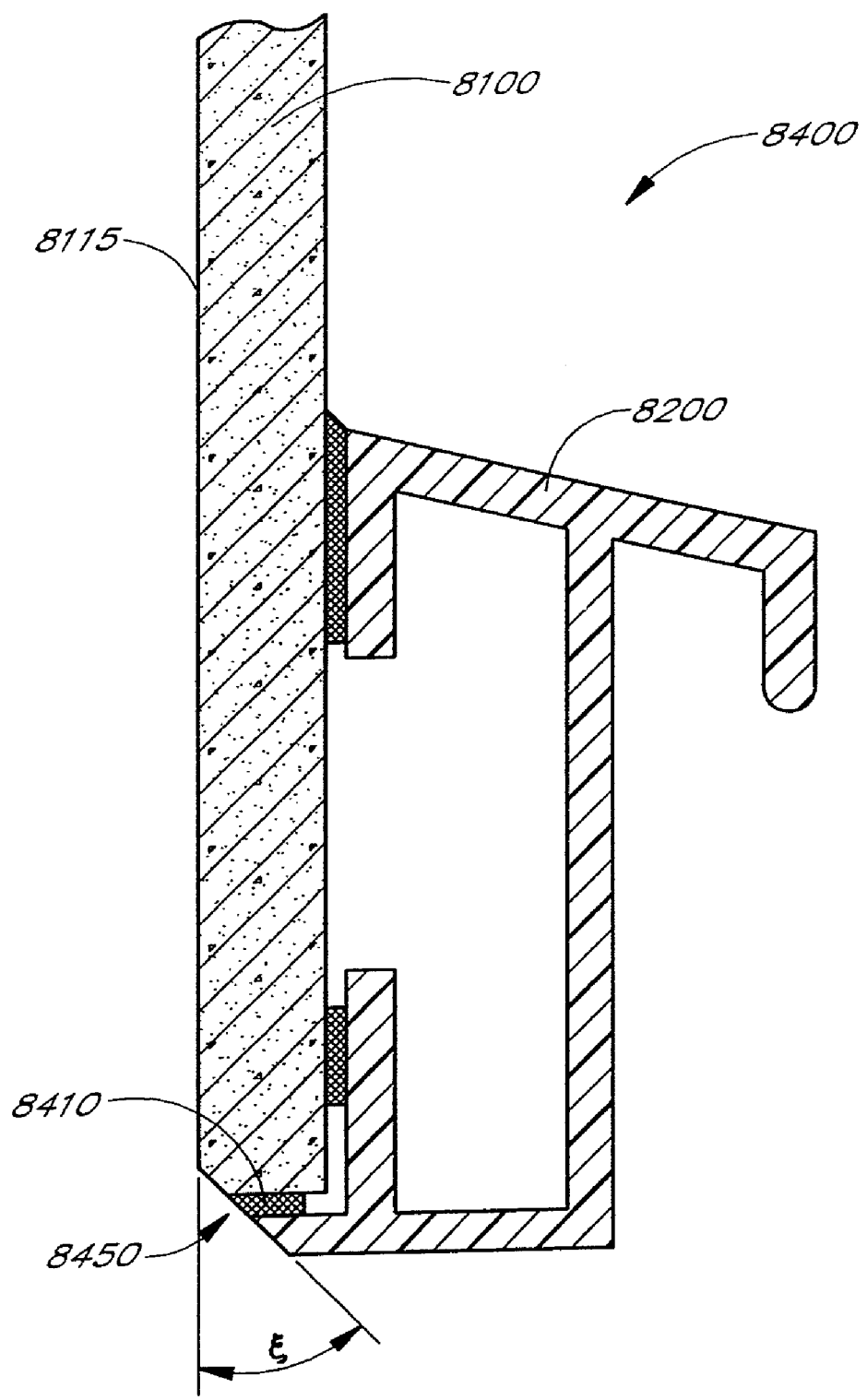
FIG. 54 shows a cross-sectional view of an alternative siding plank assembly with a chamfer.

Adhesive layers 8410, 8420 and 8430 are preferably fast setting, reactive hot-melt polyurethane such as H.B. Fuller 2570, H.B. Fuller 9570, or PURMELT R-382-22 with a viscosity of about 10,000 to 100,000 CPS at application temperatures ranging from about 200° to 350° F. The adhesion time preferably ranges from about 3 to 5 seconds. FIG. 54 shows the same details as FIG. 53 with the addition of a chamfer 8450. Chamfer 8450 is placed at an angle "∈" relative to plank front surface 8115 and may be flat or slightly rounded. Angle "∈" is in the range of about 15° to 85°. One example of angle "∈" is about 45°.

With continuing reference to FIG. 54, chamfer 8450 is accomplished by cutting or grinding plank 8100, first adhesive 8410 and spline 8200 such that the three elements are "blended". Chamfer 8450 creates a smooth and aesthetically pleasing drip-edge for plank assembly 8400, suitable for painting. As chamfer 8450 is exposed to the weather, first adhesive 8410 acts as a seal between plank 8100 and spline 8200, blocking wind and moisture.

Figure 55:
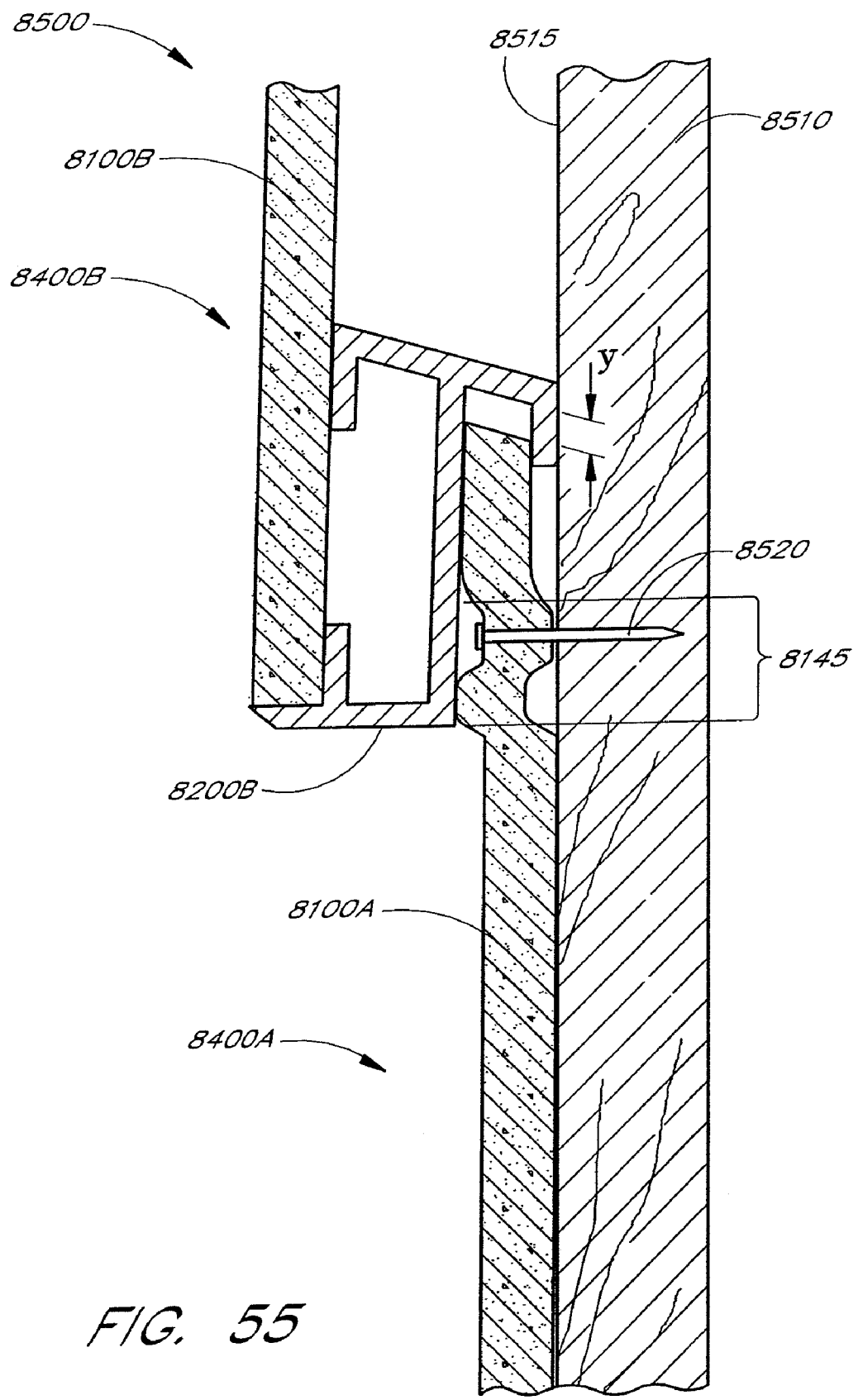
FIG. 55 shows a cross-sectional view of the two-piece siding plank system of FIG. 47 affixed to a mounting surface.

FIG. 55 shows a two-piece siding plank system of a preferred embodiment. Siding system 8500 includes a plank assembly 8400A and 8400B, a wall 8510, a wall outer surface 8515, and a nail 8520. Plank assembly 8400A includes a plank 8100A and a spline (that is not shown). Plank assembly 8400B includes a plank 8100B and a spline 8200B.

Using a blind nailing technique, plank assembly 8400A is fixedly connected to wall 8510 by driving nail 8520 through plank front surface 8115 of plank 8100 (FIG. 54) in nailing region 8145 located just below the area of plank key 8125 (FIG. 49A). Plate back surface 8210 (FIG. 50) of spline 8200B is in contact with plank key front surface 8130 (FIG. 49A) of plank 8100A. Fifth flange front surface 8270 (FIG. 51) of spline 8200B is in contact with plank key back surface 8135 (FIG. 48) of plank 8100A. A small gap in the range of about 0.0 to 0.125 inches is present between fifth flange back surface 8275 (FIG. 51) of spline 8200B and wall outer surface 8515. Bevel edge 8140 (FIG. 49A) of each plank assembly allows for easy installation of one plank assembly to another.

If plank assembly 8400A and 8400B of siding system 8500 is tightly fit, third flange bottom surface 8250 (FIG. 51) of spline 8200B is in contact with plank top surface 8105 (FIG. 49A) of plank 8100A. However, in the case where plank assembly 8400A and 8400B of siding system 8500 is loosely fit, third flange bottom surface 8250 (FIG. 51) of spline 8200B is not in contact with plank top surface 8105 (FIG. 49A) of plank 8100A leaving a gap "y" in the range preferably of about 0.0 to 0.25 inches. Gap "y" allows easy leveling of the plank assemblies during installation. In either a tightly or loosely fit siding system the plastic spline of the preferred embodiment prevents lateral movement of plank assembly 8400 when installed.

Another example of this embodiment is a two-piece siding plank assembly with a plastic spline and square lock, wherein the plastic spline has one or more dovetail grooves in the second plate top surface and third plate front surface, with the grooves running along the length of the surfaces as described above in greater detail.

Another example of this embodiment is a two-piece siding plank assembly with a plastic spline and square lock, wherein the plastic spline has a capillary break in the first plate back surface running along the length of the surface as described below in greater detail.

Another example of this embodiment is a two-piece siding plank assembly with a plastic spline and square lock, wherein the siding plank is made of any suitable material including but not limited to wood, engineered wood, or composite wood plastic.

Another example of this embodiment is a one-piece molded or extruded siding plank having a similar cross-sectional shape and providing the same functions as the two-piece siding plank assembly of the first embodiment. In this example, a one-piece siding plank is formed using conventional co-extrusion method or a variable composition fibrous cementitious structural product formed by co-extrusion.

Another example of this embodiment is a one-piece siding plank having a similar cross-sectional shape and providing the same functions as the two-piece siding plank assembly of the previous embodiment. In this embodiment a one-piece siding plank is formed using Applicant's skin and core technology, as described in pending U.S. application Ser. No. 09/973,844, filed Oct. 9, 2001, the entirety of which is hereby incorporated by reference.

Figure 56:
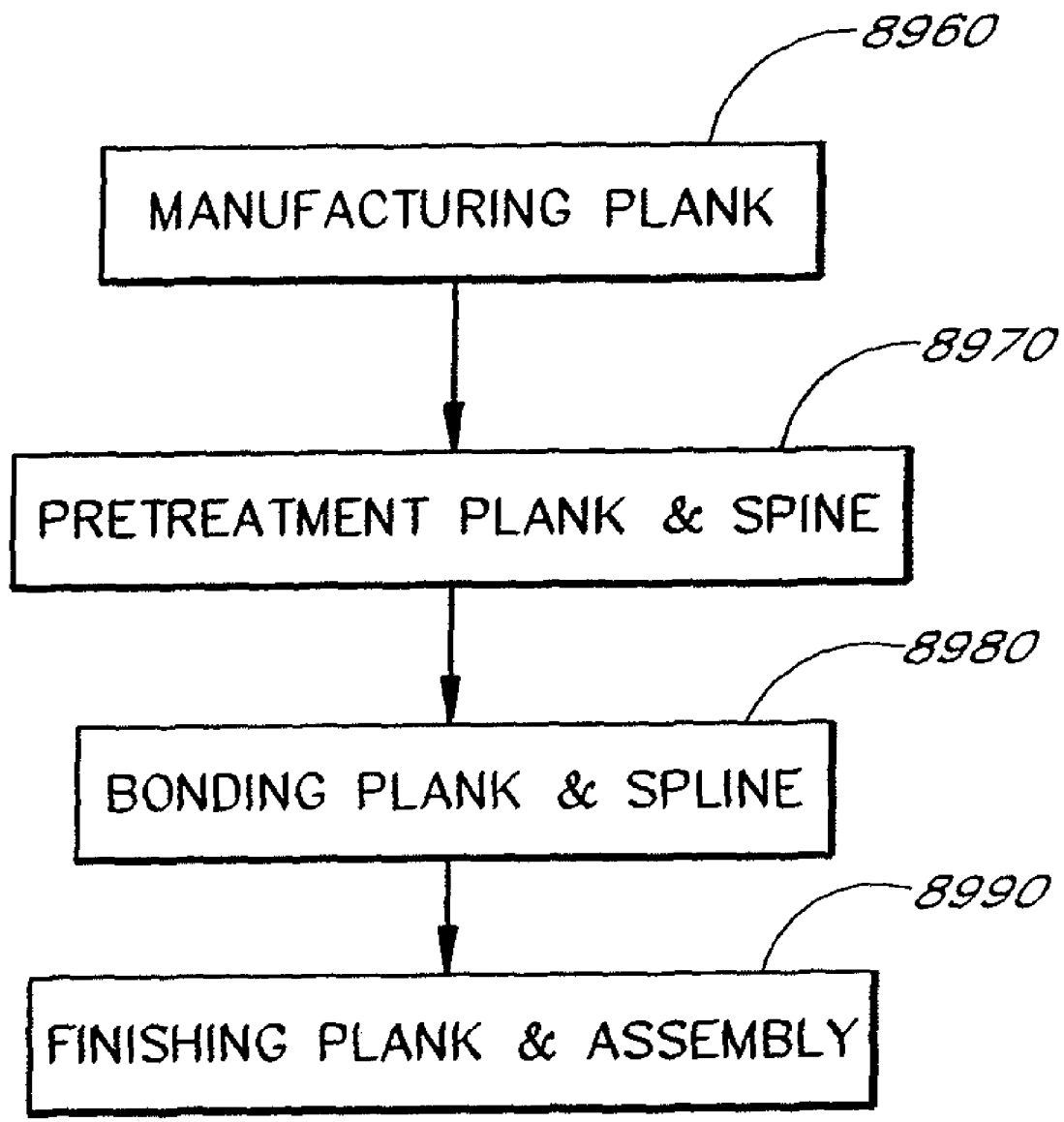
FIG. 56 shows a method for making a two-piece plank assembly using an FC siding plank bonded with an adhesive to a plastic spline.

FIG. 56 shows a method for making a two-piece plank assembly using a FC siding plank bonded with an adhesive to a plastic spline, which involves:

Manufacturing plank 8960: A medium-density plank is prepared according to conventional Hatschek methods. Plank key 8125 and nailing region 8145 of plank 8100 (FIG. 48) are formed by placing a sleeve of a profiled, offset thickness equal to key depth "a," on the size roller of the Hatschek machine for a distance equal to key height "b" and nailing region "c." As a result, the FC green sheet rides on the sleeve creating the offset of plank key 8125 and nailing region 8145. Alternately, plank key 8125 and nailing region 8145 are formed by profiled press-rollers, where about 200 to 500 psi of pressure is applied to shape these regions. The plank top and bottom edges are cut using angled water jet cutters during the conventional Hatschek manufacturing process. The plank is pre-cured then autoclaved as per conventional methods. See Table 7 above for acceptable ranges of plank dimensions for this embodiment.

Pre-treatment of plank & spline 8970: Plank 8100 and spline 8200 (manufactured as per Table 8) are pre-cut to a desired and equal length as shown in FIGS. 49A and 50, respectively. The surfaces of plastic spline 8200 (i.e. first flange top surface 8220, second flange front surface 8235, and fourth flange front surface 8260) are pre-treated in one of four ways to improve the adhesive bonding capabilities. The four methods of pre-treating the surfaces of the plastic spline are:
1. Sanding, using conventional power sanding tools to roughen the surface;
2. Cleaning, using a solvent such as Isopropyl Alcohol;
3. Flame, expose to oxidizing flame fueled by propane gas for about 0.5 to 4 seconds;
4. A combination of the above.

Bonding plank & spline 8980: Plank 8100 is bonded to plastic spline 8200 to form the plank assembly 8400 shown in FIG. 47. Plank 8100 is placed on a first conveyer traveling at a rate up to 250 feet/minute and three beads of polymeric hot-melt adhesive with a viscosity of about 10,000 to 100,000 CPS at application temperatures ranging from about 200° to 350° F. are applied at a rate of about 1 gram/foot per bead along the length of the plank. The beads are formed so as to align with first flange top surface 8220, second flange front surface 8235, and fourth flange front surface 8260 of spline 8200 (FIG. 51). Likewise, spline 8200 is placed on a second conveyer traveling at a rate equal to the first conveyor. The first and second conveyers feed plank 8100 and spline 8200, respectively, to a common destination such that the spline 8200 aligns to plank 8100, makes contact with the adhesive and is fed into a "nip" machine. The rollers of the nip machine are set to the desired overall plank assembly thickness and press plank 8100 and spline 8200 together. The nip machine then feeds the plank assembly 8400 to a press where about 10 to 100 psi of pressure is applied for about 3 to 5 seconds.

Finishing plank assembly 8990: Plank assembly 8400 is cut to a specified length and chamfer 8450 is applied (FIG. 54) using conventional cutting or grinding tools.

Advantageously, the siding plank assembly of this embodiment allows for small variations in the siding installed while reducing lateral movement (flapping) when subjected to wind. The assembly also allows for leveling of the planks during installation and can be formed without machining the lock and key. The locking system allows for easy installation and the plank top surface angle does not need to match the spline fourth plate angle.

C. Apparatus for Reducing Capillary Action Between Planks

In another embodiment, an apparatus for reducing capillary action is provided in the overlap region between two medium-density FC or other siding assemblies when installed. One example is a plastic spline having a capillary break formed by adding a lip along the length of the spline as described below.

Conventional exterior siding systems also include a "rain screen," which is the combination of an airtight and watertight barrier placed over the exterior surface of the frame to be sided, combined with the siding. The functional purpose of the siding is to keep moisture away from the rain screen inner barrier surface. The siding of FC material, wood or vinyl rain screen is a series of horizontal "planks" which overlap at their upper edges to prevent wind and rain from penetrating to the interior of the rain screen. The rain screen siding system, if properly installed, is very effective at keeping the framing and insulation of the wall dry and airtight under all weather conditions.

When siding planks are installed on an exterior wall of a building, moisture can find its way into the tight space where adjacent siding planks overlap. While most moisture does not enter because of gravity, the width of the gap in the overlap region is usually small enough that capillary action can occur, allowing moisture to penetrate to the internal barrier of the rain screen or at least into the space between the exterior barrier and the siding planks. As a result, the lapped siding material is not completely effective as a water barrier.

While increasing the gap between the siding materials when installed reduces the effect of capillary action, the siding becomes more susceptible to wind driven moisture penetration. Therefore, a siding assembly when installed that prevents water penetration due to rain and capillary action while preventing wind driven penetration would be beneficial. What is needed is a design of lap siding that forms a capillary break to stop the rise of water between the two surfaces in the plank overlap region.

Advantageously, the siding plank assembly of this embodiment reduces capillary action in the siding, thus providing additional moisture protection to the exterior barrier wall and siding interior while maintaining good resistance to wind driven moisture penetration. Furthermore, the assembly keeps the region that is nailed relatively dry, which increases the strength of fiber cement and therefore resistance to dislodgment of the planks by high winds. Another way to solve the problem is to seal the space between the planks with caulk or other type of sealant. However, this adds complexity to the exterior wall system. Alternatively, a gap or groove the length of the plank can be machined in the overlap area. However, this would create a weak point in the plank and would add a manufacturing process step.

Figure 57:
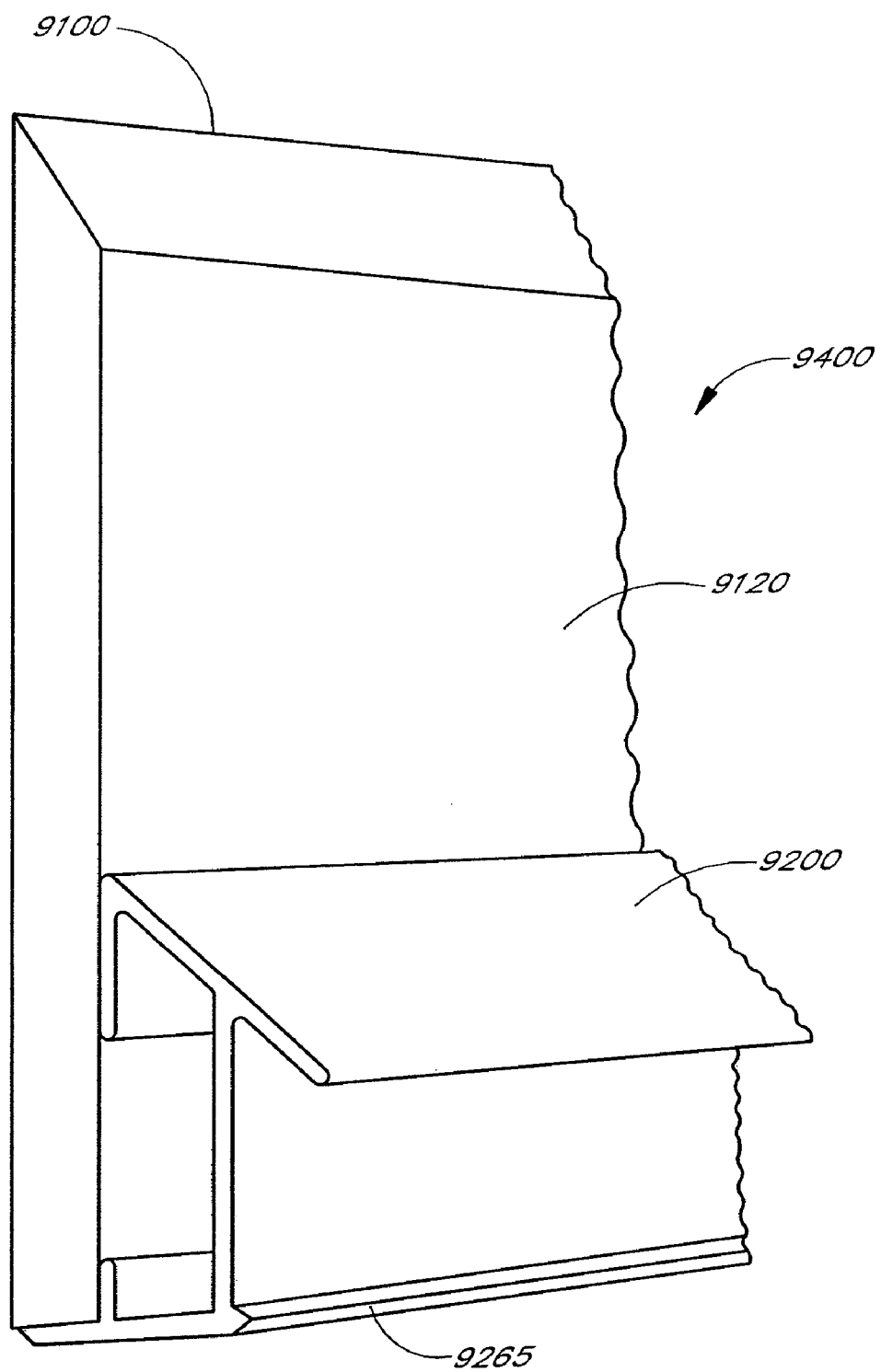
FIG. 57 shows an isometric view of a section of a siding plank assembly in accordance with another embodiment of the present invention.

FIG. 57 shows an isometric view of the siding plank assembly comprising a two-piece plank having a plastic spline with an angled lock as described above. Plank assembly 9400 includes a plank 9100 and a spline 9200. Plank 9100 is preferably a siding plank manufactured of medium-density FC material using a well-known Hatschek process. Spline 9200 is a "butt and lock" type spline manufactured of rigid plastic using a well-known extrusion process described above. Spline 9200 is aligned and is fixedly connected with an adhesive to plank 9100 as described above. As shown in FIG. 57, spline 9200 of this embodiment further includes a capillary break 9265 running along the length of spline 9200.

Figure 58:
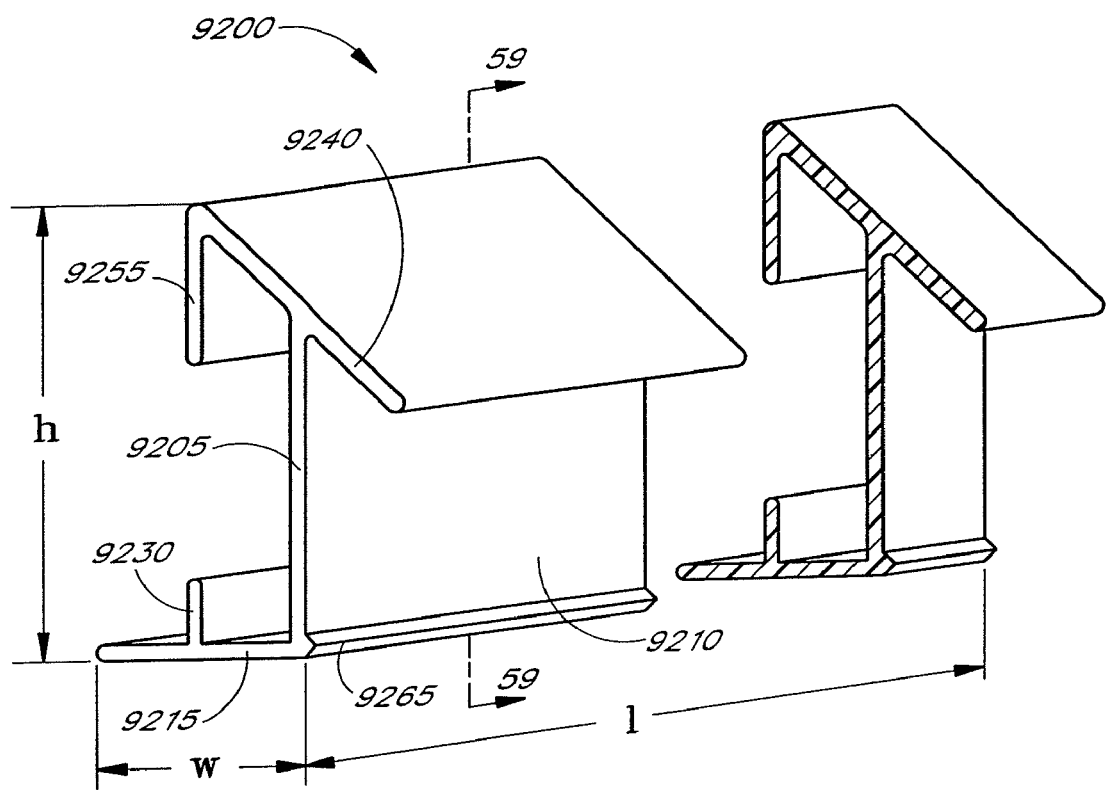
FIG. 58 shows an isometric view of the plastic spline with a capillary break of FIG. 57.

FIG. 58 shows an isometric view of the plastic spline with the capillary break of the preferred embodiment. Spline 9200 includes a plate 9205, a plate back surface 9210, a first flange 9215, a second flange 9230, a third flange 9240, and a fourth flange 9255. Also shown is capillary break 9265 in the form of a lip running along the length of plate back surface 9210 along the lower edge.

Spline 9200 has a length "l", a width "w", and a height "h". An example of spline 9200 dimensions include "l" between about 12 and 16 feet, "w" between about ⅜ and ¾ inches, and "h" between about ½ and 2 inches. A cross-sectional diagram and an end view of spline 9200 are shown in FIGS. 59 and 60, respectively.

Figure 59:
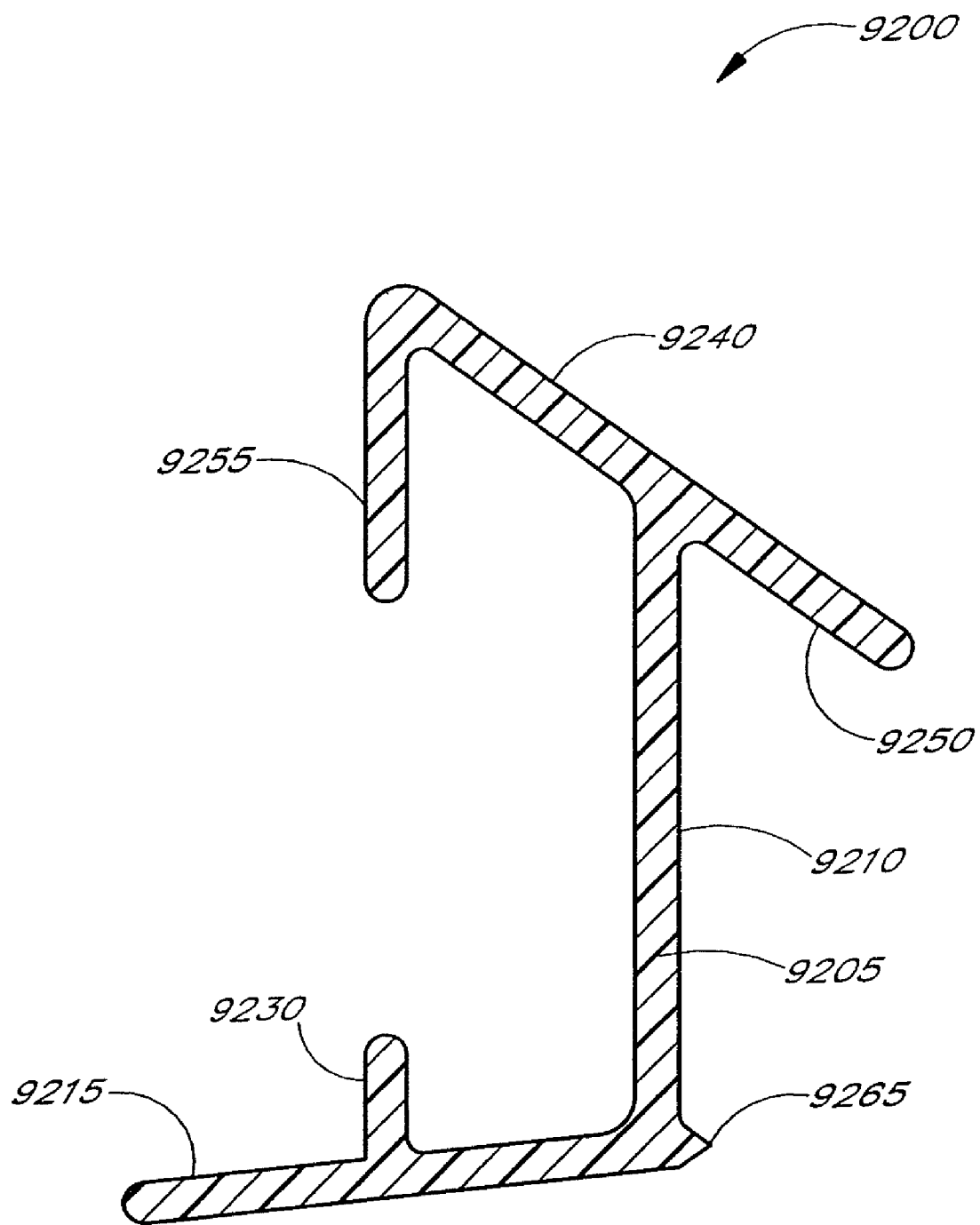
FIG. 59 shows a cross-sectional view of the spline of FIG. 58.

FIG. 59 is a cross-sectional diagram of spline 9200 taken along line 59-59 of FIG. 58. Spline 9200 further includes a third flange bottom surface 9250. Also shown is plate 9205, plate back surface 9210, first flange 9215, second flange 9230, third flange 9240, fourth flange 9255, and capillary break 9265.

A first edge of first flange 9215 is integrally connected at an angle to a first edge of elongated plate 9205. A second edge of elongated plate 9205 is integrally connected at an angle along third flange 9240 between the first and second edges of third flange 9240. A first edge of fourth flange 9255 is integrally connected to a second edge of third flange 9240 in parallel with plate 9205. A first edge of second flange 9230 is integrally connected along first flange 9215 between the first and second edges of first flange 9215 in parallel with plate 9205. Second flange 9230 and fourth flange 9255 are coplanar. Furthermore, material is added such that the first edge of first flange 9215 is extended and is not coplanar with plate back surface 9210, thus forming capillary break 9265.

Figure 60:
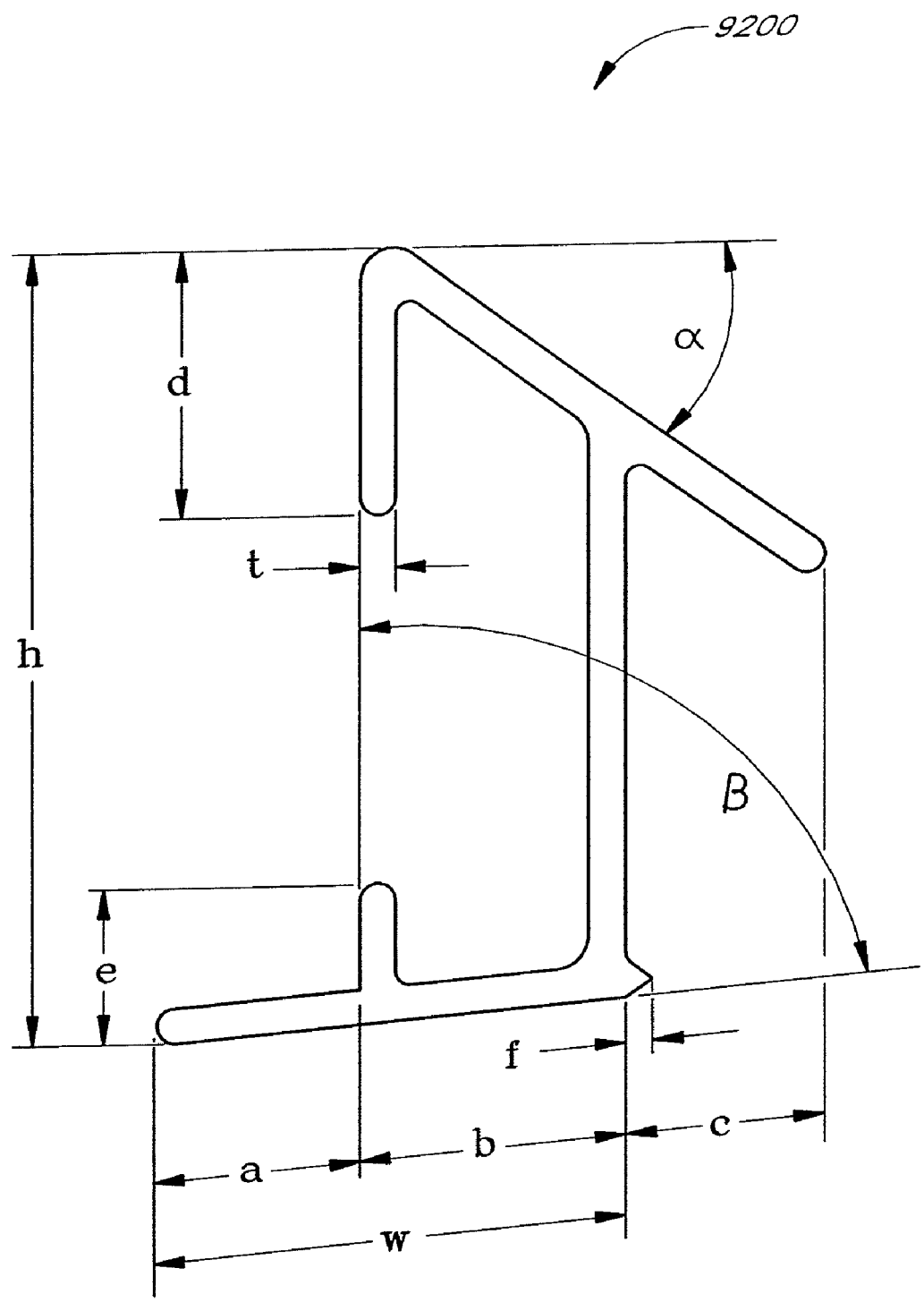
FIG. 60 shows an end view of the spline of FIG. 58 with approximate dimensions.

FIG. 60 is an end view of spline 9200 showing approximate dimensions. Preferred dimensions and angles of spline 9200 are indicated in Table 9 below.

TABLE 9

Preferred Spline 9200 dimensions

| Dimension | Range of Dimension |
|---|---|
| "w" | about 0.375 to 0.750 inches |
| "a" | Plank 9100 width* − about 0.0625 inches |
| "b" | w − a |
| "c" | Plank 9100 width* − about 0.0625 inches |
| "d" | (h − e) to 0.1*h |
| "e" | (h − d) to 0.1*h |
| "f" | greater than about 0.100 inches |
| "h" | about 0.500 to 2.0 inches |
| "l" (not shown) | about 12 to 16 feet |
| "t" | about 0.020 to 0.080 inches |
| "α" | about 0 to 60 degrees |
| "β" | about 90 to 60 degrees |

*Plank 9100 width = about 0.375 to 0.500 inches
Note:
if h = d + e there is no gap. The gap is provided to save material.

Figure 61:
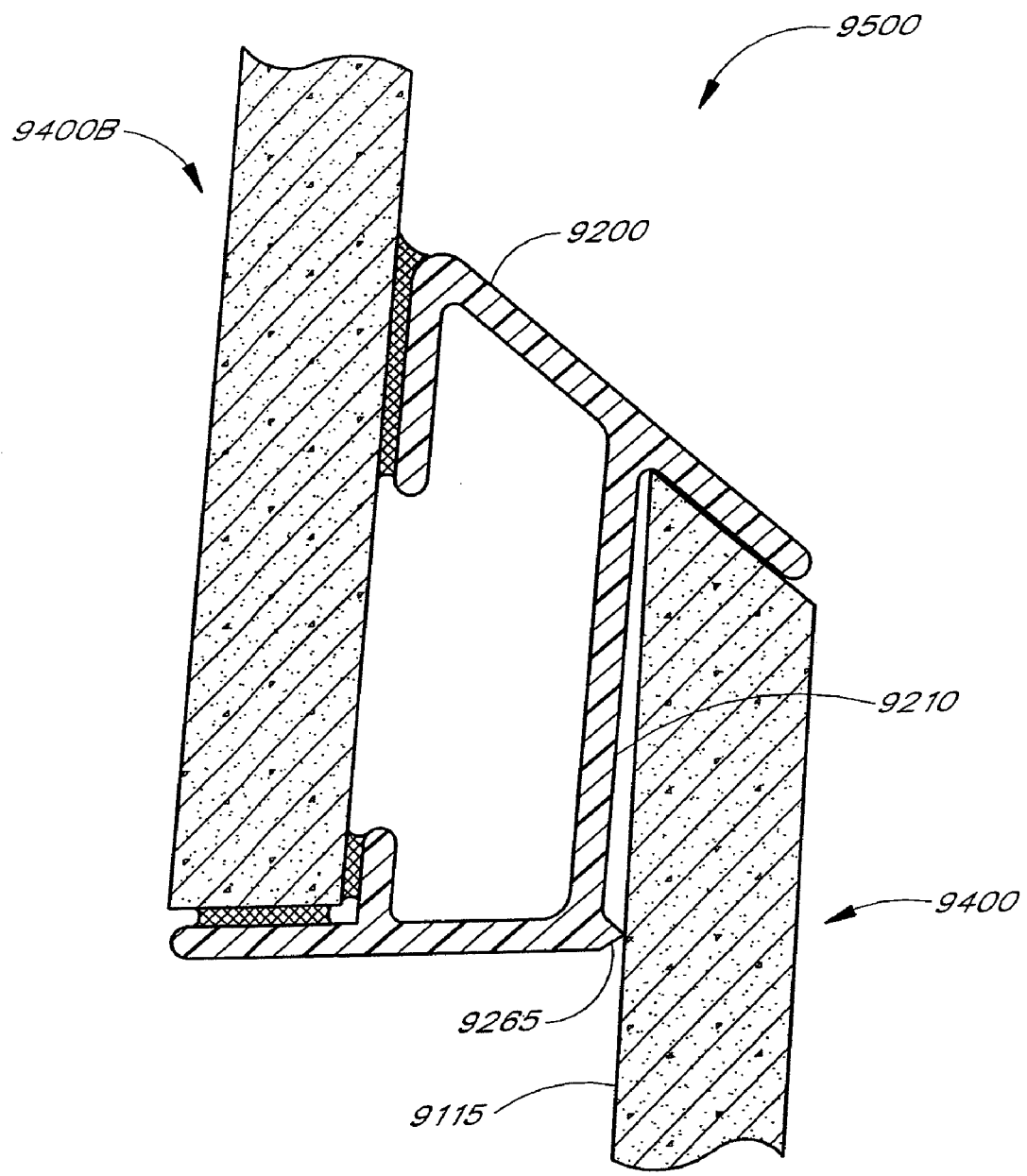
FIG. 61 shows a cross-sectional view of a two-piece siding plank system showing adjacent siding plank assemblies formed in accordance with FIG. 57.

FIG. 61 shows a two-piece siding plank system as described above. Siding system 9500 includes plank assemblies 9400A and 9400B. Plank assembly 9400B is positioned in contact with plank assembly 9400A. More specifically, third flange bottom surface 9250 (FIG. 59) contacts the top of plank assembly 9400A and capillary break 9265 is in contact with plank front surface 9115 of plank assembly 9400A. The result is a gap located above capillary break 9265 between plate back surface 9210 of plank assembly 9400B and plank front surface 9115 of plank assembly 9400A. The resulting gap is equal to dimension "f" of spline 9200 running along the length of siding system 9500.

Capillary break 9265 of this embodiment provides a gap equal to dimension "f" of spline 9200 preventing capillary action between plank assemblies 9400A and 9400B. At the same time, capillary break 9265 of a preferred embodiment maintains a wind barrier between plank assemblies 9400A and 9400B, as capillary break 9265 is in direct contact to plank front surface 9115, and third flange bottom surface 9250 (FIG. 59) contacts the top of plank assembly 9400A.

Figure 62:
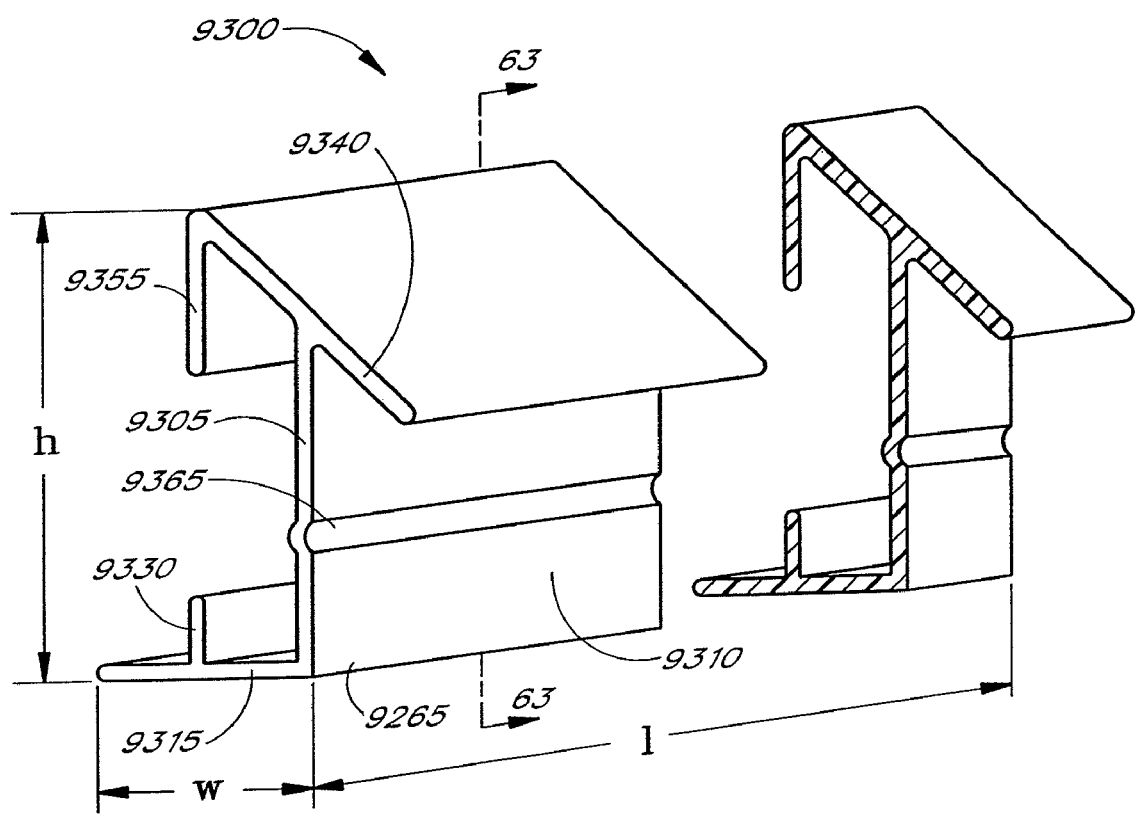
FIG. 62 shows an isometric view of an alternative embodiment of plastic spline with a capillary break.

Another example of this embodiment, shown in FIG. 62, is a plastic spline having a capillary break formed by adding a groove along the length of the spline as described below. As this spline is extruded, the wall thickness is kept constant, and the capillary break is formed by a semicircular indentation in the back surface of the plate and a semicircular protrusion in the front surface of the plate.

FIG. 62 shows an isometric view of the plastic spline with capillary break of this embodiment. Spline 9300 includes a plate 9305, a plate back surface 9310, a first flange 9315, a second flange 9330, a third flange 9340, and a fourth flange 9355. Also shown is capillary break 9365 in the form of a groove running along the length of plate back surface 9310. Spline 9300 has a length "l", a width "w", and a height "h". An example of spline 9300 dimensions include "l" between about 12 and 16 feet, "w" between about ⅜ and ¾ inches, and "h" between about ½ and 2 inches. A cross-sectional diagram and an end view of spline 9300 are shown in FIGS. 63 and 64, respectively.

Figure 63:
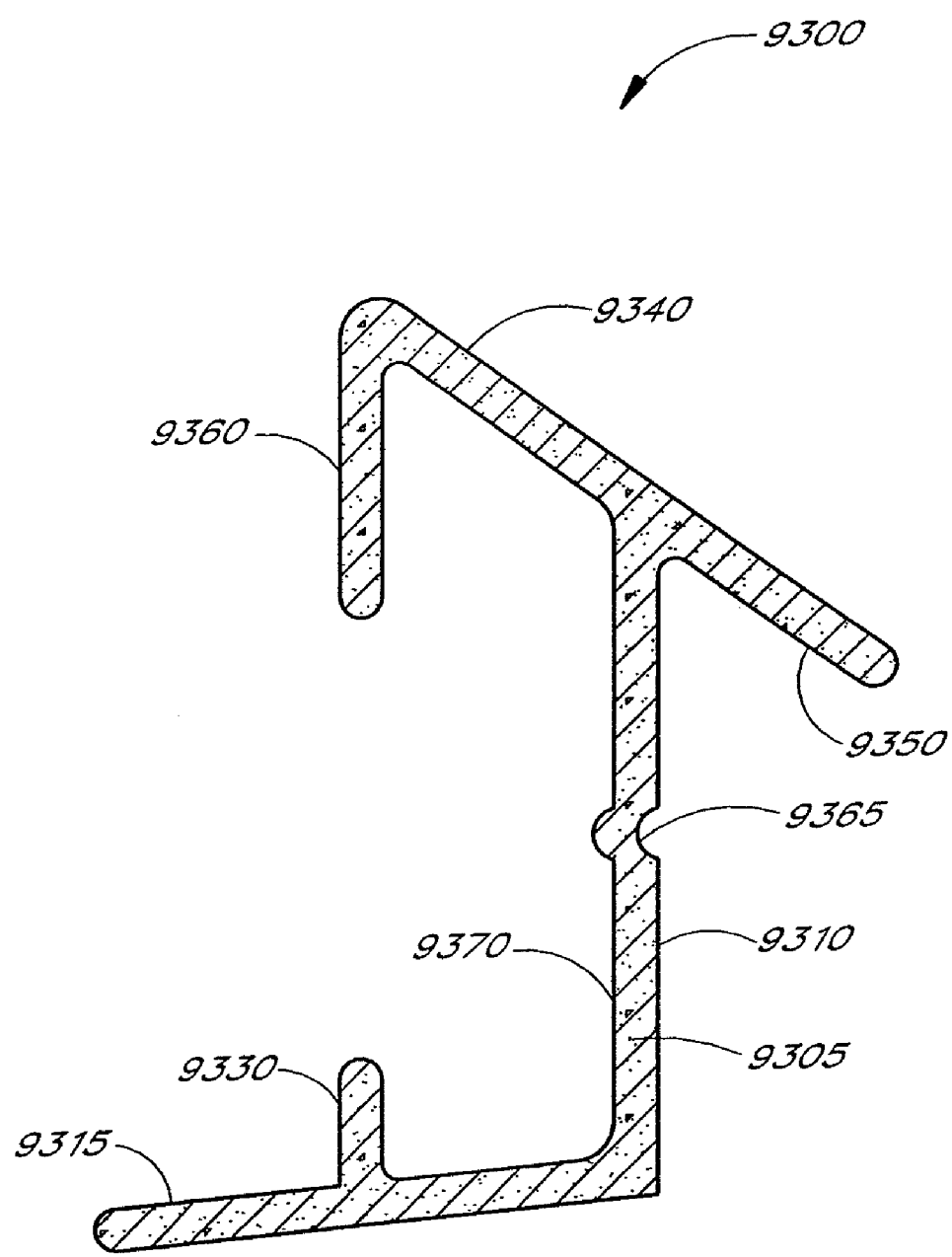
FIG. 63 shows a cross-sectional view of the spline of FIG. 62.

FIG. 63 is a cross-sectional diagram of spline 9300 taken along line 63-63 of FIG. 62. Spline 9300 further includes a third flange bottom surface 9350 and a plate front surface 9370. Also shown is plate 9305, plate back surface 9310, first flange 9315, second flange 9330, third flange 9340, fourth flange 9355 and capillary break 9365. First edge of first flange 9315 is integrally connected at an angle to a first edge of elongated plate 9305. A second edge of elongated plate 9305 is integrally connected at an angle along third flange 9340 between the first and second edges of third flange 9340. A first edge of fourth flange 9360 is integrally connected to a second edge of third flange 9340 in parallel with plate 9305. A first edge of second flange 9330 is integrally connected along first flange 9315 between the first and second edges of first flange 9315 in parallel with plate 9305. Second flange 9330 and fourth flange 9360 are coplanar. Along the length of plate 9305, between the first and second edge of plate 9305, material is indented in a semicircular fashion along the length of plate back surface 9310 and material is similarly protruding along the length of plate front surface 9370, thus forming capillary break 9365.

Figure 64:
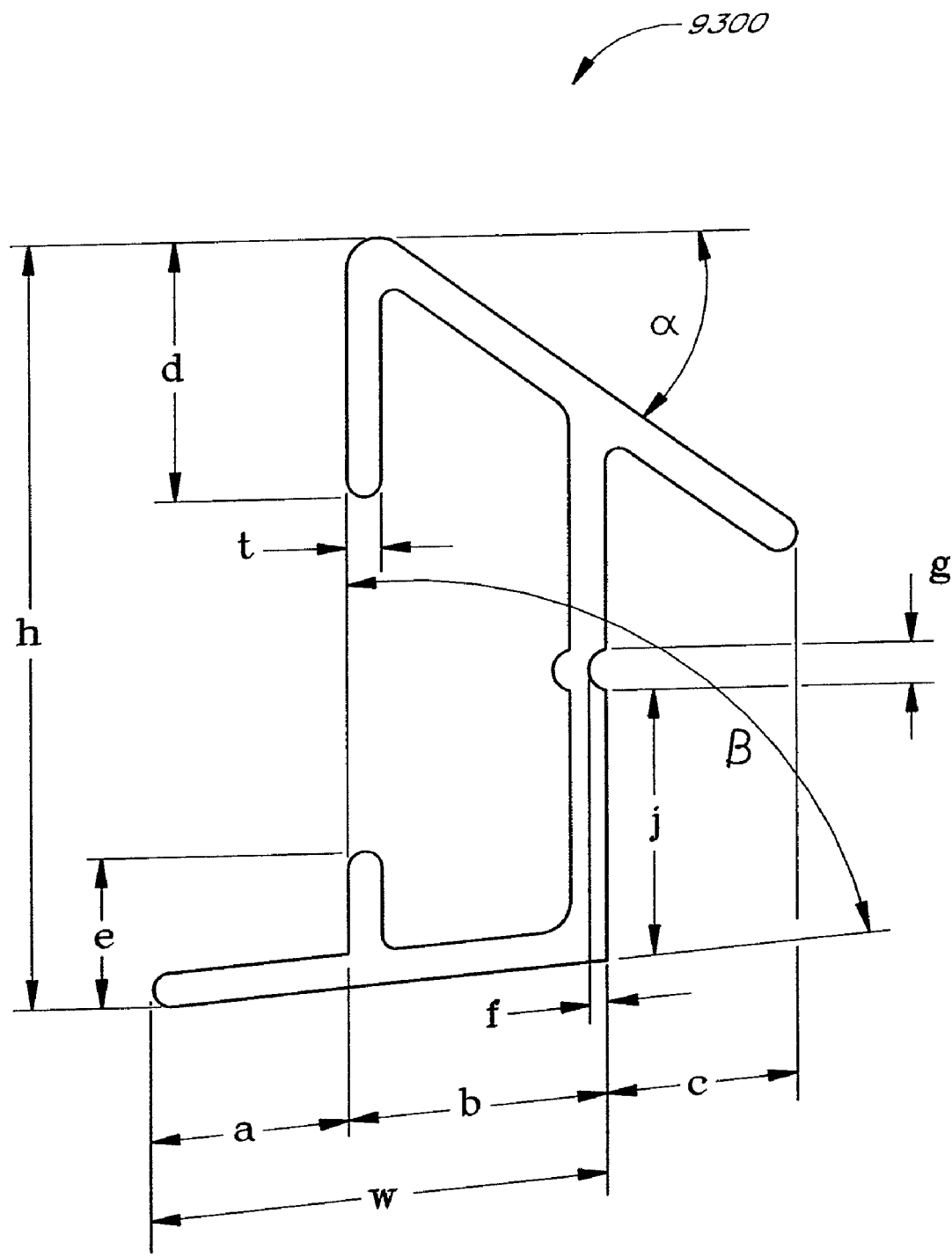
FIG. 64 shows an end view of the spline of FIG. 62.

FIG. 64 is an end view of spline 9300. Preferred dimensions and angles of spline 9300 are indicated in Table 10 below.

TABLE 10

Preferred Spline 9300 dimensions

| Dimension | Range of Dimension |
| --- | --- |
| "w" | about 0.375 to 0.750 inches |
| "a" | Plank 9100 width* − about 0.0625 inches |
| "b" | w − a |
| "c" | Plank 9100 width* − about 0.0625 inches |
| "d" | (h − e) to 0.1*h inches |
| "e" | (h − d) to 0.1*h inches |
| "f" | greater than about 0.1 inches |
| "g" | greater than about 0.2 inches |
| "h" | about 0.500 to 2.0 inches |
| "j" | about 0.250 to 1.0 inches |
| "l" (not shown) | about 12 to 16 feet |
| "t" | about 0.020 to 0.080 inches |
| "α" | about 0 to 60 degree |
| "β" | about 90 to 60 degree |

*Plank 9100 width = about 0.375 to 0.500 inches

Figure 65:
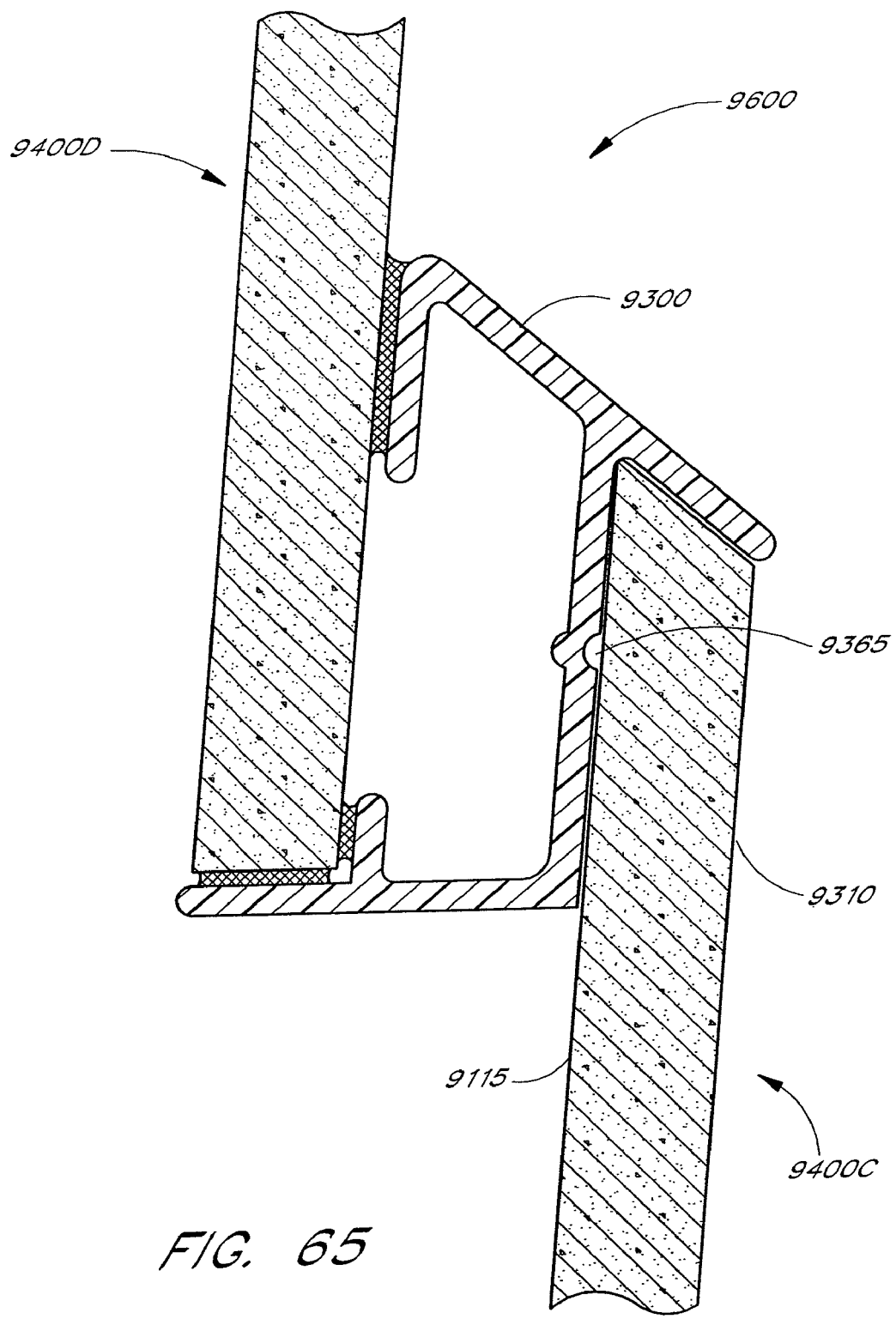
FIG. 65 shows a cross-sectional view of a two-piece siding plank system showing adjacent siding planks formed using the spline of FIG. 62.

FIG. 65 shows a two-piece siding plank system of a preferred embodiment. Siding system 9600 includes plank assemblies 9400C and 9400D. Plank assembly 9400D is positioned in contact with plank assembly 9400C. More specifically, third flange bottom surface 9350 (FIG. 63) contacts the top of plank assembly 9400C and plate back surface 9310 (FIG. 63) is in contact with plank front surface 9115 (FIG. 61) of plank assembly 9400C. The result is a gap created by the presence of capillary break 9365 between plate back surface 9310 of plank assembly 9400D and plank front surface 9115 of plank assembly 9400C. The resulting gap running along the length of siding system 9600 has a depth substantially equal to dimension "f" of spline 9300 and a width substantially equal to dimension "g" of spline 9300.

Capillary break 9365 of this embodiment provides a gap equal to dimension "f" of spline 9300 preventing capillary action between plank assemblies 9400C and 9400D. At the same time, capillary break 9365 of the present invention maintains a wind barrier between plank assemblies 9400C and 9400D, as plate back surface 9310 is in direct contact to plank front surface 9115.

VI. Fiber Cement Articles with Localized Reinforcement and a Method for Making Same In additional embodiments, fiber cement articles having localized reinforcements are provided, which is designed in one embodiment for use in combination with a system of FC planks for siding applications. The result is a locally reinforced FC plank assembly having fiber cement articles with localized reinforcements for improving the strength of individual FC siding planks.

Advantageously, the siding plank assembly of these embodiments provide a lightweight siding assembly having a reduced amount of FC material without compromising the strength of the plank. The addition of localized reinforcement provides for a low-cost siding assembly with increased stiffness and strength, which reduces breakage and improves handleability and ease of installation. The siding assembly is also suitable for blind nailing and capable of high wind loads.

Figure 66:
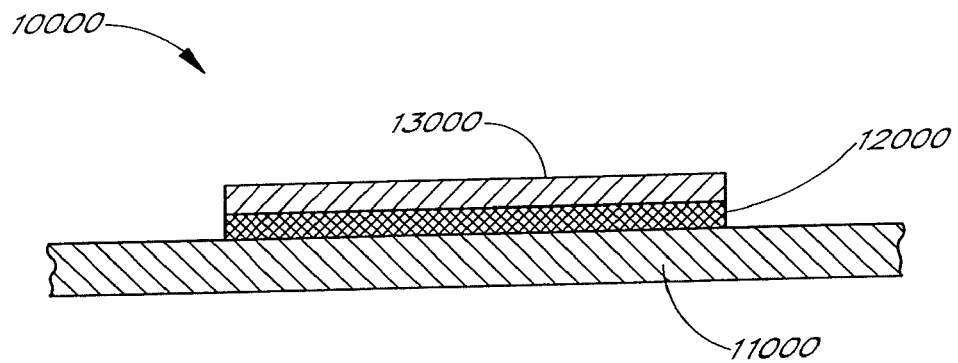
FIG. 66 shows a cross-sectional view of a reinforced fiber cement article.

FIG. 66 shows a cross-sectional view of a reinforced fiber cement article 10000, which includes a fiber cement article 11000, a reinforcing fixture 13000, and a high-shear adhesive layer 12000 that is situated between fiber cement article 11000 and reinforcing fixture 13000. High-shear adhesive layer 12000 and reinforcing fixture 13000 can be applied to one or both faces of fiber cement article 11000.

Fiber cement article 11000 may be made in accordance with the methods described in Australian patent AU 515151, "Fiber Reinforced Cementitious Articles" and in U.S. Pat. No. 6,346,146, the entirety of each of which is hereby incorporated by reference. However, it will be appreciated that fiber cement articles manufactured by other means, including but not limited to the Hatschek process, Bison process, filter pressing, flow-on process, Mazza process, Magnani process, roll-forming, or extrusion, can be used in this embodiment.

High-shear adhesive layer 12000 is preferably an adhesive with high-shear strength, good alkali resistance, durability in exterior cladding applications and quick setting capabilities. The adhesive also preferably has sufficient working or "open" time to allow sufficient penetration into the fiber cement substrate. The adhesive also preferably maintains its adhesive properties through exposure to many cycles of heat and cold and/or wet and dry. One method of evaluating the suitability of such adhesive is to conduct a "peel test", well known in the art, in which the percent retention of peel strength is measured after several exposures to wet and dry and/or heat and cold. Preferably, durable high-shear strength adhesives are used, for instance: hot melt polyurethane adhesives such as Henckel Puremelt 243; hot melt polyamide adhesives such as Henckel—Micromelt 6239, 6238, and 6211; and hot melt modified ethylene vinyl acetate (EVA) adhesives such as Reicholdt 2H850.

The preferred options listed above for the high-shear strength adhesive layer 12000 have the additional property of resisting adhesive failure after five wet/dry cycles of soaking in saturated CaO (alkaline) solution at 60° F. or after twenty-five soak/freeze/thaw cycles.

Reinforcing fixture 13000 is preferably made from any common engineering material, preferably with a tensile strength substantially greater than that of fiber cement article 11000. More preferably, the reinforcing fixture is made of a non-rigid material. Preferred materials for reinforcing fixture 13000 including, but not limited to, metal foils, woven metal meshes, and expanded metal meshes of sufficient shape and dimension to be suitable for the application. Other materials of relatively high tensile strength, such as polymer films or woven and non-woven polymer fabric meshes may also be used.

As shown in FIG. 66, both durable high-shear adhesive layer 12000 and reinforcing fixture 13000 are placed on one face of fiber cement article 110000 and centered along the length and width of fiber cement article 11000. When handling reinforced fiber cement article 10000, tensile stresses created by flexing fiber cement article 11000 are transferred to reinforcing fixture 13000 via high-shear adhesive layer 12000.

Reinforcing fixture 13000 can be applied to both faces of fiber cement article 11000 or can be applied to more than one area of fiber cement article 11000 with high-shear adhesive layer 12000 in order to accommodate stresses envisioned in the use and application of fiber cement article 11000.

Reinforcing fixture 13000 and durable high-shear strength adhesive layer 12000 may be applied to fiber cement shapes other than flat planks, including, but not limited to, panels, roofing shakes or shingles, tiles, slate, thick boards, and hollow or solid extruded profiles, in order to provide reinforcement in critical areas. Thus, it will be appreciated that the reinforcing fixtures described herein are not limited to siding planks.

While reinforcing fixture 13000 is illustrated in FIG. 66 as a flat sheet, reinforcing fixture 13000 may also have any three-dimensional shape required to provide sufficient reinforcement to specific areas of fiber cement article 11000 when attached to fiber cement article 11000 with durable high-shear adhesive 12000. The dimensions and shape of reinforcing fixture 13000 may be determined by analyzing the stresses in fiber cement article 11000 under specific conditions of load using any number of methods known to the art, including finite element analysis.

One means of evaluating the relative stiffness of reinforced fiber cement article 10000 is the "barrel test," which measures the ability of a plank to be self-supporting when carried parallel to the ground. In the barrel test, a plank is balanced flat upon the circumference of a barrel placed parallel to the ground. If the plank does not break after a predetermined amount of time, the amount of deflection from horizontal is measured in order to compare the relative stiffness of various plank designs and materials. Table 11 illustrates the relative performance in the barrel test of fiber cement planks made according to the embodiments described herein.

TABLE 11

Deflection and breaking behavior of FC planks in the barrel test

| Article | Deflection and breaking behavior (0 min.) | Deflection and breaking behavior (5 min.) |
|---|---|---|
| Control: | | |
| $5/16"$ × $8 1/4"$ × 12 ft. FC plank | 16" 50% chance of breaking | N/A |
| $3/16"$ × $8 1/4"$ × 12 ft. FC plank | 100% chance of breaking | N/A |
| $3/16"$ × 6" × 12 ft. FC plank laminated with a 6" × 12 ft. steel foil | 22" deflection 0% chance of breaking | 23" deflection 0% chance of breaking |
| $3/16"$ × $8 1/4"$ × 12 ft. FC plank laminated with a 4" × 4 ft. steel foil | 28" deflection 0% chance of breaking | 29.5" deflection 0% chance of breaking |
| $3/16"$ × $8 1/4"$ × 12 ft. FC plank laminated with a 2" × 4 ft. steel foil | 36" deflection 0% chance of breaking | 39.5" deflection 0% chance of breaking |

Figure 67:
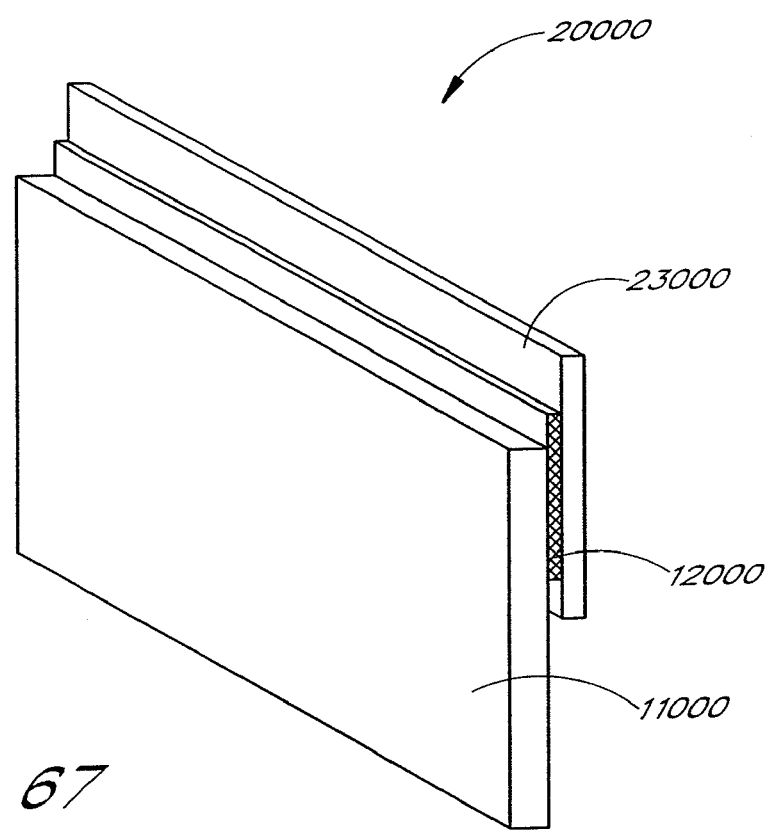
FIG. 67 shows a front perspective view of a reinforced fiber cement plank with a nailing skirt.
Figure 68:
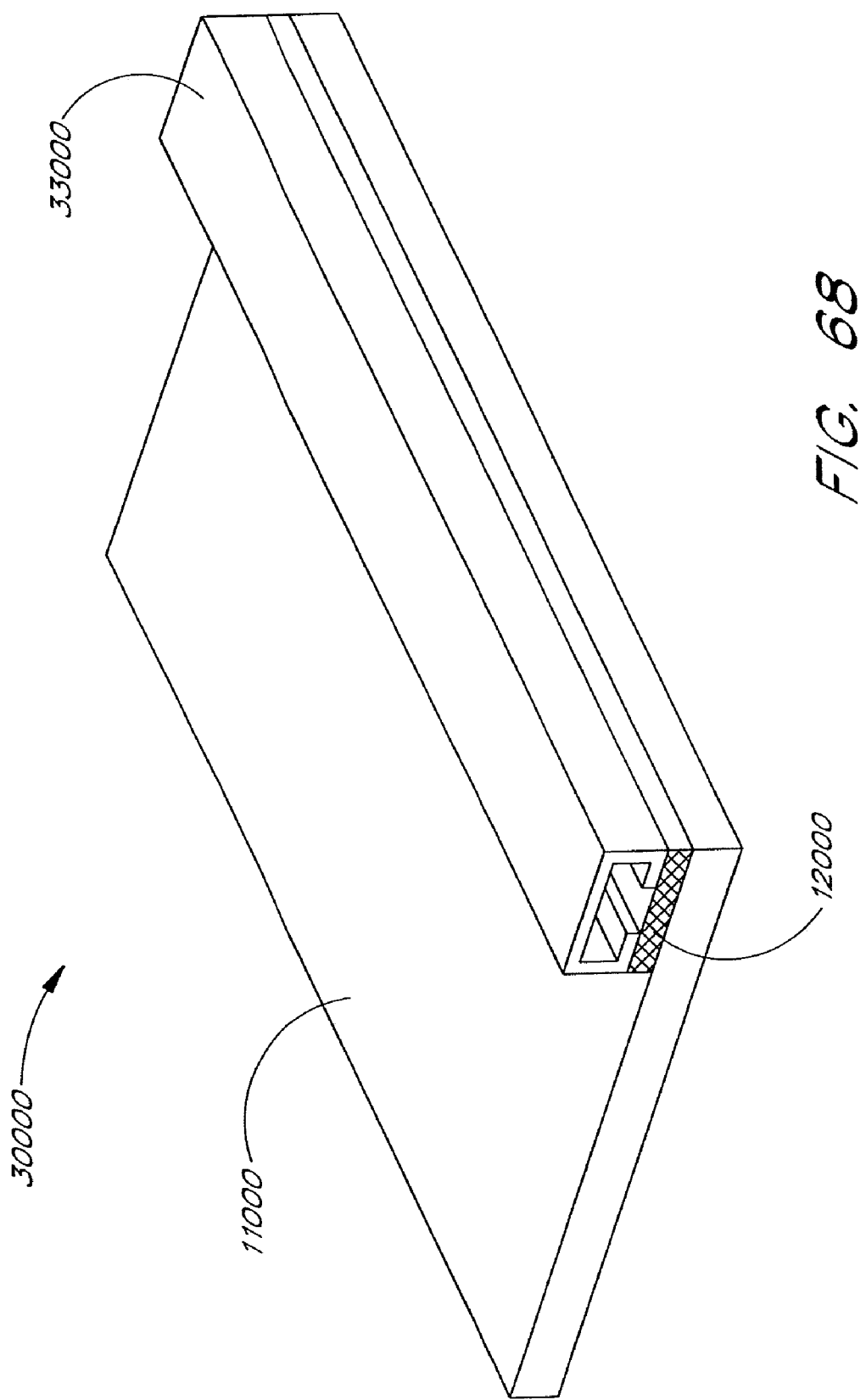
FIG. 68 shows a rear perspective view of a reinforced fiber cement plank with an extruded polymer reinforcing strip.
Figure 69:
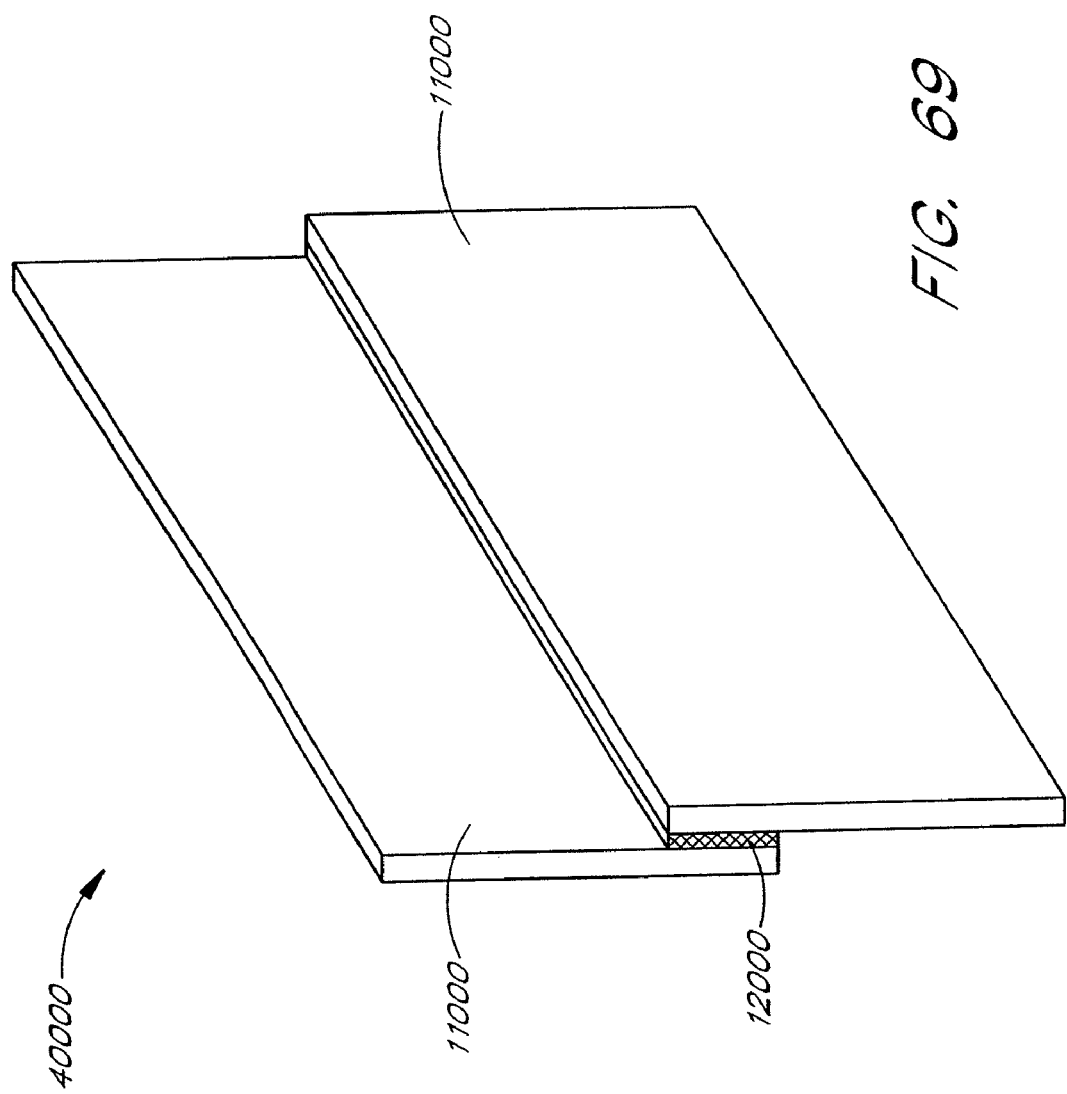
FIG. 69 shows a rear perspective view of a multi-lap fiber cement plank.

FIGS. 67, 68, and 69 below illustrate examples of fiber cement building products incorporating reinforced fiber cement article 10000.

FIG. 67 shows a front perspective view of a reinforced fiber cement plank with nailing skirt 20000, including fiber cement article 11000, high-shear adhesive layer 12000, and a metal or plastic nailing skirt 23000. Nailing skirt 23000 functions as reinforcing fixture 13000 in this application and is preferably attached to fiber cement article 11000 in the manner described above with reference to reinforcing fixture 13000. Nailing skirt 23000 serves as a nailing area for attaching fiber cement article 11000 to the exterior of a building and is of sufficient thickness to support fiber cement article 11000 when so attached. Nailing through nailing skirt 23000 reduces the amount of overlap required between siding planks. The stiffness of nailing skirt 23000 also provides resistance to wind uplift when the plank is blind nailed.

FIG. 68 shows a rear perspective view of a reinforced fiber cement plank with extruded polymer reinforcing strip 30000, including fiber cement article 11000, high-shear adhesive layer 12000, and a three-dimensional reinforcing fixture 33000. Three-dimensional reinforcing fixture 33000 functions as reinforcing fixture 13000 in this application and is attached to fiber cement article 11000 in the manner described above with reference to reinforcing fixture 13000. Three-dimensional reinforcing fixture 33000 functions both to stiffen the plank and as a spacer between planks when several planks are installed on a wall. By providing the function of a spacer, the reinforcing fixture 33000 provides an aesthetically pleasing shadow line when several planks are installed on the wall.

FIG. 69 shows a rear perspective view of a multi-lap fiber cement plank 40000, including two or more fiber cement articles 11000 joined in an overlapping fashion and bonded together with high-shear adhesive layer 12000.

Figure 70:
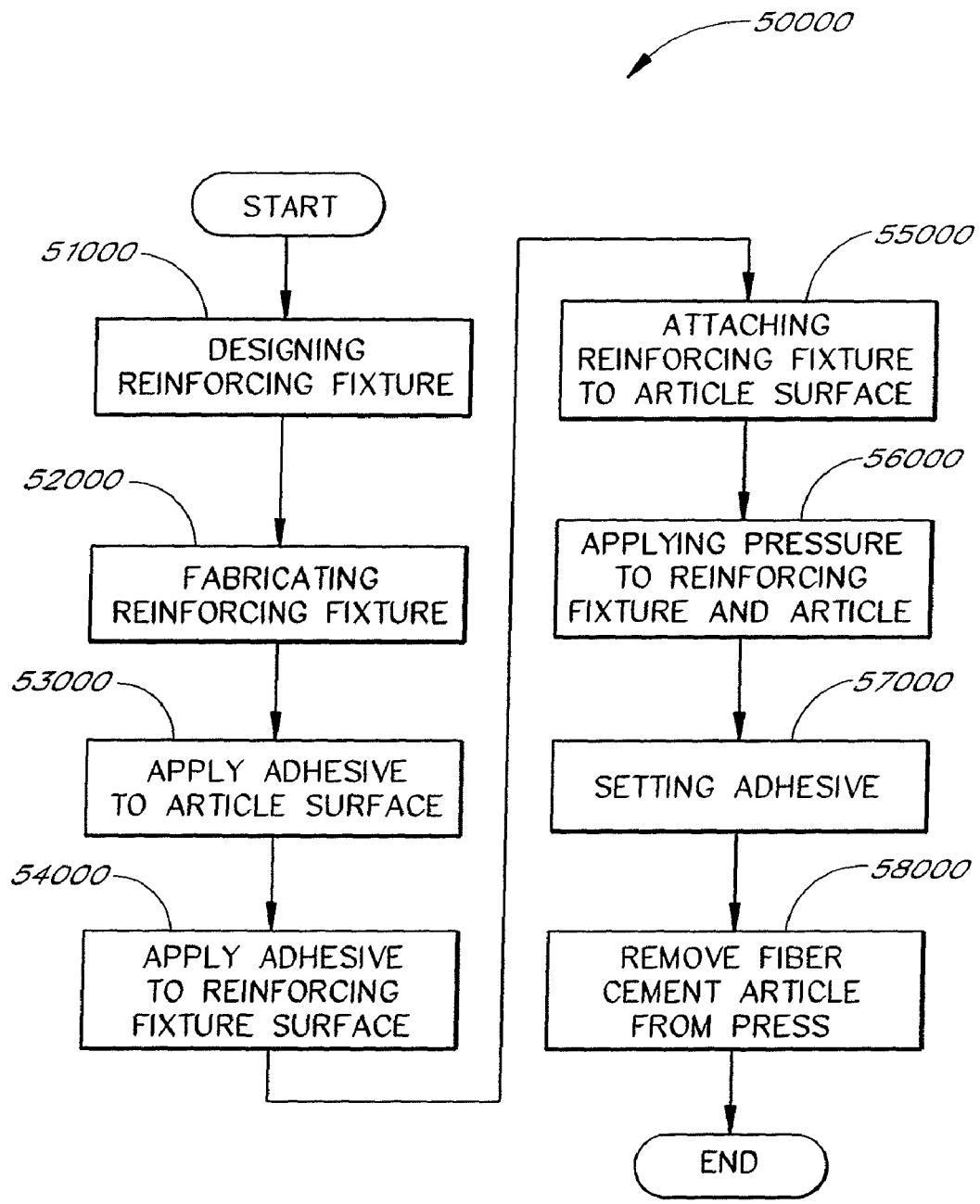
FIG. 70 shows a method of making a reinforced fiber cement article.

FIG. 70 shows a method 50000 for making a fiber cement article with a localized reinforcing fixture, which involves:

Designing reinforcing fixture 51000: Analyze the stresses on the fiber cement article in its intended use to determine the shape, dimension, and appropriate material for the reinforcing fixture. The analysis and design is performed using methods well known in the art, such as classical bending moment analysis or finite element analysis.

Fabricating reinforcing fixture 52000: Fabricate the reinforcing fixture 13000 using well-known methods appropriate for the design and material generated in step 51000. For example, if reinforcing fixture 13000 were a metal foil of specific shape, a die would be fabricated using well-known methods to mechanically stamp the shape from a roll of aluminum foil of a specific thickness.

Applying adhesive to article surface 53000: Form a high-shear strength adhesive layer 12000 of a predetermined thickness by applying a predetermined amount of durable, high-shear strength adhesive to a predetermined location on the surface of fiber cement article 11000. High-shear strength adhesive layer 12000 is preferably applied at a temperature in the range of about 200° F. to 400° F. such that the viscosity of the adhesive allows sufficient penetration into the fiber cement surface at the application temperature. The durable, high-shear strength adhesive should ideally allow between about 30 and 60 seconds of working (open) time before setting. The adhesive can be applied using any type of commonly used hot melt application equipment, such as a roll coater, curtain coater, or hot glue gun.

Applying adhesive to reinforcing fixture surface 54000: Form a high-shear strength adhesive layer 12000 of a predetermined thickness (when required to ensure adequate bonding between fiber cement article 11000 and reinforcing fixture 13000) by applying a predetermined amount of durable, high-shear strength adhesive to a predetermined location on the surface of reinforcing fixture 13000. The adhesive is preferably applied at a temperature in the range of about 200° F. to 400° F. such that the viscosity of the adhesive allows it to penetrate into fiber cement article 11000 at the application temperature. The durable, high-shear strength adhesive should ideally allow between about 30 and 60 seconds of working (open) time before setting. The adhesive can be applied using any type of commonly used hot melt application equipment, such as a roll coater, curtain coater, or hot glue gun.

Attaching reinforcing fixture to article surface 55000: Attach a reinforcing fixture 13000 to a fiber cement article 11000 manually or by mechanical means, such that the point of attachment is high-shear adhesive layer 12000 applied in steps 53000 and/or 54000.

Applying pressure to reinforcing fixture and article 56000: Apply a uniform pressure to fiber cement article 11000 and reinforcing fixture 13000 in order to bond reinforcing fixture 13000 to fiber cement article 11000. In the example of reinforced fiber cement plank with nailing skirt 20000, pressure is applied by passing fiber cement article 11000 and reinforcing fixture 13000 simultaneously through the nip of a pressurized roller such that the roller uniformly exerts three pounds per linear inch (25 pounds across a 8.25 inch plank width). Other mechanical means may be used to apply pressure to assemblies of more complicated shapes.

Setting adhesive 57000: Hold fiber cement article 11000 and reinforcing fixture 13000 in place for a predetermined amount of time, pressure, and temperature in order to permanently bond them together. The pressure, time, and temperature required are dictated by the properties of the high-shear adhesive used and line speed of the manufacturing process. In the example of reinforced fiber cement plank with nailing skirt 20000, hot-melt polyurethane adhesive is applied at 250° F., the components are assembled within 60 seconds, and the plank is instantaneously pressed using a pressurized nip roll.

Removing fiber cement article from press 58000: Remove finished reinforced fiber cement article 10000 from the press using manual or mechanical means.

The embodiments for localized reinforcement described above advantageously improve the handleability of thin fiber cement planks or other articles by allowing a thin, lightweight plank or article to have the same stiffness as a much thicker, denser plank or article. By using localized reinforcements durably bonded to specific portions of a fiber cement article, the stiffness, bending strength, and/or impact strength of the fiber cement article may be improved, allowing such articles to be used in applications previously unsuitable for fiber cement due to its brittleness. Fiber cement siding planks formed as described above are capable of handling high wind loads when blind nailed, and provide a way to minimize the amount of overlap between fiber cement planks while maintaining a secure attachment. Articles made according to the methods described above also have greater resistance to adhesive failure after exposure to wet/dry cycles, attack by alkaline solutions, or soak/freeze/thaw cycling. Additionally, by using localized reinforcements durably bonded to specific portions of a fiber article, such articles may be designed for a given application using less fiber cement material and/or fiber cement material of a lower density. In the embodiment above using a foil-backed fiber cement planks, such planks are capable of reflecting heat from a building, which keeps the building cooler in hot weather.

In another embodiment, the problem of providing localized reinforcement to fiber cement articles can be solved by embedding the reinforcing fixture within the fiber cement article while the fiber cement article is in the green or plastic state. Preferably, the reinforcing fixture should be chosen to withstand the high temperature of the curing process of the fiber cement article so as not to lose their effectiveness.

Conclusions

Certain preferred embodiments of the present invention provide efficient designs for lightweight fiber cement siding plank assemblies having the traditional deep shadow-line. Particularly, the deep shadow line is created without having to machine the siding plank or otherwise remove any siding plank material. Instead, the siding plank is formed by adding material to a thinner starting base siding plank instead of removing material from a thick rectangular section as shown in prior art. Additionally, two pieces of FC material can be bonded solidly and quickly using the adhesive composition of the preferred embodiments. As such, thin and lightweight planks can be used as siding material that produces a thick shadow line.

Furthermore, the siding plank assembly of certain preferred embodiments provide interlocking features that allow the planks to be installed quickly with ease and maintain a constant gauge of plank rows along the length of the siding and between rows of sidings. The siding plank assembly also provides the installation flexibility of variable gauge height. The siding plank assemblies use gravity to help mate two planks tightly and uniformly without face nailing.

Additionally, certain preferred embodiments of the present invention provide for improved handleability and strength of thin fiber cement planks by allowing a thin, lightweight plank to have the same stiffness as a much thicker, denser plank. This is preferably accomplished by reinforcing specific portions of a fiber cement article with reinforcing fixtures. A locally reinforced article has the advantages of producing a low cost article that handles well during installation and under wind loads. The reinforced article also provides a way to minimize the amount of overlap between fiber cement planks while maintaining a secure attachment as well as a way to reflect heat.

Although the foregoing invention has been described in terms of certain preferred embodiments, other embodiments will become apparent to those of ordinary skill in the art, in view of the disclosure herein. Accordingly, the present invention is not intended to be limited by the recitation of preferred embodiments, but is instead intended to be defined solely by reference to the appended claims.

What is claimed is:

1. A method for making a fiber cement board with a dual function localized reinforcing fixture, comprising: identifying points of stress on the fiber cement board; selecting a reinforcing fixture wherein the reinforcing fixture comprises a three dimensional structure configured to improve the strength of the fiber cement board at the points of stress; and bonding the reinforcing fixture to the points of stress on the fiber cement board, wherein the reinforcing fixture is disposed along a lateral edge of the fiber cement board and configured to function as a spacer between adjacent fiber cement boards when two or more of the fiber cement boards are installed on a wall, wherein said reinforcing fixture maintains a constant gauge and overlap between said fiber cement board and an adjacent fiber cement board so as to create a uniform and thick shadow line on said adjacent fiber cement board.

2. The method of claim 1, wherein determining points of stress on the fiber cement board involves analyzing the stresses on the fiber cement board in its installation of intended use.

3. The method of claim 1, wherein selecting a reinforcing fixture comprises determining the shape, dimension, and appropriate materials based on a stress analysis of the fiber cement board in its installation or intended use.

4. The method of claim 3, wherein selecting a reinforcing fixture further comprises fabricating the reinforcing fixture.

5. The method of claim 1, wherein bonding the reinforcing fixture to the fiber cement board comprises applying an adhesive to a surface of the board.

6. The method of claim 5, wherein bonding the reinforcing fixture further comprises applying an adhesive to a surface of the fixture.

7. The method of claim 5, wherein the reinforcing fixture is attached to a surface of the fiber cement board after an adhesive is applied to the board surface.

8. The method of claim 7, wherein a pressure is applied to the reinforcing fixture and fiber cement board after the reinforcing fixture is attached to the surface of the fiber cement board.

9. The method of claim 8, wherein the fiber cement board and reinforcing fixture are held in place in a press for a predetermined amount of time, pressure, and temperature in order to permanently bond them together.

10. The method of claim 9, wherein the fiber cement board with the localized reinforcing fixture is removed from the press.

11. The method of claim 1, wherein the reinforcing fixture selected is an interlocking member.

12. The method of claim 1, wherein the reinforcing fixture selected is a nailing skirt for attaching and supporting the fiber cement board to the exterior of a building.

13. A method of forming a fiber cement article comprising determining the required thickness and density for the intended use of the fiber cement article; forming the fiber cement article, wherein the fiber cement article has thickness and density less than the required thickness and density; determining points of stress on the fiber cement article; attaching a reinforcing fixture to a surface of the fiber cement article adjacent the points of stress to provided localized reinforcement, wherein the reinforcing fixture is configured to provide the fiber cement article sufficient localized reinforcement at the points of stress resulting in the fiber cement article having substantially the same stiffness as an equivalent fiber cement article formed with the required thickness and density, wherein said reinforcing fixture maintains a constant gauge and overlap between said fiber cement article and an adjacent fiber cement article so as to create a uniform and thick shadow line on said adjacent fiber cement article when the fiber cement article and the adjacent fiber cement article are installed on a wall.

14. The method of claim 13, wherein the fiber cement article is selected from the group consisting of a roofing shake, slate, and tile.

15. The method of claim 13, wherein the fiber cement article is an elongated plank or panel.

* * * * *